April 11, 1961 E. O. BLODGETT 2,979,564

CODE-FORM CONVERTER AND COMMUNICATION SYSTEM

Filed Sept. 5, 1956 19 Sheets-Sheet 1

INVENTOR.
Edwin O. Blodgett

BY [signature]

ATTORNEY

April 11, 1961 E. O. BLODGETT 2,979,564

CODE-FORM CONVERTER AND COMMUNICATION SYSTEM

Filed Sept. 5, 1956 19 Sheets-Sheet 2

*INVENTOR.*
Edwin O. Blodgett

*BY*

ATTORNEY

INVENTOR.
Edwin O. Blodgett
BY [signature]
ATTORNEY

April 11, 1961 E. O. BLODGETT 2,979,564

CODE-FORM CONVERTER AND COMMUNICATION SYSTEM

Filed Sept. 5, 1956 19 Sheets-Sheet 4

INVENTOR.
Edwin O. Blodgett

BY P. E. Henninger

ATTORNEY

CODE-FORM CONVERTER AND COMMUNICATION SYSTEM

INVENTOR.
Edwin O. Blodgett

BY [signature]

ATTORNEY

April 11, 1961 E. O. BLODGETT 2,979,564

CODE-FORM CONVERTER AND COMMUNICATION SYSTEM

Filed Sept. 5, 1956 19 Sheets-Sheet 6

INVENTOR.
Edwin O. Blodgett

BY P. E. Henninger

ATTORNEY

INVENTOR.
Edwin O. Blodgett

BY [signature]

ATTORNEY

April 11, 1961 E. O. BLODGETT 2,979,564

CODE-FORM CONVERTER AND COMMUNICATION SYSTEM

Filed Sept. 5, 1956 19 Sheets-Sheet 8

INVENTOR.
Edwin O. Blodgett

BY

ATTORNEY

April 11, 1961 E. O. BLODGETT 2,979,564

CODE-FORM CONVERTER AND COMMUNICATION SYSTEM

Filed Sept. 5, 1956 19 Sheets-Sheet 9

INVENTOR.
Edwin O. Blodgett

BY P. E. Henninger

ATTORNEY

CODE-FORM CONVERTER AND COMMUNICATION SYSTEM

Filed Sept. 5, 1956 19 Sheets-Sheet 10

INVENTOR.
Edwin O. Blodgett by [signature]

ATTORNEY

INVENTOR.
Edwin O. Blodgett

BY [signature]

ATTORNEY

INVENTOR.
Edwin O. Blodgett
BY P. E. Henninger
ATTORNEY

INVENTOR.
Edwin O. Blodgett

BY [signature]
ATTORNEY

INVENTOR
Edwin O. Blodgett
by [signature]
ATTORNEY

April 11, 1961 E. O. BLODGETT 2,979,564

CODE-FORM CONVERTER AND COMMUNICATION SYSTEM

Filed Sept. 5, 1956 19 Sheets-Sheet 15

INVENTOR
Edwin O. Blodgett
by [signature]
ATTORNEY

CODE-FORM CONVERTER AND COMMUNICATION SYSTEM

Filed Sept. 5, 1956 19 Sheets-Sheet 16

INVENTOR
Edwin O. Blodgett
by [signature]
ATTORNEY

INVENTOR
Edwin O. Blodgett
by [signature]
ATTORNEY

INVENTOR
Edwin O. Blodgett
by P. E. Henninger
ATTORNEY

April 11, 1961 E. O. BLODGETT 2,979,564

CODE-FORM CONVERTER AND COMMUNICATION SYSTEM

Filed Sept. 5, 1956 19 Sheets-Sheet 19

INVENTOR
Edwin O. Blodgett by [signature]

ATTORNEY

United States Patent Office 2,979,564
Patented Apr. 11, 1961

2,979,564

CODE-FORM CONVERTER AND COMMUNICATION SYSTEM

Edwin O. Blodgett, Rochester, N.Y., assignor to Commercial Controls Corporation, Rochester, N.Y., a corporation of Delaware Filed Sept. 5, 1956, Ser. No. 608,110

71 Claims. (Cl. 178—26)

The present invention relates to coded-information data transmitters, receivers, and transmission-reception systems in which transmission and reception of coded information may be accomplished by single or plural channels or lines and by use of half-duplex or full-duplex modes of operation. While the invention is of general application, it is particularly suited for translating information code-recorded in punched tape and for re-recording the information after transmission in identical punched-tape form, and will be described in that connection.

Information is conventionally transmitted from one point and received at a remote point by the use of various forms of communication code. In one present day standard telecommunication system, information is translated in a code form having groups of five binary-form code bits used as marking bits and spacing bits in various combinations within each group to represent individual items of information. The code bits of each such code group are presented concurrently (or in parallel) to a "distributor" mechanism which operates to arrange the code bits in a series or sequential form thereof for transmission. When received, the serially arranged code bits are returned to their concurrent or parallel form by a "collector" mechanism for ultimate use at the point of reception. Existing structures for this type of transmission are limited to operation in conjunction with a five bit form of code, which often is not capable of representing the full scope of information which it is desired to translate, and cannot be readily and conveniently modified in structure to operate with any code form of larger information handling capacity. As heretofore constructed and arranged, these prior structures inherently possess an undesired limitation on their rate-of-information capacity, and the communication system of which they conventionally form components has no provision for rapidly and automatically detecting any inaccuracy of communication which may readily occur due to equipment malfunctioning or under certain operating conditions of the communication channel.

It is an object of the present invention to provide a new and improved code transmitter, code receiver, and novel communication system which avoid one or more of the limitations and disadavntages of prior such arrangements.

It is a further object of the invention to provide a unique coded-information communication system particularly adapted to use with commercial telegraph channels of any channel quality within a wide range thereof, and one having the ability to verify the accuarcy of the transmission and by signalling back to provide an error indication or interrupt the transmission in the event an error occurs due to faulty transmission, faulty equipment operation, an open transmission channel, or the like.

It is an additional object of the invention to provide a novel coded-information transmitter and a coded-information receiver, each of relatively simple, inexpensive, and sturdy construction having exceptionally high reliability in operation, and readily adaptable to a combined transmitter-receiver unit assembly in which both the transmitter and receiver have provision for one or more adjustments easily and simply accomplished either at the factory or in the field to insure optimum operation when used with different transmission channel characteristics.

It is another object of the invention to provide an improved coded-information communication system having a high degree of flexibility in its application to various forms of communication arrangements permitting, as desired, half-duplex operation selectively in both directions between remotely situated points by use of either a two-wire or four-wire communication channel or concurrently in both directions by full-duplex operation. In addition, the novel system of the invention effects automatic and continuous monitoring of all transmissions to terminate further transmission regardless of the direction thereof should an error occur at any time in the coded information as received by the receiver due to equipment malfunctioning or to the fact that the two-wire communication channel used, or either two-wire circuit of a four-wire channel becomes open or interrupted for any reason. In the event of an open communication channel, the receiver does not race but rather has its operation automatically halted awaiting correction of the fault.

It is an additional object of the invention to provide a communication system of highly improved accuracy and reliability in operation in which all transmissions are automatically prevented until the remote receiver has been manually placed in proper receiving condition, or in which transmissions are automatically halted in the event the remote receiver is so manually controlled that it ceases to be properly conditioned for accurate reception of the transmitted information, and this without regard to whether either the half-duplex or full-duplex modes of operation are employed. This is also true where information is supplied to the transmitter from punch-coded tape and the received information is re-recorded in punched tape and the tape at either the transmitter or receiver becomes exhausted or excessively tight in its feed through the reader or punch units or is not properly positioned in the reader or punch units to effect error-free tape reading and punching. An indication is automatically provided at the transmitter whenever the receiver is properly conditioned to receive, or after an automatic halt in transmission an indication is provided when the receiver has been manually restored to proper receiving condition.

It is yet another object of the invention to provide a coded information transmitter having a substantially improved rate-of-information translation capacity due not only to its novel construction but also to its character of operation with an information reader in which the transmitter translates one group of coded information concurrently with the reading and storage of the next such group in readiness to be applied to the transmitter.

It is a further object of the invention to provide a coded information receiver of substantially improved rate-of-information translation capacity resulting not only from its novel construction but also to its characteristic operation with an information recorded in which a group of received information bits is applied to and stored in an information recorder where it is recorded concurrently with the collection of the next group of received information bits by the receiver in readiness to be applied to the recorder.

Other objects and advantages of the invention will appear as the detailed description proceeds in the light of the drawings forming a part of this application and in which.

Figure 1:
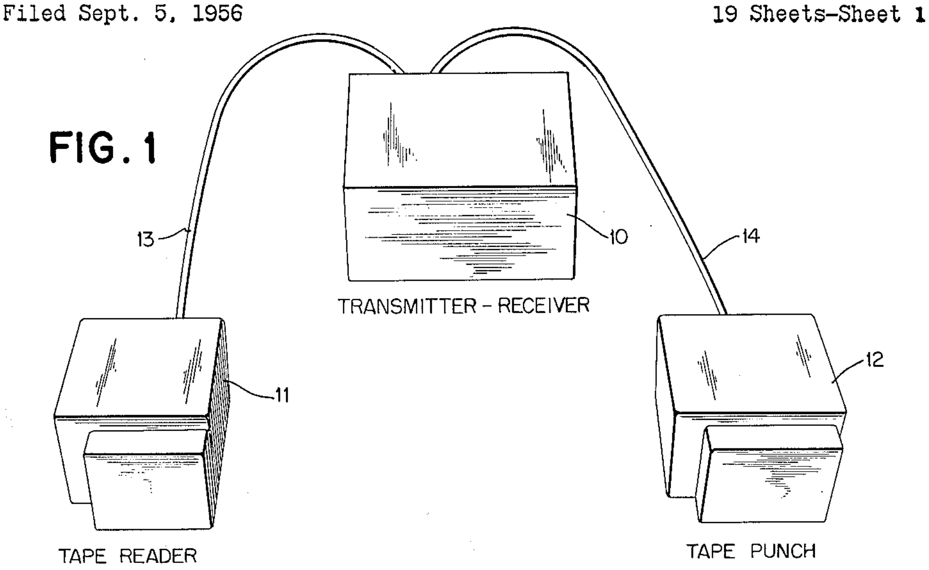
Fig. 1 illustrates three units of interconnected equipment embodying the present invention and comprising the terminal equipment used at each end of a communication system.
Figures 20, 21:
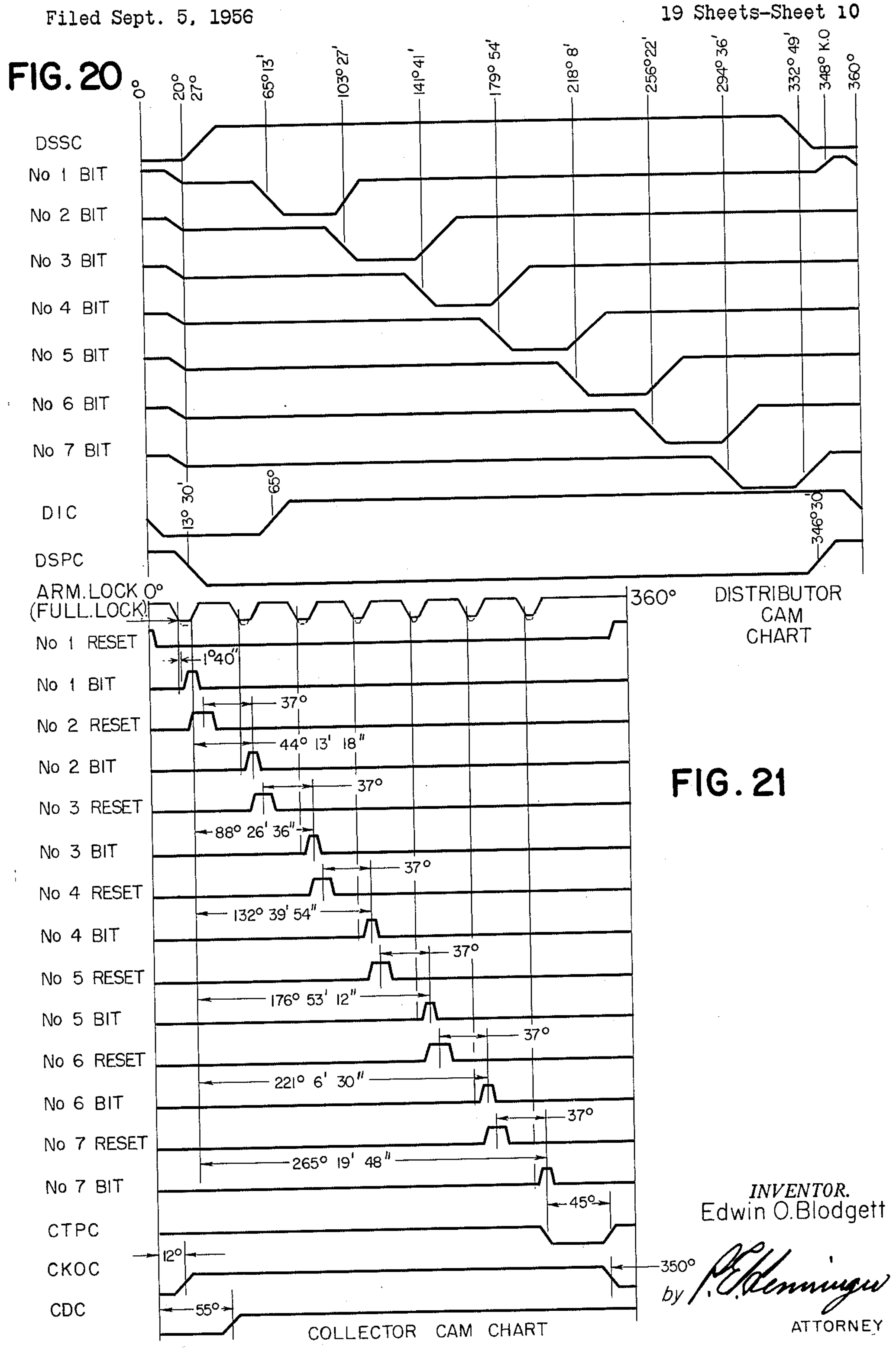
Figure 22:
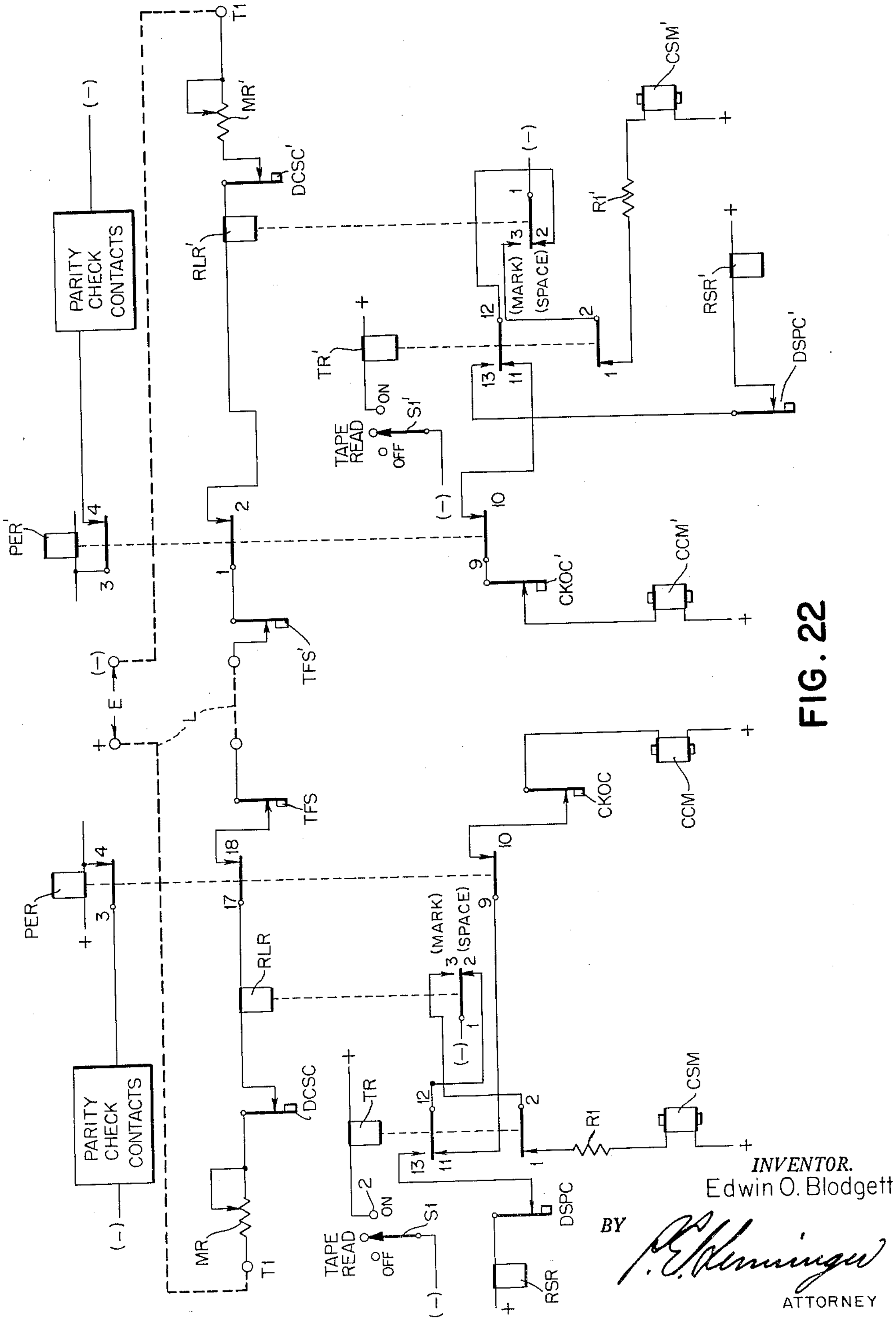
Figure 23:
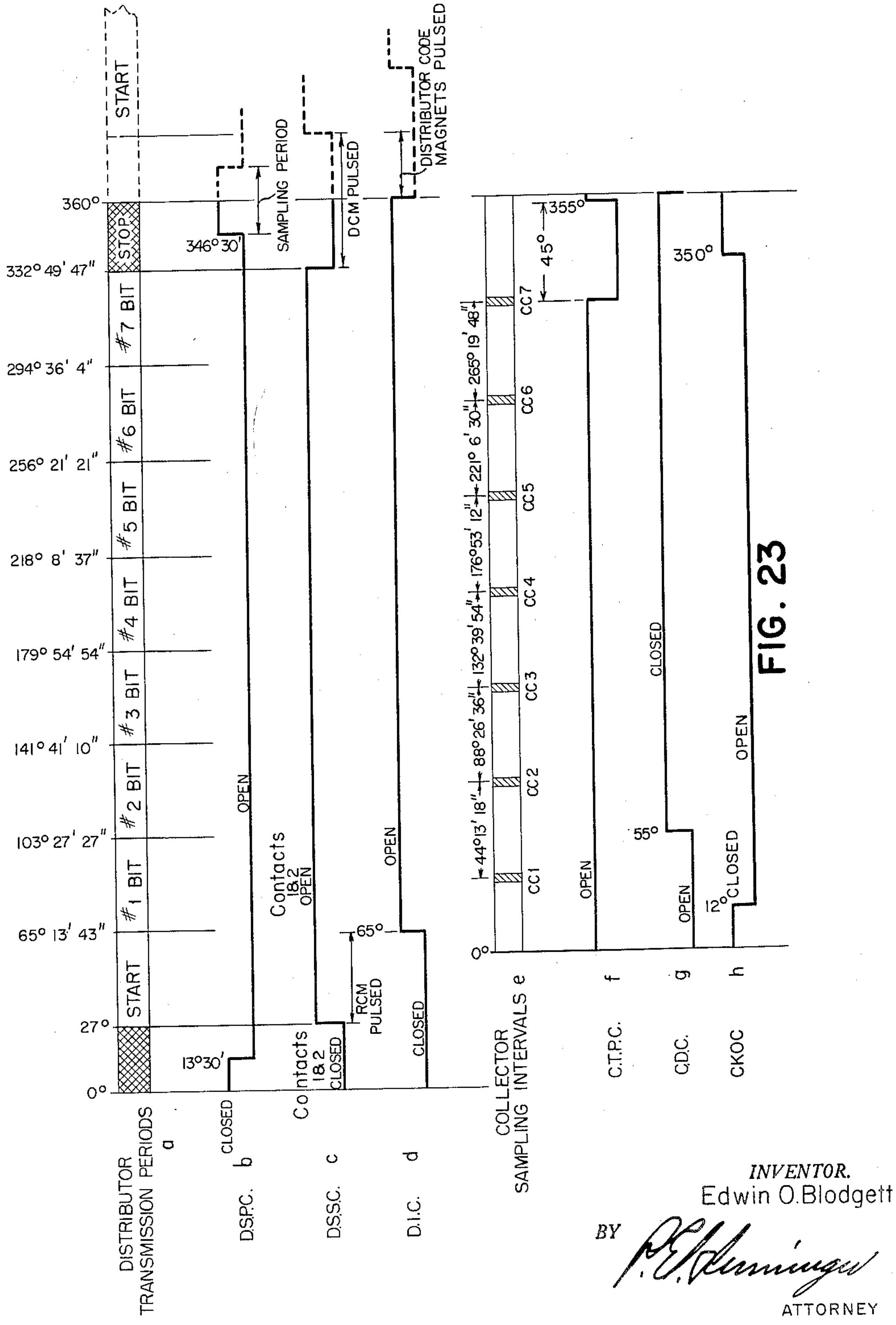
Figure 24:
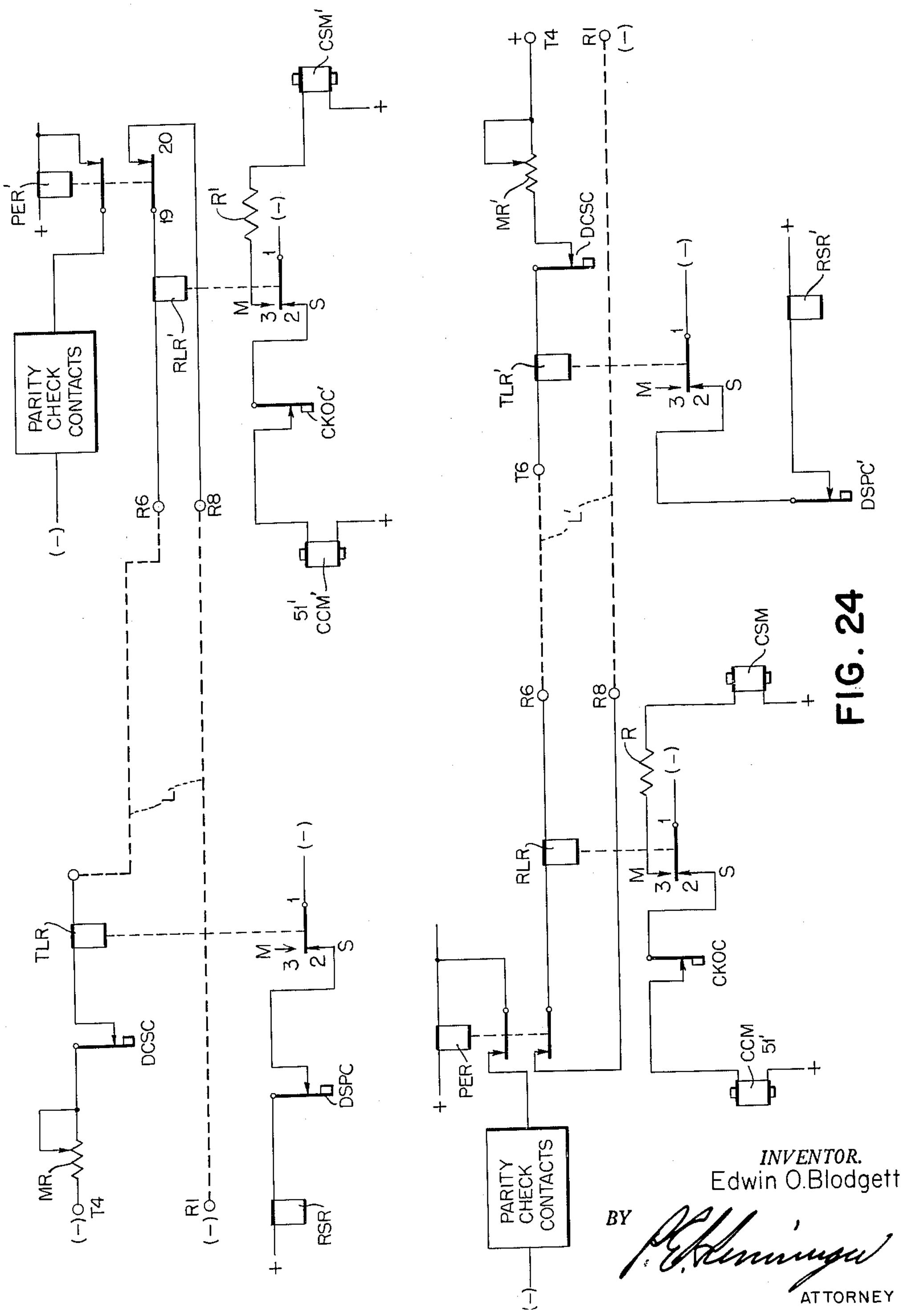
Figure 25A:
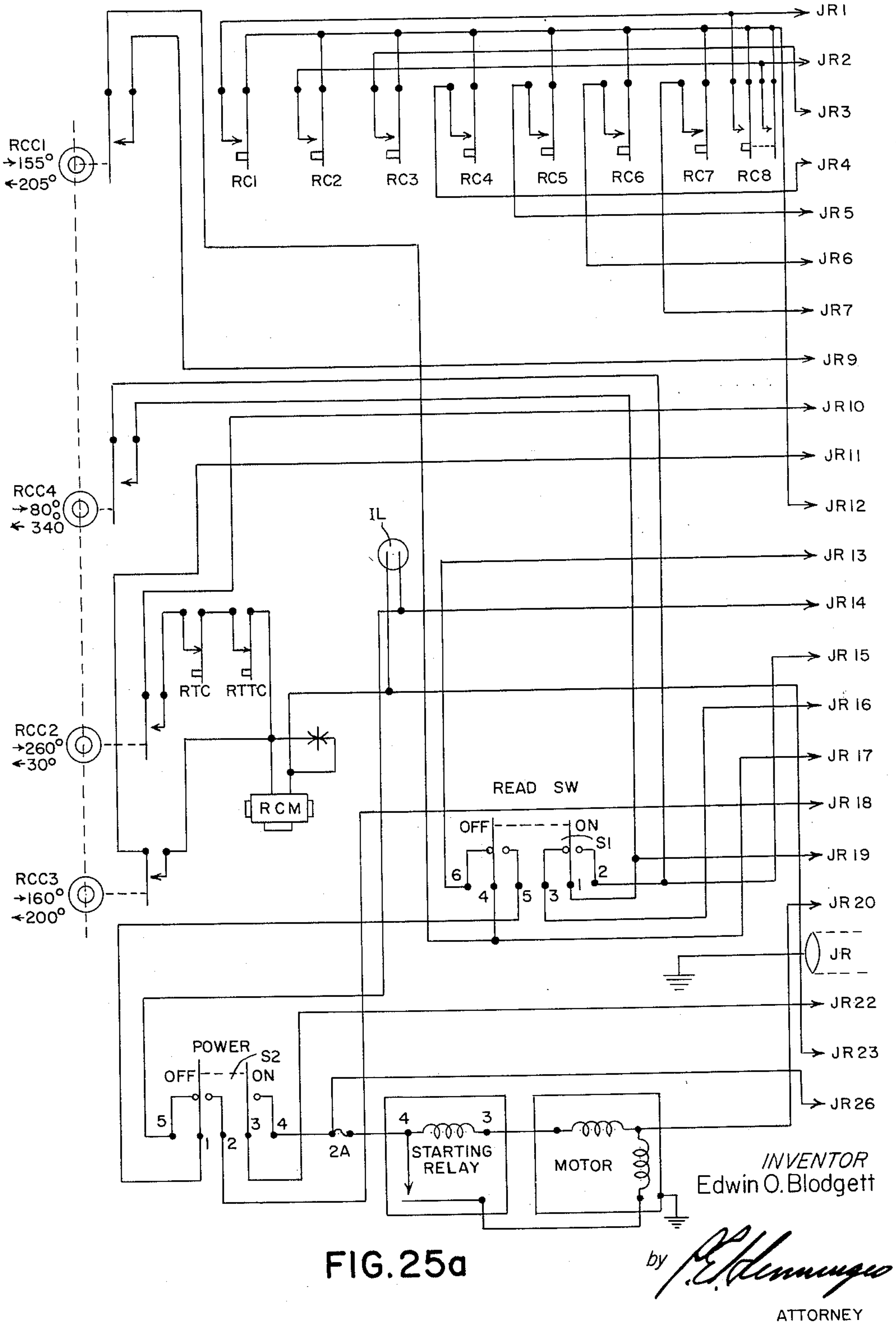
Figure 25B:
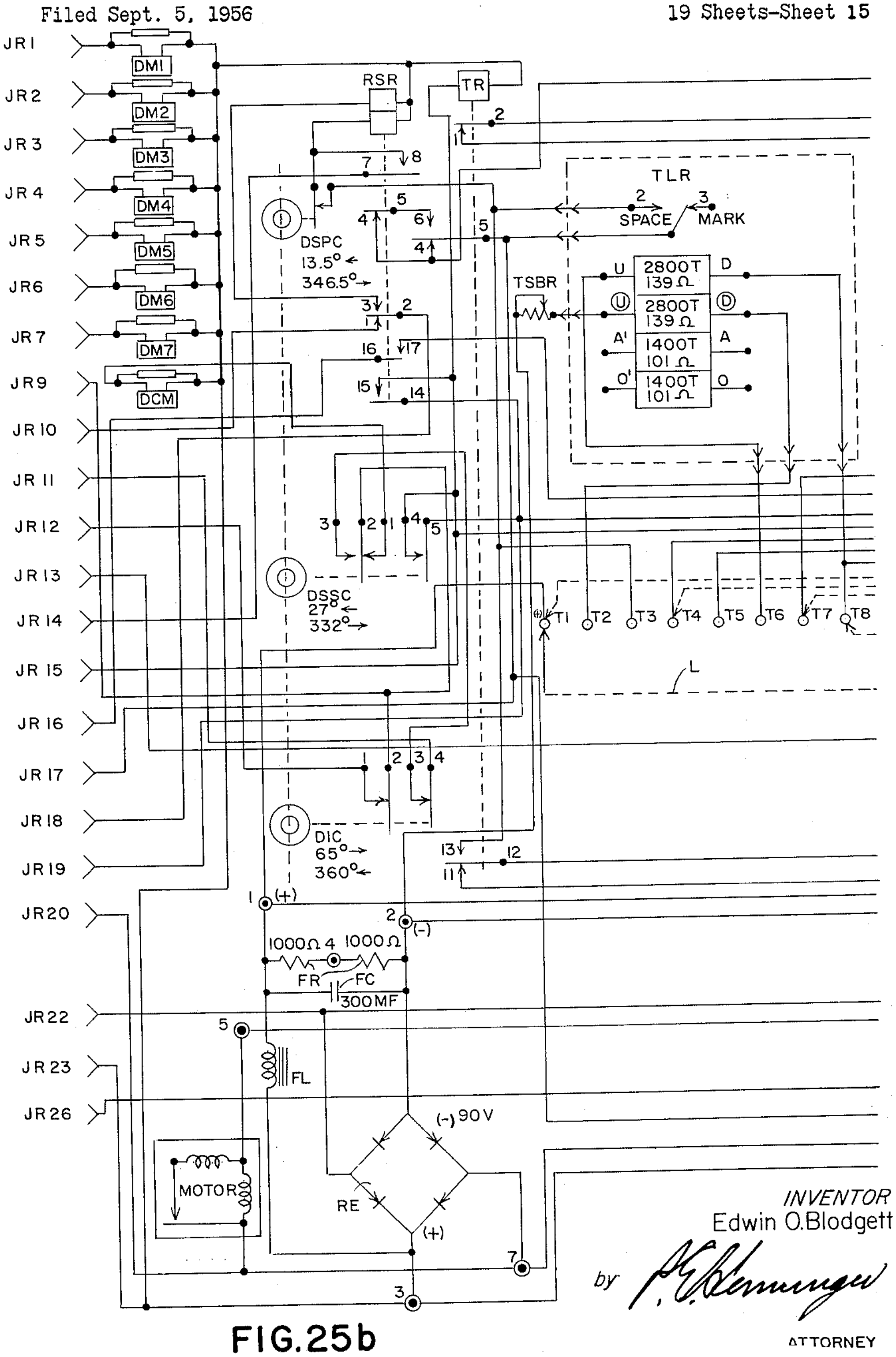
Figure 25C:
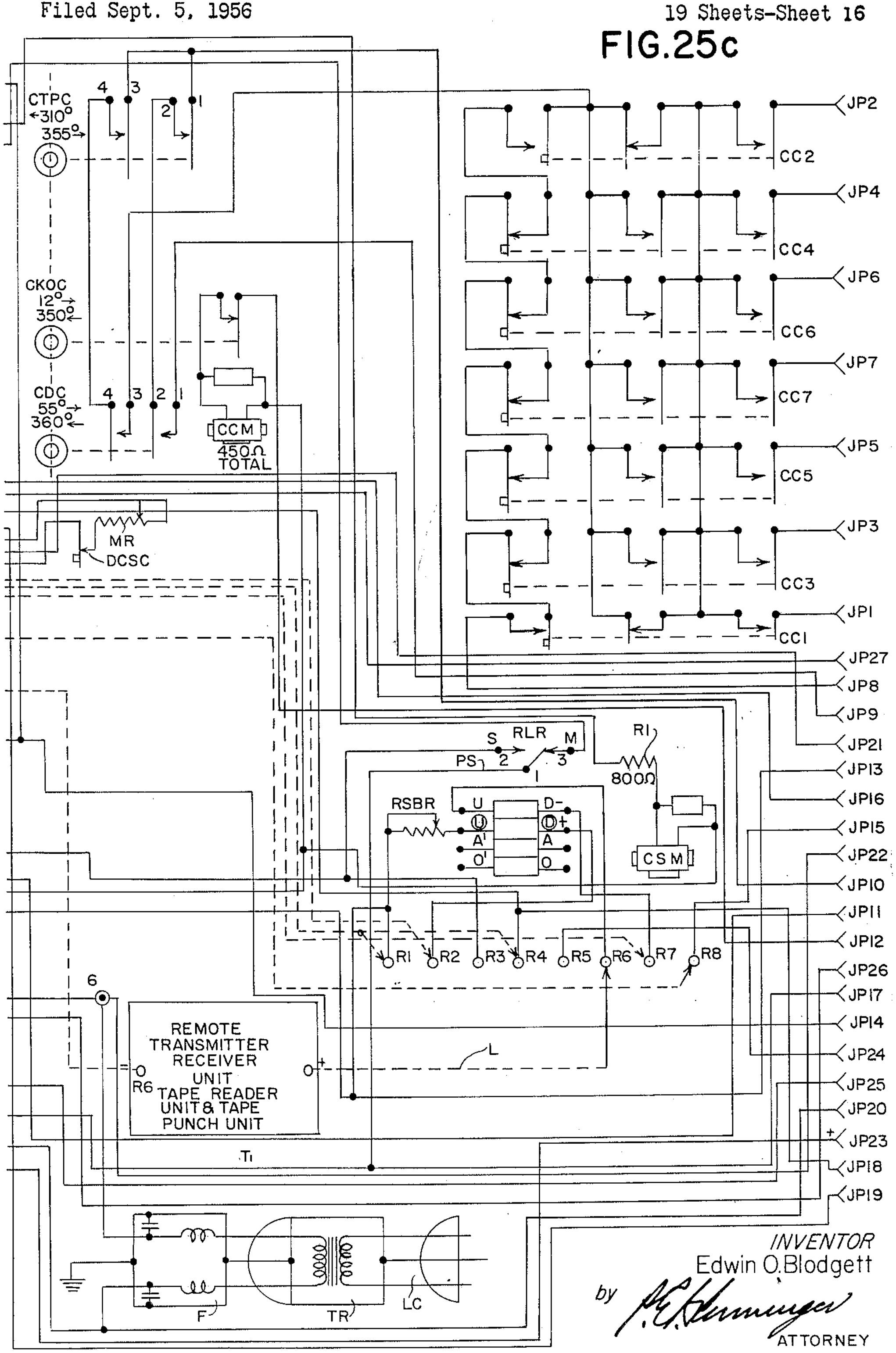
Figure 25D:
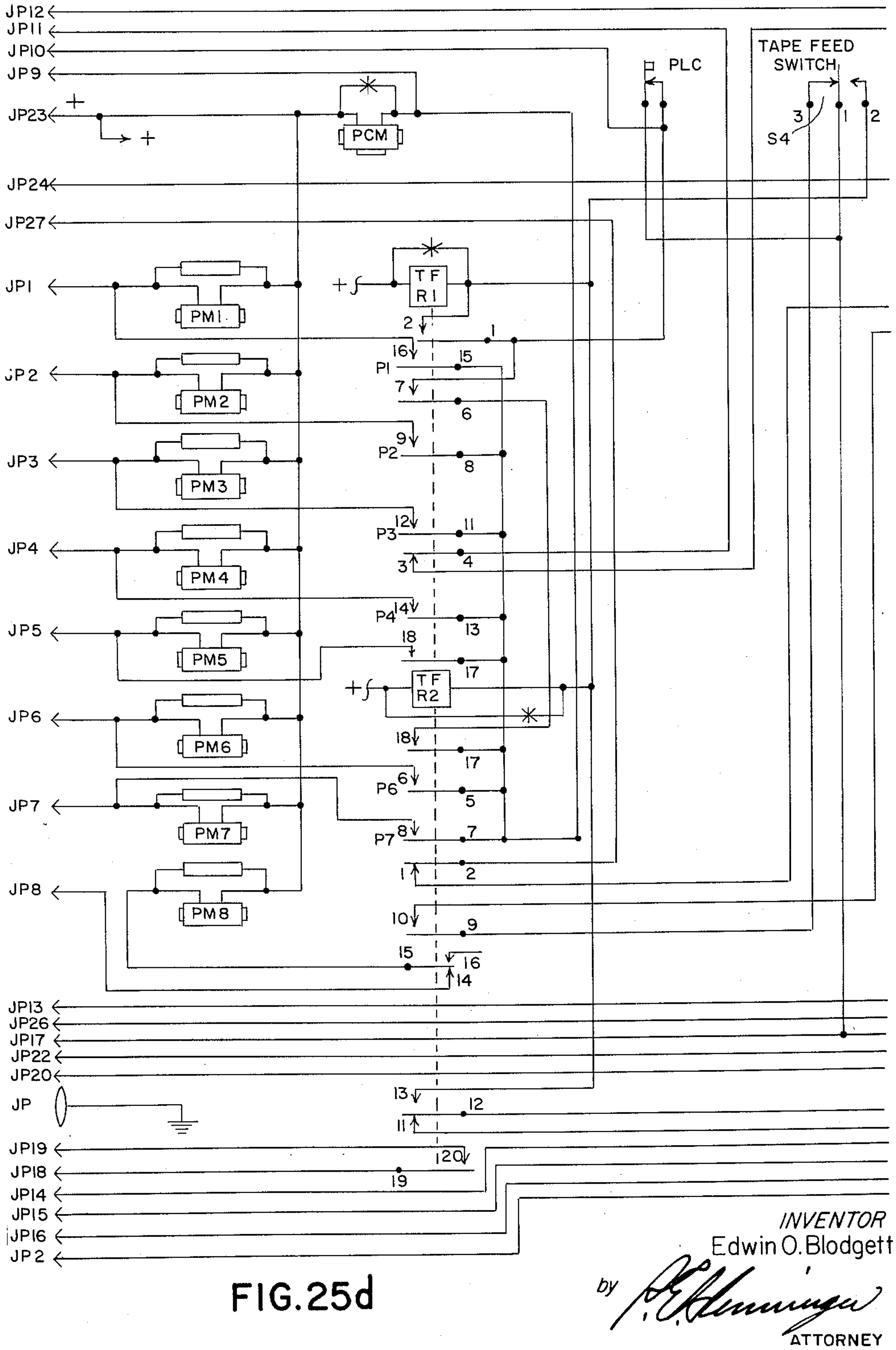
Figure 25E:
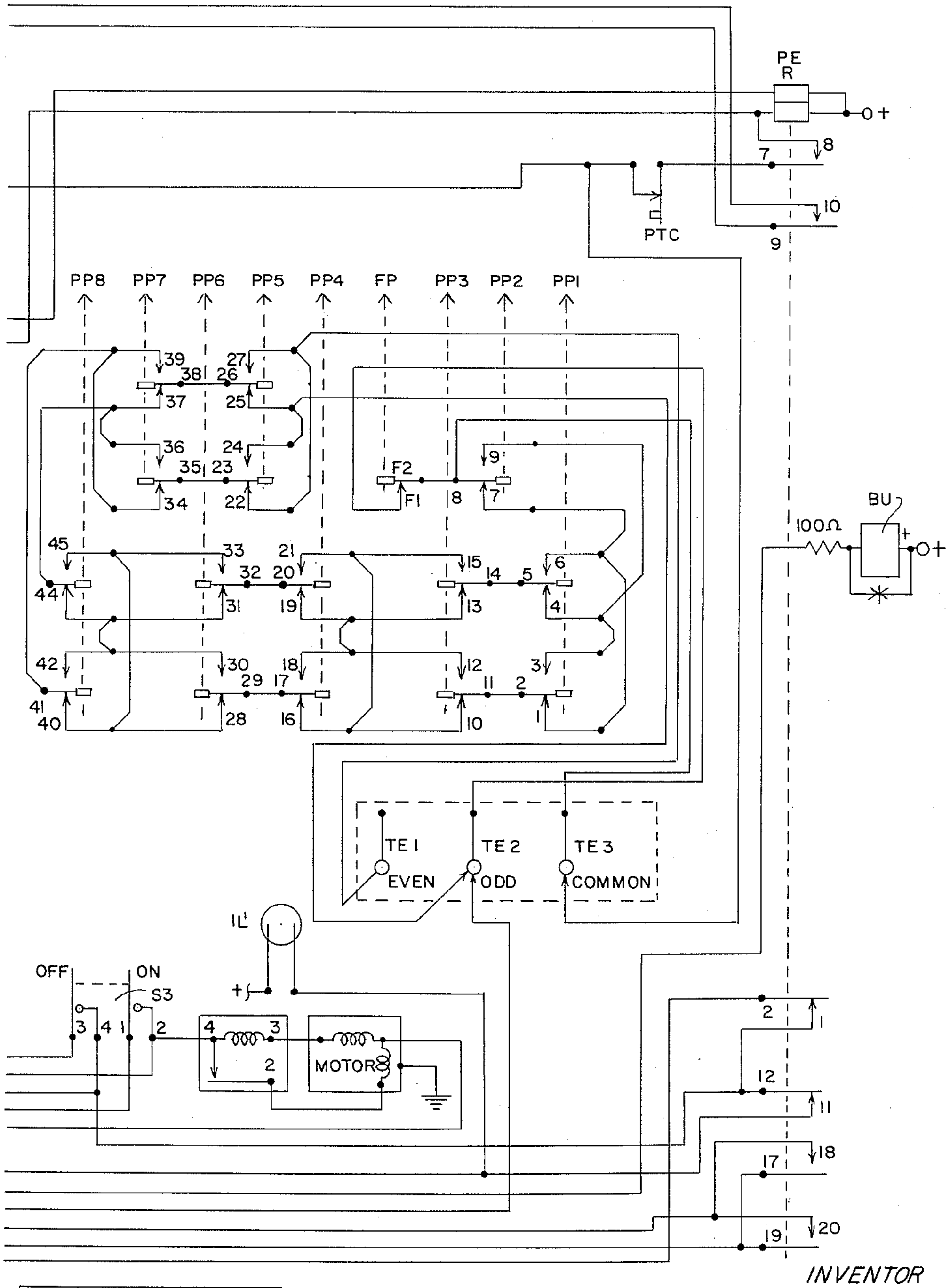
Figure 26:
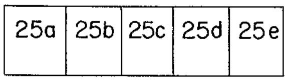

Figs. 17, 18, 18*a* and 19 are fragmentary views illustrating certain features of construction of the code collector;

Fig. 20 graphically represents the interrelated cam timings used in the distributor, and Fig. 21 graphically represents the interrelated cam timings used in the code collector;

Fig. 22 is a simplified circuit diagram of one form of communication system embodying the present invention, and Fig. 23 graphically represents certain timing relationships involved in the operation of the communication system of the invention;

Fig. 24 is a circuit diagram of a communication system embodying the present invention in modified form;

Figs. 25*a*–25*e* represent the complete electrical control and communication circuits of a tape reader unit, transmitter-receiver unit, and tape punch unit embodying the present invention and which comprise the terminal equipment employed at each end of a communication channel as earlier mentioned in reference Fig. 1, and Fig. 26 illustrates the manner in which the latter figures should be considered together as a unitary structure; and Figs. 27–31 represent certain electrical interconnections of transmitter and receiver terminals shown in Figs. 25*b* and 25*c* by which to provide any selected one of a number of possible modes of operation of the communication system.

I. GENERAL ORGANIZATION AND OPERATION

The communication system of the present invention includes a code transmitter unit, a code receiver unit, and a communication channel or circuit interconnecting these units which have such construction and operation as to effect transmission of coded information from one point and its reception and reproduction at a remote point. The code employed for this purpose is of the multi-bit form wherein, as initially developed and as ultimately used, successive groups of parallel or concurrently presented code bits provide individual binary representations of character-print and functional control data information for the ultimate reproduction of information in printed form. A code of this nature is disclosed in copending application Serial No. 535,497, filed September 20, 1955, in the names of Edwin O. Blodgett and Wilbur C. Ahrns, and assigned to the same assignee as the present application. This code may have any desired number of code bits according to the quantity of data information to be translated. A seven-bit or "seven-level" code (such as shown in the aforementioned application) is used by way of example in the transmitter-receiver hereinafter described, which also is described as operating in part in conjunction with code-recorded information in the form of code-punched tape.

As herein disclosed by way of example, the transmitter-receiver unit is used at each end of a wire communication channel to transmit coded information recorded in punched tape to a receiving location where it is again punched into an identical tape. The parallel-recorded code bits forming each code group successively recorded in the input information tape are transmitted sequentially over a single circuit or channel in the same general manner as messages are transmitted by commercial teletypewriting systems. The present invention, however, is particularly adapted to the transmission of data information because of its ability to transmit a larger number of code-bit combinations and its ability to provide a feed-back accuracy check signal.

In one form of the invention, a tape reader unit reads punch-code recorded information from a tape and supplies successive code-bit groups to a transmitter. The transmitter changes each of these plural-bit code groups from a parallel arrangement to a sequential arrangement of the code bits of the group for transmission over a single communication cannnel or circuit. A receiver at the remote location receives and changes the sequentially received code bits of a code group back into parallel form for concurrent presentation to and control of the operation of a tape punch unit. A check is automatically made in the tape punch unit on the accuracy of reception of the code bits as each group thereof is punched into the tape. If an error in the received coded information is detected, a feed-back signal stops the transmission.

The transmission speed of the communication equipment herein described is in a range permitting the use of commercial telegraph wire lines as a transmission medium. Various other channels of communication can be used with the equipment described, however, such as telephone land lines and micro-wave radio communication systems.

In the described form of the invention, the equipment used can conveniently be constructed in three basic units. As shown in Fig. 1 of the drawings, the transmitter-receiver unit 10 provides for both sending and receiving coded information and in a system for bidirectional communication is operated in conjunction with a tape reader unit 11 and a tape punch unit 12 at each end of the communication system. For transmission only, a transmitter operating in conjunction with a tape reader may be used at one location and a receiver operating with a tape punch may be used at a remote location to receive and record the transmission. In this, the transmitter-receiver is conveniently constructed as a single unit but its transmitting and receiving mechanisms are entirely separate and independent and have independent operations so that simultaneous two-way transmissions are permitted when full-duplex communication channels are provided.

The tape reader unit 11 used with the transmitter-receiver unit 10 may be a completely self-contained machine having a construction of the type disclosed in the copending application Serial No. 546,902, filed November 15, 1955, in the name of Edwin O. Blodgett, and assigned to the same assignee as the present application. The tape reader unit is connected by a cable 13 to control the transmitter of the transmitter-receiver unit 10, and the power necessary to operate the reader unit is also obtained through the cable 13 from the unit 10. As will be explained more fully hereinafter, two manual switches are provided on the tape reader unit 11 in addition to an error indicating light. One is a power switch which controls operation of both the reader unit motor and the motor of the transmitter-receiver unit, and the other is a read switch which is for starting and stopping the tape reading operation.

Operation of the tape reader unit is intermittent and is synchronized with the transmitter operation by a feed-back control circuit which impulses a reader clutch during each cycle of operation of the transmitter. The driving speed of the tape reader is faster than the maximum transmission rate of the transmitter, and the reader clutch is impulsed in a manner such that each code is read and stored by the reader contacts before the start of each transmitter cycle. As explained in the aforementioned copending Blodgett application, the tape reader is provided with certain control switches for automatically stopping operation of the reader at the end of a read tape or in the event the tape has become excessively tight or if the tape feed arm is not in proper position. In addition, operation of the tape reader is automatically stopped by the transmitter when the latter receives an error signal from the remote receiving station at the completion of a transmission cycle. When the read switch of the reader unit is manually moved to the Off position, the reader always stops with its code-hole sensing pins in a position permitting tape to be inserted or removed. Moving this switching to the Off position automatically resets the error signal circuits so that the reader can be started when the switch is subsequently moved to the On position. A manual tape feed knob is provided on the tape reader to permit manually moving the tape backwardly or forwardly through the reader.

The tape punch unit 12 also may be a self-contained machine structure of the type disclosed in the aforementioned copending Blodgett application and is connected by a cable 14 to be controlled by the receiver of the transmitter-receiver unit 10. Power for operation of the punch unit 12 also is received from the transmitter-receiver unit through the cable 14.

Two manual switches are provided on the punch unit 12 in addition to an indicating light. One is a power switch which controls operation of both the punch unit motor and the receiver motor. The other is a tape feed switch used manually to feed out leader strips of tape or to delete portions of punched tape.

The driving speed of the punch of the unit 12 is faster than the maximum receiving speed of the receiver of unit 10 so that the punch operates intermittently under the direct control of the receiver of the latter unit. The punch of the unit 12 is provided with parity check contacts constructed and arranged as disclosed in the Blodgett application to be operated directly by the punch pins of the punch to provide an accuracy check of the received and recorded information. When self-checking codes are used of the odd-even type, the parity check contacts can automatically detect an improper punching of codes due either to malfunctioning of the remote transmitter or local receiver equipments or to a code improperly received for some other reason. By "parity" check as herein used is meant a check to ascertain that all codes are of like state; i.e. that all codes are alike in the sense that each is comprised of an odd number of marking bits (or an even number of marking bits if even parity is used). Other tape checking features are also provided for detecting conditions which may cause improper punching of codes in the tape. These include, as more fully explained in the aforementioned copending Blodgett application, switch arrangements for detecting when the supply of tape is nearly exhausted and also for detecting when the tape is excessively tight or the tape feed arm is not in proper position.

Whenever an error in a received code is detected by the parity check contacts of the punch unit 12 or an improper operating condition is detected by the tape checking switches last mentioned, operation of the punch of unit 12 is stopped, a visible and aubible signal is provided by energizing an indicating light and a buzzer provided in this unit, and a feed-back signal is supplied to the distant transmitter to stop further operation of the latter. Operation of the system cannot be resumed until the tape feed switch of the unit 12 is manually operated automatically to reset the checking control system. A manual tape feed knob is provided on the punch of the unit 12 to permit moving the tape backwardly in the punch.

Figure 2:
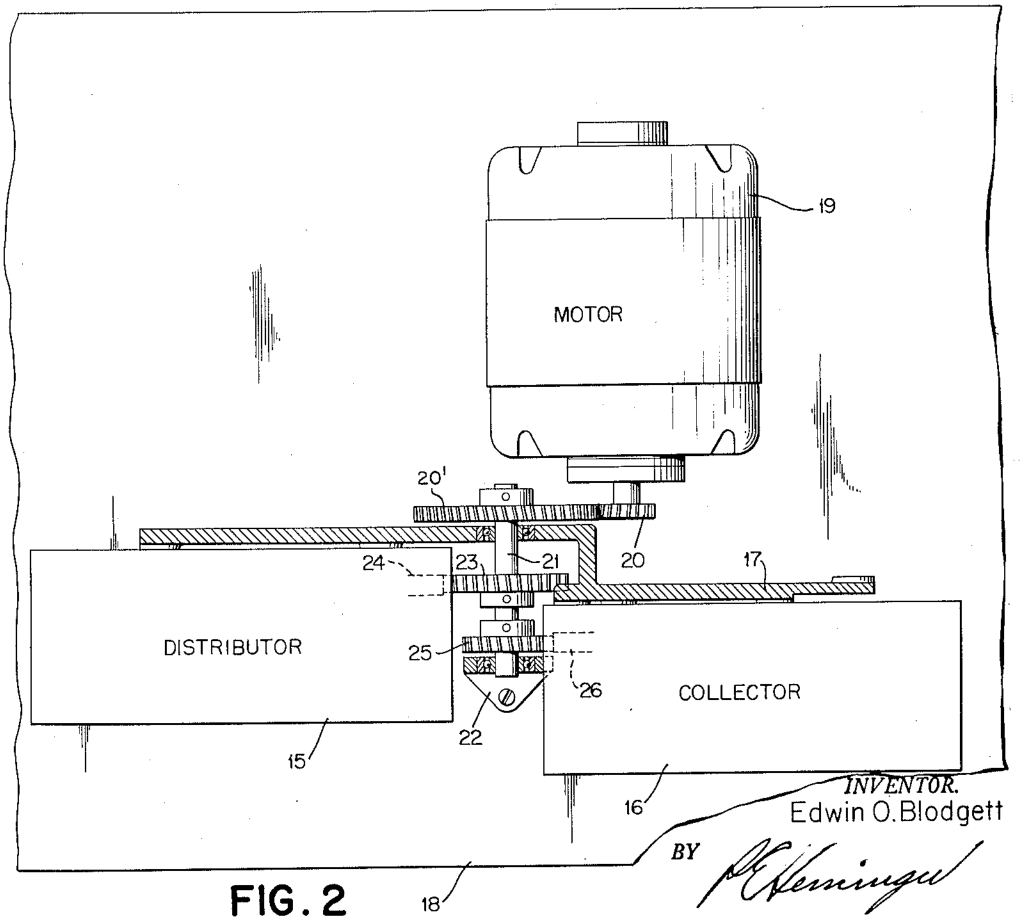
Fig. 2 illustrates a portion of a transmitter-receiver unit of the invention and shows the arrangement and manner in which a code distributor and a code collector are driven from a common drive motor.

As illustrated in Fig. 2, the transmitter-receiver unit 10 includes a transmitting mechanism 15 called a "distributor" as well as a receiving mechanism 16 called a "collector." Both of these mechanisms are mounted upon a casting 17 supported from a base plate 18, and both mechanisms are driven by a single constant speed or synchronous motor 19 mechanically connected by gears 20, 20′ to a countershaft 21 which is journaled in the casting 17 and in support casting 22. The countershaft carries a gear 23 which meshes with a gear 24 of the distributor unit 15 to drive the latter and has a further gear 25 meshing with a gear 26 of the collector unit 16 to drive this unit. As will be explained more fully hereinafter, the distributor unit 15 is driven from the gear 24 through a magnetically controlled clutch whereas the collector 16 is likewise driven from the gear 26 through another and independent magnetically controlled clutch to enable independent transmitting and receiving operations of the transmitter-receiver unit 10. The distributor 15 is an electro-mechanical structure which can be conditioned by a group of concurrently presented code bits and operates temporarily to store each group of code bits presented to it and thereafter sequentially to distribute these temporarily stored code bits into a single transmission circuit. The collector 16 is also an electro-mechanical structure operating in the reverse manner to collect transmitted sequentially arranged code bits from a single circuit and temporarily to retain them until all of the group thereof have been collected and are ready to be supplied concurrently to multiple code bit utilizing circuits.

The distributor 15 is electrically connected to the code bit reader contacts of the tape reader of the unit 11, and these contacts control selective energizations of plural code bit magnets within the distributor to store each successive code group during a transmitting cycle of operation. A short electrical energizing pulse is supplied to all of the distributor code bit magnets simultaneously to store each code group in turn, and this permits the tape reader of the unit 11 to start its next cycle of reading operation during the transmission cycle of the distributor 15 for the previous code group with which it was supplied.

It will be explained more fully hereinafter that the distributor 15 includes a cam shaft which can be connected to the synchronous drive motor 19 through a single-revolution magnetically controlled clutch as earlier mentioned. This clutch is impulsed once for each code group supplied to the distributor so that the cam shaft makes one revolution for each code group transmitted. The impulses to the distributor clutch can occur in any random fashion so long as they do not occur at a faster rate than the continuous driving speed of the distributor. The constant speed of synchronous drive motor 19 is used so that each revolution of the distributor cam shaft consumes a fixed period of time which is a transmission cycle. The several cams on the distributor cam shaft are then arranged so that this transmission cycle is accurately divided into a definite arrangement of time intervals. The first time interval is called a start period which is followed by a series of equal code bit periods, and the last time interval of the cycle is called the stop period.

The distributor 15 also is provided with a single transfer contact connected to select either of two different conditions of the transmission line or communication channel. The line is normally energized with a particular polarity of potential when no code bit is being transmitted and this is called a marking condition. During the start period the distributor always changes this marking condition to a spacing condition, which in a neutral type of transmission system means the line is deenergized and in a polar type of system means the polarity of energization is reversed. Each of the following code bit periods are either marking or spacing conditions according to the code bits stored in the distributor and sequentially transmitted thereby.

A marking condition is always applied to the transmission line during the stop period of the cycle of the distributor. However, the collector at the receiving end of the transmission line or channel can either hold the line closed or can open the line during the stop period to provide a feed-back signal to the sending end respectively indicating either that the preceding code group transmitted was accurately received or that it was received with an error present, or some other abnormal condition existed.

The collector 16 of the transmitter-receiver unit 10 is provided with plural normally open contacts which may be controlled successively to closed position selectively under control of successively received code marking bits of a code group, and these contacts are electrically connected to individual ones of the code bit magnets of the tape punch of the unit 12. The individual contacts in the collector are all so selectively positioned at the end of a receiving cycle, and the code bit magnets controlled by individual ones of the contacts are energized by a short energizing pulse applied through the contacts to all magnets simultaneously. This permits the punch of the unit 12 to complete its operating cycle concurrently with the next cycle of operation of the collector 16.

In particular, the collector 16 includes an individual normally open contact for each bit used in the code, and these contacts are sequentially positioned during each cycle of the collector according to the position of a selector magnet armature. Each contact is operated to a latched open position just before the selective contact positioning operation occurs. This selective positioning operation consumes a very short period of time which is called the bit sampling period. If the code magnet armature is in its attracted position during this sampling period, the contact is released from latched-open position; if the armature is in its released position, the contact is held latched. In this manner each of the code bit contacts is positioned sequentially during the corresponding bit periods of the cycle. Following the sampling period for the last bit of the code, all the contacts have been distinctively positioned in accordance with the particular received code bits of a group and a circuit is thereupon established through these contacts to control the magnets of the punch of the unit 12 during the remaining portion of the collector cycle called the transfer period.

The collector construction is such that the length of the bit sampling period just mentioned is only a small fraction of the total length of the bit transmission period provided by the distributor at the remotely situated transmitter. This permis the sampling period to be shifted within the bit period to a point where an optimum signal exists for various characteristics of transmission channels. A graduated range quadrant is provided for adjusting the sampling period to a position ensuring the maximum range of operation.

The feed-back signal to the distributor of the remote transmitter is selected at the receiving end by controlling the condition of electrical continuity of the transmission line. The feed-back signal is detected at the distributor by a relay during a portion of the stop period of the distributor cycle called the feed-back sampling period. The length of this feed-back sampling period is less than the total length of the stop period and this permits adjustment of the feed-back sampling period within the stop period to a point where an optimum signal condition exists for various characteristics of transmission channels. The distributor is provided with an adjustable quadrant for this purpose.

In addition to the distributor and collector units, the transmitter-receiver unit 10 includes certain components which for simplicity are not shown in Fig. 2 but are later disclosed in connection with the electrical circuit of this unit. These include a direct current power supply for the transmission line as well as for the tape reader unit 11 and the tape punch unit 12, line relays, and other like electrical components used in the overall communication system. The unit 10 includes no manual switches since its operation is entirely under the control of the tape reader unit 11 and tape punch unit 12. The unit 10 is preferably provided with sufficient terminals to permit half-duplex or full-duplex types of line connections to be made without altering the internal wiring of the unit. It will be apparent that the unit 10 can be assembled as a transmitter only by omitting the collector 16 and electrical components associated therewith and hereinafter described, or it can be assembled as a receiver only by omitting the distributor 15 and its associated electrical components.

By suitable selection of the gear ratio of the gears 20 and 20', distributor and collector speeds and nominal code transmission speeds may readily be provided in accordance with Table A following:

*Table A*

| Line Frequency Dots Per Sec. | Nominal Transmission Speed Codes Per Min. | Distributor Speed, r.p.m. | Collector Speed, r.p.m. | 1,800 r.p.m. Motor Gear 20 | Drive Shaft Gear 20 | Countershaft Speed, r.p.m. |
|---|---|---|---|---|---|---|
| 22.685 | 289 | 289.082 | 334.3999 | 22 Teeth | 135 Teeth | 293.3 |
| 28.357 | 361 | 361.3526 | 418 | 22 Teeth | 108 Teeth | 366.6 |
| 37.037 | 472 | 471.9585 | 545.9449 | 29 Teeth | 109 Teeth | 478.9 |
| 44.699 | 570 | 569.6051 | 658.899 | 35 Teeth | 109 Teeth | 578 |

II. CODE DISTRIBUTOR CONSTRUCTION

The construction of the code distributor is shown in Figs. 3–9, and it will be seen that the distributor is a self-contained unit having all of its components assembled between a back casting 31 and a front casting 32. The latter is secured by machine screws 33, and is positioned by locating dowels 34, on an outwardly extending portion 35 integrally formed at the bottom of the back casting 31. The two castings 31 and 32 are otherwise held together by a contact mounting plate 36 and a guide plate 37.

A clutch shaft 38 and a cam shaft 39 extend between the back and front castings 31 and 32, and both shafts preferably are journaled in the castings in sealed ball bearings. The clutch shaft 38 has freely journaled thereon the drive gear 24 which meshes with the driving gear 23 as described in connection with Fig. 2. The drive gear 24 has a hub positioned within and forming a component of a helical spring clutch 42 of the 360° type corresponding to that shown and described in detail as Figs. 5, 6 and 7 of the aforementioned copending Blodgett application (the gear 24 of the present arrangement replacing the pulley 32 of the arrangement last mentioned). Briefly considered, this 360° or single-revolution clutch 42 includes a spirally wound spring which overlaps the hub portion of the drive gear 24 and a portion of a driven hub 43 having the same diameter as the gear hub portion. One end of the spiral spring is anchored in a slot in the driven hub while the opposite end of the spring engages an inward projection on a clutch sleeve 44. The inside diameter of the spiral spring is such that when the sleeve 44 is free, the spring will engage both the hub portion of the drive gear 24 as well as the driven hub effectively to interconnect these parts with a self-energizing friction action whereby the drive gear 24 is positively mechanically connected to the driven hub. The driven hub is mounted for radial adjustment by set screws 45 to the clutch shaft 38. The center portion of the clutch sleeve 44 is provided with an outwardly extending lip 46, shown more clearly in Figs. 5 and 6, which is engaged by the extension 47 of a clutch armature 48 mounted to turn about a pivot shaft 49 carried by a subassembly frame member 50. This and certain other details described below will perhaps be more readily apparent by inspection of Fig. 13 which illustrates in exploded view the very similar clutch construction employed in the code collector. The drive gear 24 turns counterclockwise as viewed in Figs. 3 and 6 which, when the armature 48 is in its deenergized position, causes the lip 46 of the clutch sleeve 44 to engage the armature extension 47 and unwind the clutch spring to a point where there is no effective coupling between the drive gear 24 and the clutch shaft 38. Electromagnets DCM, mounted upon the subassembly frame member 50 are provided for moving the clutch armature 48 to an energized position where its extension 47 is out of the path of movement of the lip 46 of the clutch sleeve so that the latter can turn slightly in a counterclockwise direction and thereby allow the clutch spring effectively to couple the drive gear 24 to the driven hub 43. When the driven hub 43 and the clutch sleeve 44 have made one revolution, the lip 46 of the clutch sleeve will engage the extension 47 of the clutch armature 48 if the latter is in deenergized position at that time and the clutch sleeve 44 in being thus brought to a halt unwinds the clutch spring to disengage the clutch shaft 38 from the drive gear 24.

A detent cam 52 is fixedly mounted on the clutch shaft 38 and coacts with the end of a detent arm 53 which is pivotally supported on the shaft 49 and is biased by a spring 54 to detent engagement with the cam 52. When the clutch is disengaged by the sleeve lip 46 engaging the extended end 47 of the armature 48, the clutch shaft 38 will overtravel by inertia to a point where the ledge of the detent cam 52 passes by the end of the detent arm 53 which thereupon moves to detent position by action of the spring 54 and thus halts the clutch shaft 38 against return movement in the opposite direction. This overtravel movement of the clutch shaft 38, after clutch disengagement by the sleeve lip 46 engaging the armature extension 47, is limited by an overtravel stop member 56 (Fig. 5) mounted by one or more set screws 57 for angular adjustment on the driven hub 43 and cooperating with a slot 58 provided in the clutch sleeve 44. The released or unactuated position of the clutch armature 48 is determined by a bendable armature stop member 60 the lower end of which is turned in to engage the end of the armature as shown. The stop member 60 should be adjusted such that the extended end 47 of the armature 48 in released position just clears the outside surface of the clutch sleeve 44 and thus avoids the development of any frictional force between the armature extension 47 and the clutch sleeve 44 during released movement of the latter.

The clutch armature subassembly is provided with a mechanical knock-off structure which includes a bail 61 pivotally supported upon the pivot shaft 49 and having an arm 62 pivotally supporting at its lower end a cam follower roller 63 engaging the overtravel stop member 56 and operated by a cam portion 64 on the periphery of the latter. The knock-off bail 61 is biased by a spring 59 into cam engaging relation with the member 56 and has an inturned end portion 65 which overlaps the end of the armature 48 as shown to provide positive armature knock-off just prior to the completion of each clutch cycle.

The clutch armature subassembly frame member 50 is pivotally mounted on the rear casting 31 by a machine screw 67, and is retained in an angularly adjustable position by a screw 68 extending through a short slot (not shown) in the member 50 to adjust the angular position of the armature structure such that the tip of the armature extension 47 when the armature is in actuated or attracted position clears the high point of the lip 46 of the clutch sleeve 44. The clutch armature 48 is provided with an extended arm 70 to which is attached a spring 71 for biasing the armature to its unactuated or released position. The spring 71 is affixed at its opposite end to a link 72 which is pivoted at 73 to the subassembly frame member 50, and positional adjustment of the link 72 is provided by adjustment of a screw 74 threaded through the frame member 50 and locked in position by a lock nut 75. The angular adjustment of the link member 72 enables adjustment of the tension of the spring 71 to provide the proper value of biasing force exerted on the armature 48 for the required speed of operation of the latter.

A driven gear 77 is pinned to the clutch shaft 38 and engages a gear 78 which is mounted on the cam shaft 39 and is angularly adjustably fixed to the latter by set screws threaded through a hub (not shown) of the gear 78. This adjustment is for purposes of adjusting the 0° or home position of the cam shaft with relation to the single revolution clutch mechanism last described. The gears 77 and 78 have a one-to-one gear ratio so that the clutch shaft 38 and cam shaft 39 move at the same angular velocity. As shown more clearly in Figs. 4 and 9, the center portion of the cam shaft 39 has pinned thereto a plurality of cam sections integrally formed by machining from a solid piece of metal. These cam sections include a start-stop cam 80, a plurality of cam sections 81–87 individual to each of the bits of code to be transmitted, and an "intermediate" cam 88. Also mounted on the cam shaft 39, but on the opposite side of the gear 78 from the cam 88, is a sampling period cam 90. Both the intermediate cam 88 and the sampling period cam 90 are mounted on the cam shaft 39 with set screws for adjusting their angular position on the cam shaft, but the cam structure comprising cams 80–87 is permanently pinned to the cam shaft 39 by a pin 89 (Fig. 6).

Figure 4:
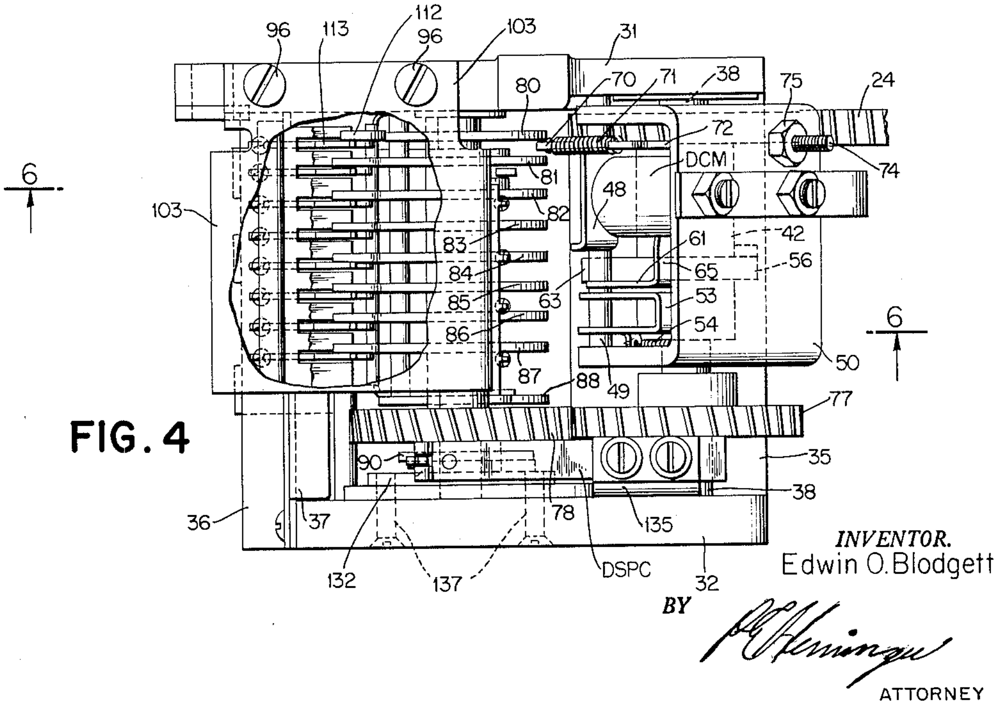
Figure 5:
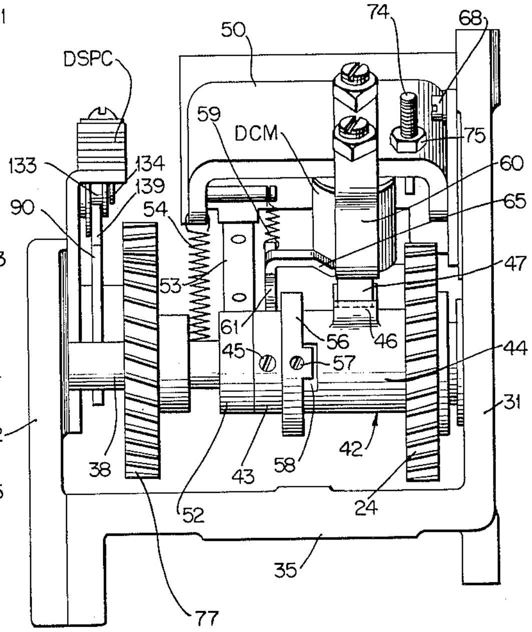

An individual cam follower is provided for each of the cam sections 81–87. As illustrated more clearly in the cross-sectional view of Fig. 6 showing the cam section 81, each such cam follower is comprised by a cam follower arm 92 pivoted on a pivot shaft 93 and pivotally supporting at an intermediate point a cam follower roller 94 which is biased into engaging relation with its associated cam section (i.e. the cam section 81 in Fig. 6) by a spring 94 which is connected between an extension 95 of the arm 92 and the comb frame 37 having upper and lower slots 97 for guiding the cam follower arm 92 during its limited angular motion. The upper end 98 of each cam follower arm 92 may be engaged by a latch notch 99 of an armature 100 individual to each latch arm 92. Each of the armatures 100 is provided with a transverse slot 101 for pivotal engagement with a pivot member 102 affixed to an armature frame 103, and is normally biased to nonactuated position by a spring 104. Each of the armatures 100 is actuated by an individual distributor electromagnet DM, whereby each of the latter controls the operation of an individual associated one of the cam follower arms 92 in a manner presently to be explained more fully. The electromagnets DM and their associated armatures 100 are mounted in staggered relation in the frame 103 with the ends of alternating ones of the armatures 100 positioned in overlapping relation but with their notches 99 aligned. During rotation of the cam shaft 39 from its 0° or home position shown in the several figures, the upper end 98 of each cam follower arm 92 is engaged by the notch 99 of an associated armature 100 if the latter remains in deenergized position, thus restraining movement of the cam follower arms 92 toward their associated cam section. Upon energization of an electromagnet DM, however, its associated armature 100 moves to actuated position thereby to unlatch the upper end 98 of the associated cam follower arm 92 and permit the cam follower roller 94 to follow the profile of its associated cam section. The armature frame 103 is mounted on the back casting 31 by suitable mounting screws 96 as shown in Fig. 4.

Figure 6:
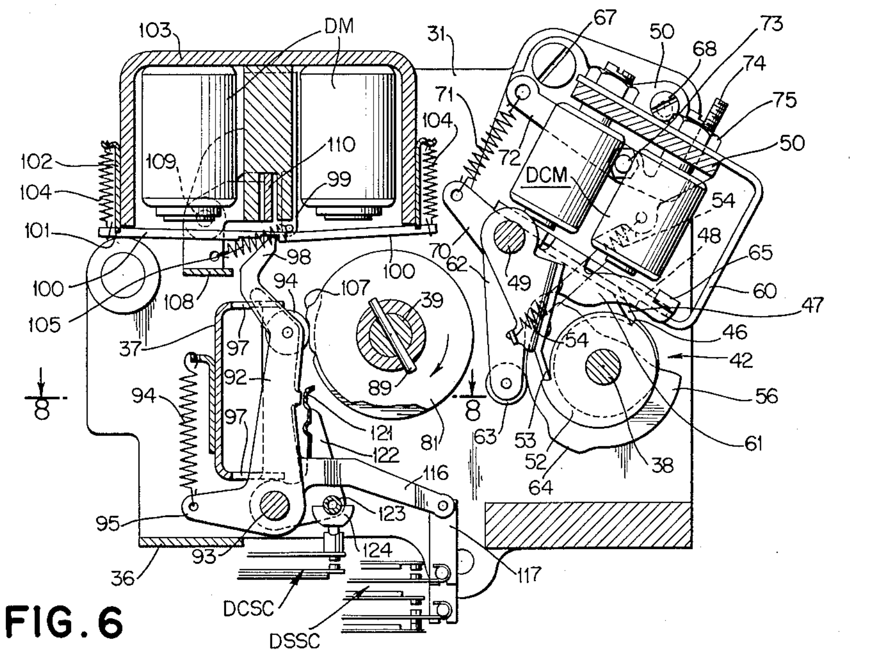
Fig. 6 is a side elevational view in cross-section illustrating certain details of construction of the code distributor.

The cam section 81 corresponds to the number one code bit, and is provided with a knock-off cam portion 107 so positioned that near the completion of a cycle of rotation of the cam shaft 39 the knock-off cam portion 107 moves the associated cam follower arm 92 an extra amount counterclockwise as seen in Fig. 6 beyond its normal latching position. This causes the upper end 98 of this particular cam follower arm 92 to engage a knock-off bail 108 which is pivoted at 109 and includes a bail portion 110 overlying the ends of all of the armatures 100, but normally biased by a spring 105 out of engagement with the latter, forcefully to engage and move all of the armatures away from the magnetic core surface of their associated electromagnets DM.

Figure 7:
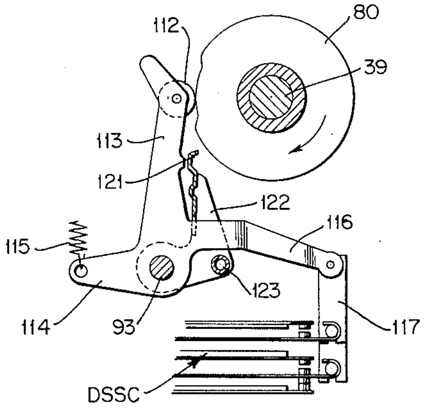
Figs. 7 and 8 are fragmentary cross-sectional views showing additional constructional details of the distributor.

As shown more clearly in Fig. 7, the start-stop cam 80 is engaged by a cam follower roller 112 pivotally supported on a cam follower arm 113 which is pivoted on the pivot shaft 93 and has both a rearwardly extending arm 114 to which a bias spring 115 is connected (the other end of the spring being connected to the frame 37 in the manner shown for the spring 94 in Fig. 6) and a forwardly extending arm 116 which actuates a distributor stop-start contact DSSC through an electrically insulating link member 117.

Figure 8:
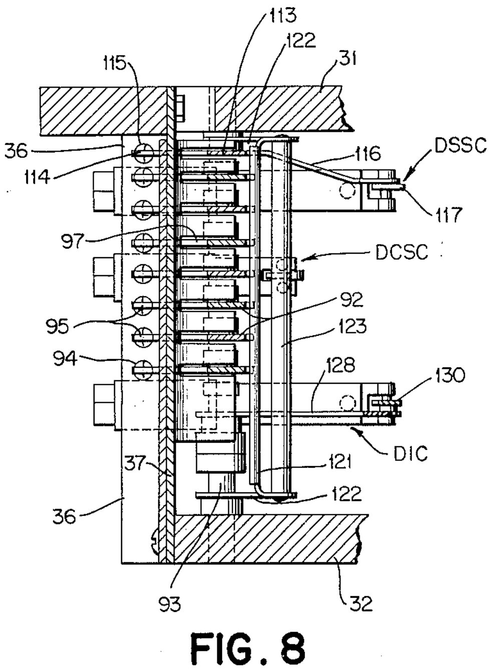

All of the cam follower arms 92 and the start-stop cam follower arm 113 upon movement into the depressed cam portion of their associated cams engage and operate a cam follower bail 121 which extends transversely of these arms as shown more clearly in Fig. 8 and is supported at each end by an arm 122 pivoted on the pivot shaft 93. An actuating bar 123 extends between the arms 122 and actuates a distributor code selector contact DCSC, located near the center of the bar 123, through an intervening electrical insulating saddle member 124.

Figure 9:
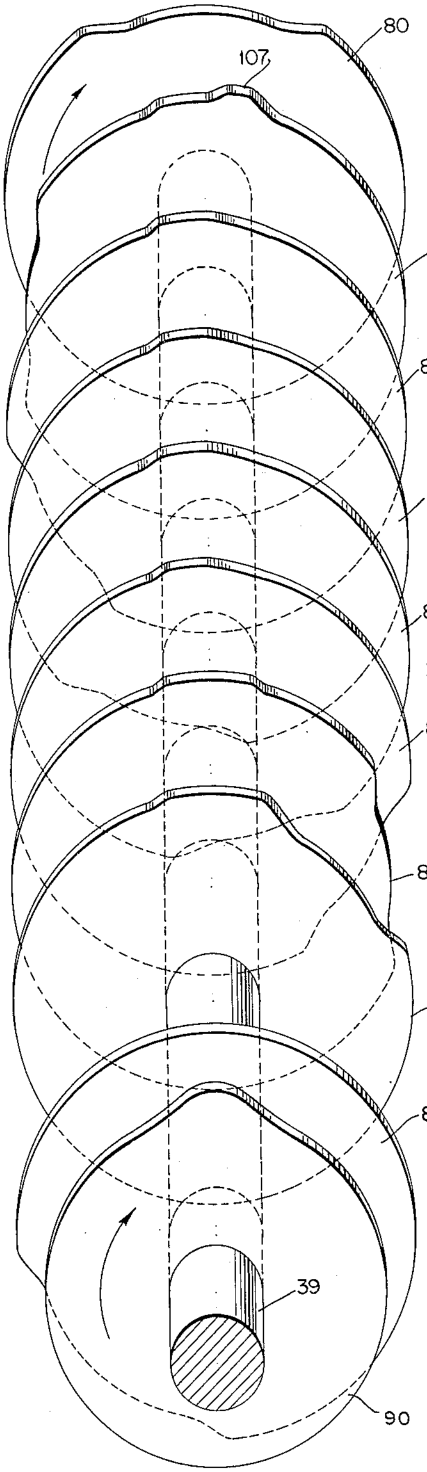
Fig. 9 illustrates in isometric view certain related cam configurations employed in the code distributor.

It will be apparent from the construction just described that upon latch release of any of the cam follower arms 92 by its associated armature 100, subsequent clockwise movement of the arm 92 about its pivot point 93 in following the contour of its associated cam causes the arm to engage the bail 121 and thereby actuate through the bail structure the contactor DCSC. Fig. 9 is an isometric view of the cams 80 and 88 and the cam sections 81–87 and it will be noted that the depressed cam portions of the cam sections 81–87 are of the same angular length and the depressed portion of each cam section is displaced by the same angle from that of the preceding and succeeding cam section. It will be apparent from this that any of the latch-released cam follower arms 92 are permitted to move in succession clockwise about the pivot shaft 93 as the cam structure rotates through each cycle, and each such moving cam follower arm in its turn actuates the cam follower bail 121, 122 to close the contacts DCSC for a uniform period of time called the bit interval. The cam section configurations are such that there are seven equal bit intervals between approximately 65° and 332° of the cam shaft rotation. The depressed cam portion of the start-stop cam 80, on the other hand, is arranged to provide a start interval equal to a bit interval and a stop interval following the last bit interval which is in this particular form equal to 1.417 times a bit interval. This stop interval is represented in Fig. 23 as being partly at the beginning and partly at the end of a cycle. Specifically, the start-stop cam operates through its follower arm 113 to actuate the bail 121, 122 to close the contacts DCSC from approximately 0° to 27° and again from 332° to 360° of the cam shaft cycle. This provides a "stop" or "mark" period ending one distributor cycle and beginning the next, and enables use in the transmission system of an error "feed back signal" as will be explained more fully during the description of the system operation. During the interval from approximately 27° to 65° of the cam shaft rotation, no cam or cam section permits closure of the contacts DCSC and this provides a "start" or space interval signifying the beginning of each code-bit group transmission. These several timing relationships are shown more clearly in the distributor cam chart of Fig. 20.

The information to be transmitted is applied to the distributor as successive groups of concurrently presented code bits, each such code bit of a group controlling an individual one of the electromagnets DM to maintain latched or to unlatch a corresponding one of the cam follower arms 92. As indicated in the cam chart of Fig. 20, following the code bit interval established by the depressed cam portion of each cam section the associated cam follower arm is moved or restored to a position where it is fully below the notch 99 of its associated armature 100 but slightly out of latching contact with the notch. The cam follower arms are all retained in this position at the end of one distributor cycle and into the first ten or twelve degrees of the next cycle, and thus leave the armatures 100 free of any latching restraint during the initial portion of the interval from 0° to 65° of the distributor cycle when the electromagnets DM are selectively energized in accordance with the marking bits of an applied group of coded bits and move their associated armatures to energized position. At the end of ten or twelve degrees of a new distributor cycle, the cam sections 81–87 permit their associated cam follower arms 92 to move either into latched engagement with the latching notch of an associated deenergized armature or beyond latching engagement in the case of an associated energized armature. Thus the concurrent application of the code bits of a group thereof to the magnets DM causes concurrent unlatching of all cam follower arms 92 corresponding to the marking bits of the code group and concurrent latching of all other cam follower arms in correspondence with the spacing bits of the code group, so that the code bits concurrently presented in parallel to the electromagnets DM are converted to a serial-bit code presentation for transmission by operation of selective actuation of the distributor code selector contact DCSC under control of the successively operated cam follower arms 92 by their associated cams.

Figure 3:
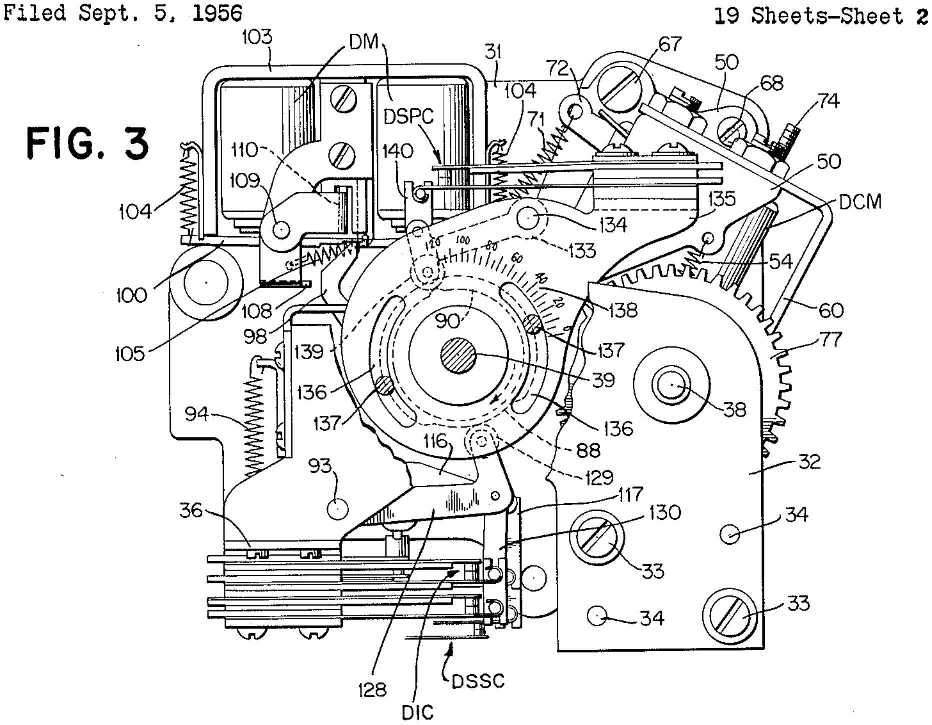
Fig. 3 illustrates in side elevational view, Fig. 4 in plan view, and Fig. 5 in end elevational view a code distributor mechanism embodying the present invention.

As shown more clearly in Fig. 3, the cam 88 actuates a cam follower arm 128 pivoted on the pivot shaft 93 and having a cam follower roller 129 maintained in engagement with the cam 88 by a bias force exerted through an electrically insulating link member 130 from the movable contact elements of a distributor intermediate contact DIC which the cam 88 and cam follower arm 128 actuates. The intermediate cam 88 is provided with a collar and set screw threaded therethrough (not shown for simplicity) by which to adjust the angular position of this cam on the cam shaft 39 and thereby adjust the operating interval of the distributor intermediate contact DIC with relation to the interval of first possible actuation of the distributor code selector contact DCSC through action of the cam 81 and its associated cam follower arm 92.

Also as shown more clearly in Fig. 3, the sampling period cam 90 actuates a cam follower arm 133 which is pivoted at 134 on a quadrant 135. The quadrant 135 is adjustable angularly about the cam shaft 39, and for this purpose is provided with a pair of circumferential slots 136 through which machine screws 137 are threaded into a clamping plate 132 (Fig. 4) for clamping the quadrant 135 in a desired position of angular adjustment against the front casting 32. Any given position of adjustment of the quadrant 135 is indicated by a scale 138 provided on the quadrant, a cooperating scale reference indicia (not shown) being provided on the top edge of the casting 32. The cam follower arm 133 is provided with a cam follower roller 139 engaging the cam 90, and is mechanically coupled through an electrical insulating link member 140 to actuate a distributor sampling period contact DSPC mounted on the quadrant 135 as shown. The movable contact element of the contact DSPC exerts a biasing force through the link member 140 to maintain the cam follower roller 139 in engagement with its associated cam 90. It will be apparent that the structure just described enables the quadrant 135 to be so angularly adjusted as to adjust the sampling period, provided by operation of the contact DSPC, with relation to the home position of the cam shaft 39.

III. CODE COLLECTOR CONSTRUCTION

Figures 10, 11:
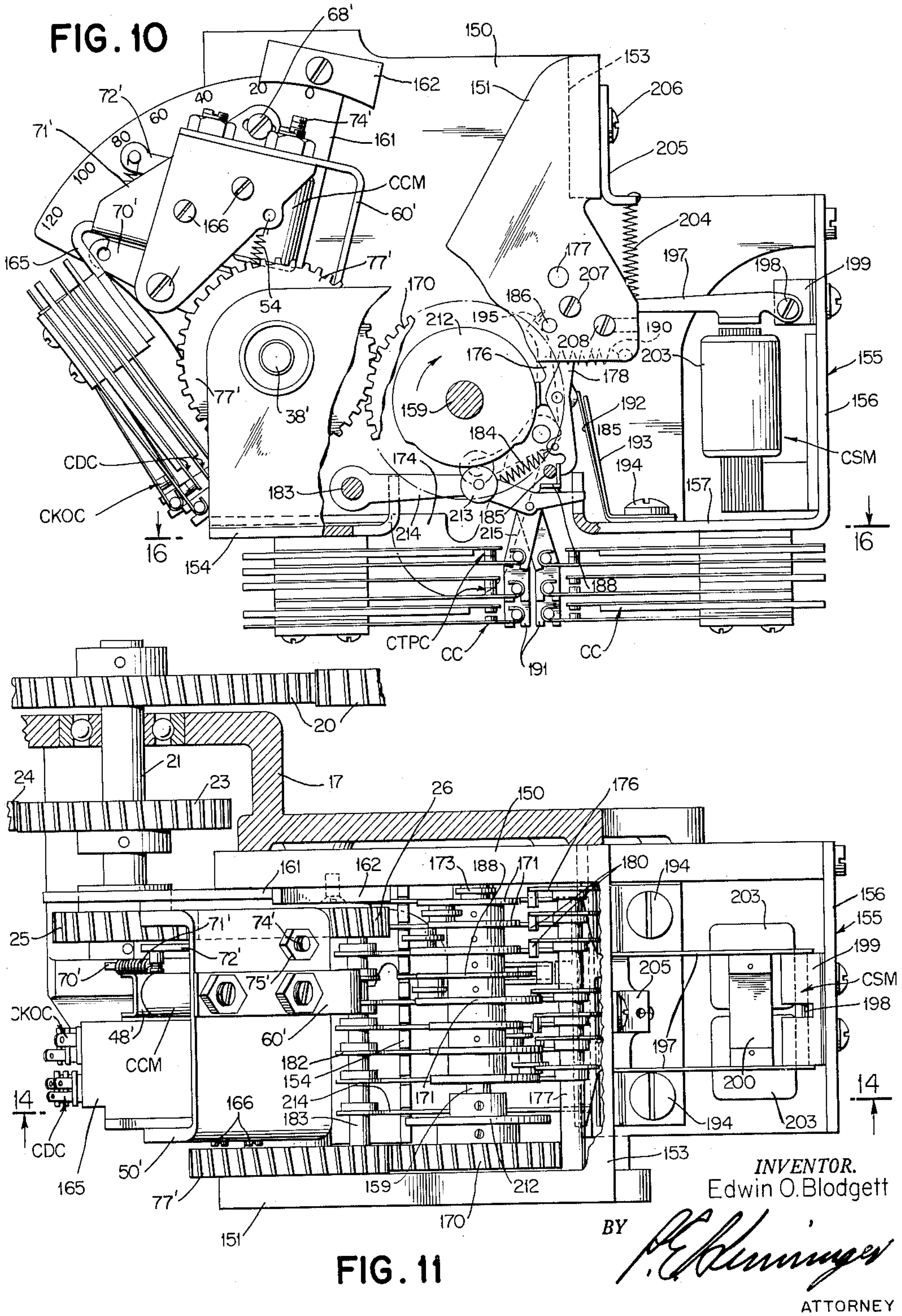
Fig. 10 illustrates in side elevational view, Fig. 11 in plan view, and Fig. 12 in end elevational view a code collector mechanism embodying the present invention.
Figures 12, 15:
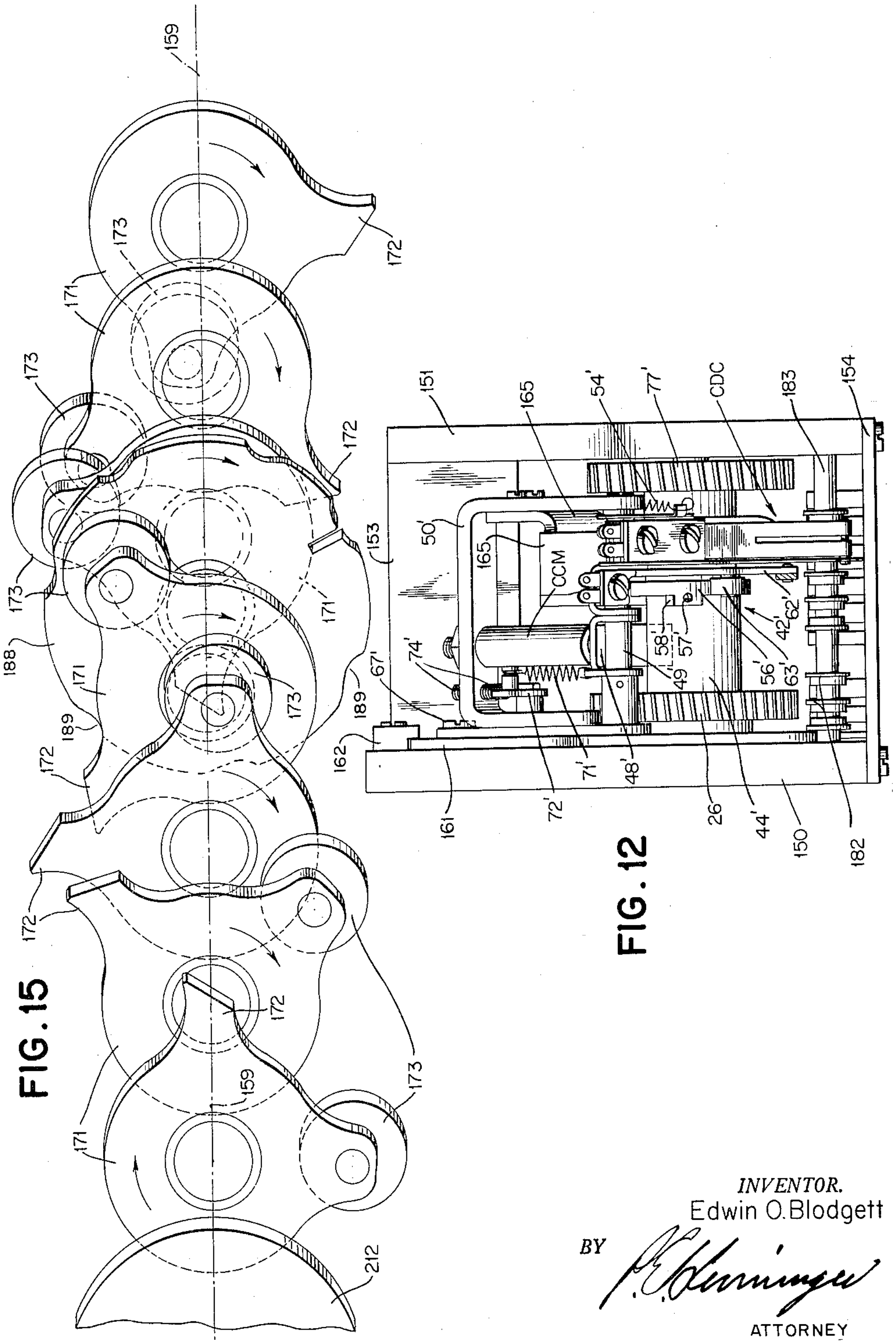
Fig. 15 shows in isometric view the arrangement and related positionings of a plurality of cams employed in the collector structure.

The construction of the code collector is illustrated in side elevational view in Fig. 10, in plan view in Fig. 11, and in elevational end view in Fig. 12. It will be seen that the collector is constructed as a completely self-contained unit having all of its components assembled between a back casting 150 and a front casting 151. The latter having an integrally formed inwardly extending portion 153 which is secured by machine screws and locating dowels (not shown) to the back casting 150. The two castings 150 and 151 are otherwise held together by a contact mounting plate 154 connected by machine screws to the lower surface of the two castings as shown more clearly in Fig. 12. The back casting 150 also carries a selector mounting plate 155 which has both a vertical poriton 156 and a horizontal portion 157.

A clutch shaft 38′ and a cam shaft 159 extend between the front and back castings as shown in Fig. 11, and both shafts are journaled in these castings in sealed ball bearings. The clutch shaft 38′ carries the drive gear 26 which meshes with the companion drive gear 25 described in connection with Fig. 2. The drive gear 26 is mounted by two spaced sleeve bearings to turn freely on the clutch shaft 38′ and a single revolution clutch mechanism is provided for connecting the drive gear 26 to the clutch shaft. This clutch mechanism is essentially similar to that described above in connection with the code distributor, and elements of the present clutch mechanism corresponding to those of the distributor clutch mechanism are accordingly identified by the same reference numerals primed.

Figure 13:
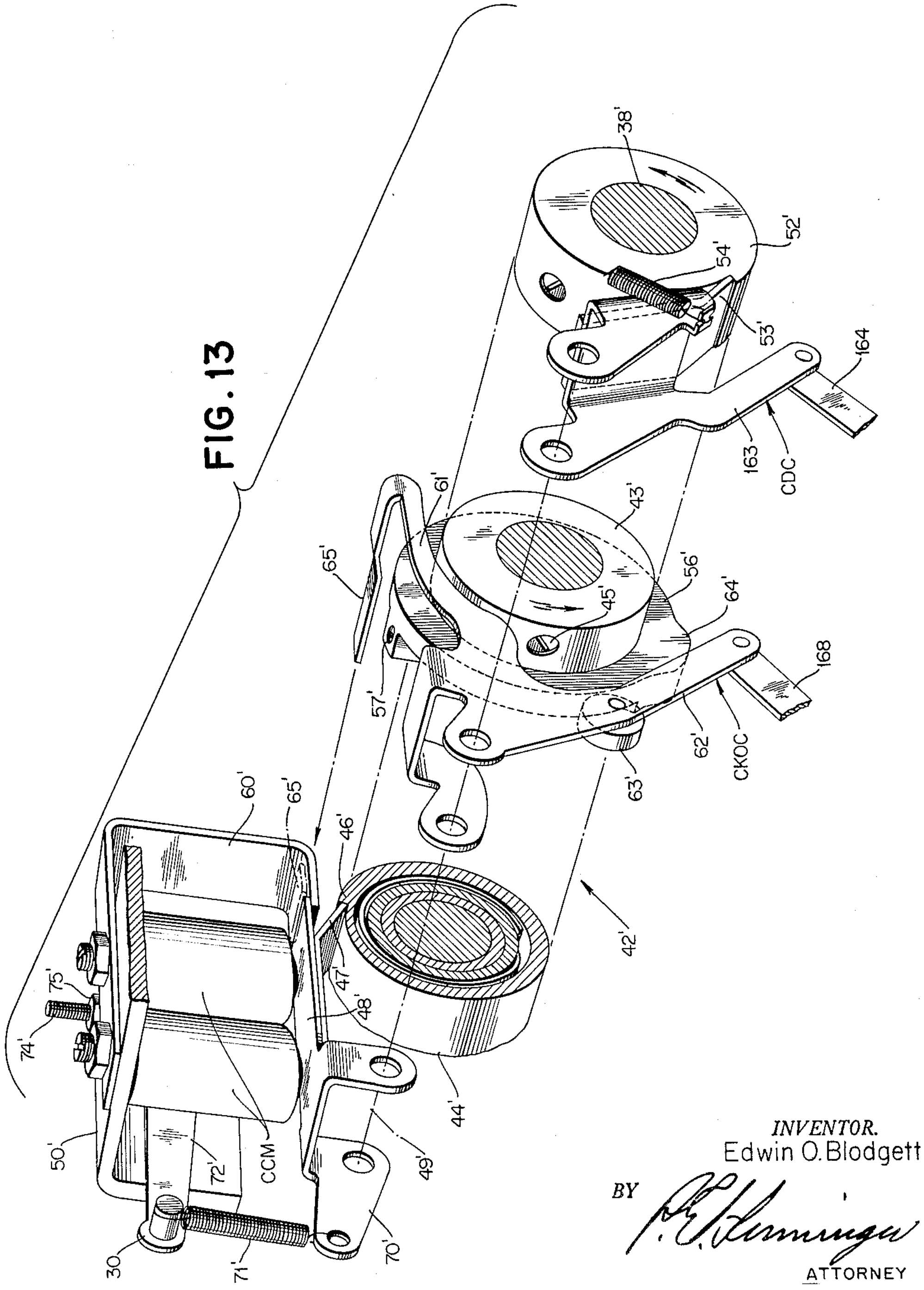
Fig. 13 illustrates in exploded isometric view certain details of a clutch construction employed in the code collector.

The clutch magnet assembly mounting of the collector unit differs, however, from that of the distributor unit in that whereas the magnet assembly of the distributor unit was mounted upon the back casting the magnet assembly of the collector unit is mounted upon an adjustable quadrant 161 which is pivotally movable about the clutch shaft 38′ but may be clamped in any position of angular adjustment by a quadrant clamp member 162. Two additional differences between the clutch construction of the collector unit as compared to that of the distributor unit should be mentioned. One of these concerns the detent arm 53′ which, as shown more clearly in Fig. 13, is provided with an extension 163 connected through an insulating link member 164 to actuate a collector detent contact CDC (Figs. 12 and 14) mounted upon a bracket 165. The latter is secured by machine screws 166 (Figs. 11 and 12) to the magnet assembly frame member 50′ so that the contacts CDC are mounted for movement with adjustments of the collector quadrant 161. The second of the mentioned differences between the distributor and collector clutch constructions concerns the knock-off bail 61′, the arm 62′ of which is extended in the collector structure (Figs. 13 and 17) and has pivotally attached at its end an insulating link member 168 connected to actuate a collector knock-off contact CKOC also supported upon the bracket 165 for adjustment with the quadrant 161. As will be explained hereinafter in connection with the electrical control system, the collector knock-off contact CKOC is electrically connected in series with the collector clutch magnets CCM to insure deenergization of the latter at the time the armature knock-off operation occurs by action of the armature knock-off bail 61′ under control of the member 56′ and its knock-off lobe 64′.

The driven gear 77′ which is affixed to the end of the clutch shaft 38′ meshes with a gear 170 pinned to the cam shaft 159, the gears 77′ and 170 providing a one-to-one driving relation between the clucth shaft 38′ and the cam shaft 159. In this, the gear 77′ is adjustably mounted on the clutch shaft 38′ and is held in adjusted position thereon by a set screw (not shown), to adjust the zero or home position of the cam shaft 159 with relation to the single revolution clutch mechanism. The center portion of the cam shaft 159 has affixed to it (as by being pinned thereto) a series of identically constructed cam members 171 having a configuration and fixed angular relation with one another more clearly shown in Fig. 14 and the exploded view of Fig. 15. One such cam member 171 is provided for each bit of the code to be received, and their accurately displaced angular arrangement (Figs. 14 and 15) provides sequential operation of the code bit selecting structure presently to be described. Each of the identical cam members 171 is provided with a follower operating portion 172 as well as with a reset roller 173 pivotally affixed on the member 171 as shown.

Figure 14:
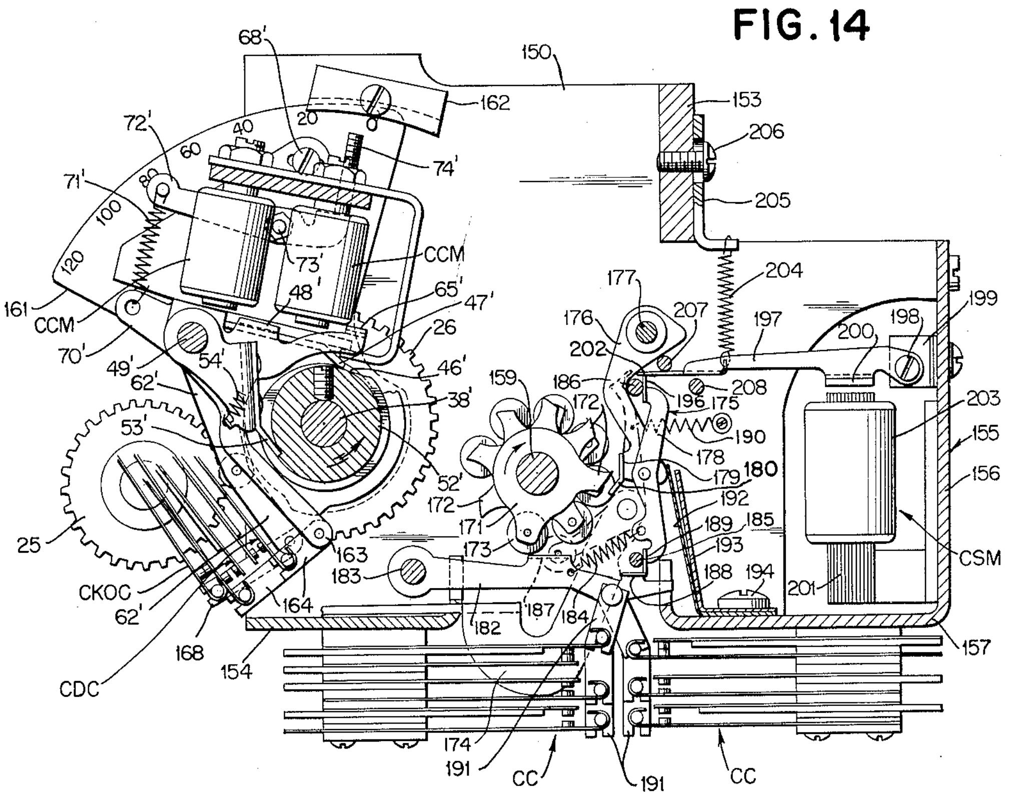
Fig. 14 is a side elevational view in cross-section illustrating certain aspects of the collector structure.

As shown more clearly in Fig. 14, an individual bit cam follower 175 is provided for each of the bit cam members 171. These bit cam followers also have an identical construction, and each includes a follower arm 176 pivotally supported on a shaft 177 and pivotally supporting at its lower end a selector lever 178. Each bit cam follower arm 176 is provided with a turned in flange 179 having a bent-in lip portion 180 which is engaged by the follower operating portion 172 of its associated bit cam member 171 to move the lower end of the bit cam follower arm 176 away from the cam shaft 159.

There is also associated with each of the bit cam members 171 a contact lever 182 which is pivotally supported on a shaft 183 extending between the rear casting 150 and front casting 151. A tension spring 184 extends between each of the contact levers 182 and the lower end of an associated selector lever 178 as shown. This tension spring 184 normally holds the lower end of each selector lever 178 in abutting relation with a lower stop rod 185, extending between the back casting 150 and the front casting 151, and also holds the upper end of each of the selector levers 178 in abutting relation against an upper stop rod 186 also extending between the back casting 150 and front casting 151. The spring 184 in thus biasing the selector lever 178 against the stop rods 185 and 186 establishes the normally unactuated position of each of the cam bit followers 175. The reset rollers 173 of the bit cam members 171 coact with an overturned flange portion 187 provided on the contact levers 182 to move the latter downward to a position where the end of each contact lever 182 is so positioned that an overturned flange 188 provided near the end of the contact lever 182 is moved underneath an overturned flange portion 189 provided on the lower end of each selector lever 178. The flange 189 of each selector lever 178 thus in engaging the flange 188 of the contact lever 182 latches the contact lever down in unactuated or reset position upon passage of the reset roller 173 out of engagement with the flange 187 of the contact lever.

Figure 16:
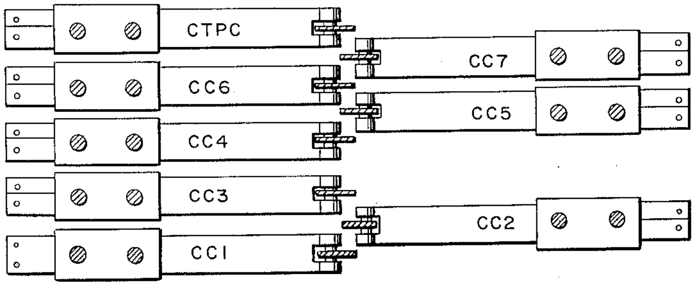
Fig. 16 shows the related positionings of specified contacts employed in the distributor mechanisms.

Each of the contact levers 182 controls the position of a bit contact assembly CC individual to the contact lever, the leaf spring contacts of the contact assembly CC being mechanically connected to its associated contact lever through insulating link members 191 for actuation thereby and to exert an upward biasing force on the contact lever. The bit contact assemblies CC are mounted in staggered relation as indicated in Fig. 16, a portion of the contact assemblies being mounted on the contact mounting plate 154 and the remainder on the horizontal portion 157 of the selector mounting plate 155. Fig. 16 shows seven such bit contact assemblies identified as CC1–CC7 for use with a code having seven code bits.

In addition to the tension spring 184 which connects each contact lever 182 and an associated selector lever 178, a leaf buffer spring 192 is provided for additionally biasing each bit cam follower 175 to its normally unactuated position and also to provide a buffering action on the movement of the latter under actuation of its associated bit cam member 171. This buffer spring 192 is comprised by a spring strip which is slotted to provide individual fingers acting on each of the bit cam followers 175, and is backed up by a stiffener member 193 which is also slotted and can be bent to provide a desired limit buffering action on the bit cam followers 175. Both the spring strip 192 and the stiffener strip 193 are mounted by machine screws 194 on the horizontal portion 157 of the selector mounting plate 155.

The upper end of each selector lever 178 is provided with a turned over portion 196 which is positioned to engage the end portion of a code selector armature 197 pivoted at 198 on a support member 199 affixed to the vertical portion 156 of the selector mounting plate 155. The configuration of the armature 197 is shown more clearly in Fig. 18. The armature 197 includes a cross bar 200 of magnetic material positioned to bridge the upper ends of a U-shaped core 201 of a code selector magnet CSM having magnet windings 203 positioned on each leg of the core 201. The code selector magnet CSM is supported upon the vertical portion 156 of the selector mounting plate 155. When the code selector magnet CSM is energized, it attracts the selector armature 197 downwardly against the force of a biasing spring 204 which extends between the armature 197 and an adjustable plate 205 mounted by a machine screw 206 on the inward extension 153 of the outer casting 151. The upward or released position of the selector armature 197 is determined by the adjusted position of an eccentric stop rod 207, which extends between the front casting 150 and back casting 151 and is angularly adjustable to provide a desired adjustment of the armature released position. An adjustable down stop rod 208, also extending between the front and back castings, is similarly provided and also is angularly adjustable to provide a desired lower or attracted position of the selector armature. The stop rods 207 and 208 are provided with screw-driver slotted ends for purposes of their angular adjustment, and are maintained in adjusted position by locking set screws (not shown) threaded through the edge of the front casting 151.

During a cycle of operation of the cam shaft 159, the reset roller 173 of each bit cam member 171 first engages and resets its associated contact lever 182. Immediately after the reset roller 173 passes out of engagement with the contact lever, the follower operating portion 172 of the bit cam member 171 engages an associated bit cam follower 175 to move the latter away from the cam shaft 159. During this movement of the cam follower 175, the upper end of the selector lever 178 will be free to move to the right as viewed in Fig. 14 if the selector armature 197 is in its upper released position and this allows the lower end of the selector 178 to remain under bias of the spring 184 firmly against the lower stop rod 185 and thereby to retain the associated contact lever 182 in its latched position. However, if the selector armature 197 is in its lower attracted position during this movement of the cam follower 175, the upper flanged end 196 of the selector lever 178 will engage the armature 197 and be restrained against movement. The lower end of the selector lever accordingly now moves to the right as viewed in Fig. 14 and thereby unlatches the associated contact lever 182 to allow the latter to be moved toward the cam shaft 159 by a biasing force imparted thereto from the movable leaf springs of the contact assemblies CC, and the latter thereupon move to actuated position. The engagement of the follower operating portion 172 with the bent-in lip portion 180 of a selector lever 178 is quite brief and provides a "sampling" interval (to sample and ascertain whether a code bit is marking or spacing at this time) which is much shorter than the bit transmission interval of the distributor earlier described. This received bit sampling interval occupies only a few degrees of the cam shaft rotation as shown more clearly by the collector cam chart of Fig. 21. This brief sampling interval is quite adequate, however, to effect selective setting of the contact assemblies CC.

Due to the fixed angular relationship of the bit cam members 171 on the cam shaft 159, as illustrated in Fig. 15, it will be apparent that the foregoing described operation occurs for successive ones of the contact levers 182 and associated cam followers 175 so that the contact assemblies CC are successively positioned in accordance with the position which the selector armature 197 assumes during the sampling interval provided by each cam follower 175. It will be recalled from the earlier description of the distributor unit that the code bits of a parallel presented code to the distributor are converted for transmission to serially presented code bits. These transmitted code bits are applied in succession to the code selector magnet CSM so that the latter actuates its armature 197 to attracted position when a code bit is marking but leaves the armature in its nonattracted position when a code bit is spacing. Accordingly, it will be clear that during each cycle of operation of the collector the bit cam members 171 sequentially position all of the bit contact assemblies CC distinctively according to the marking or spacing significance of each code bit serially presented to the collector during the collector cycle.

In connection with the sequential positioning of the contact assemblies CC during each operating cycle of the collector unit, and bearing in mind that such positioning is under control of successive received code bits applied to the code selector magnet CSM, it is the purpose of the graduated range quadrant 161 so to adjust the bit sampling intervals (established by operation of the bit cam followers 175) with relation to the operation of the selector armature 197 that the amplitude of the energization applied to the collector selector magnet CSM as a result of marking bits has maximum value as governed by the particular characteristics of the transmission channel used in a given application. Adjustment of the range quadrant 161 actually changes the home or 0° position of the cam shaft 159 and thereby alters the time in a cycle of operation of the collector at which the sequential operation of the cam bit followers 175 occur, thereby to insure that the cam bit followers actually are moved in coincidence with the optimum time for most accurately detecting either an energized or a deenergized condition of the code selector magnet CSM. As earlier mentioned, the home or 0° position of the cam shaft 159 is also determined by the angular adjustment of the driven gear 77' on the clutch shaft 38'. The preferred position of the driven gear 77' on the clutch shaft 38' is such that when the collector is connected in a local circuit to a distributor the total range of operation of the collector will be evenly divided each side of the center of adjustment of the range quadrant.

The armature 197 is firmly locked in either the deenergized or energized position which it occupies during the sampling interval. This interval, as pointed out above, is established during each bit interval of the collector by engagement of the operating portion 172 of a cam member 171 with the bent-in tip portion 180 of an associated selector lever 178. The manner in which armature locking is effected is shown more clearly in Fig. 18*a* and includes a lock bail 167 pivoted at 169 on a bracket 174 affixed to the mounting plate 154. One end of the lock bail 167 is provided with a cam-follower roller 181 which engages a cam 188 pinned to and positioned centrally of the cam shaft 159 and having spaced detent depressions 189 which permit a bias spring 190 to effect a rocking motion of the lock bail 167 about its pivot 169. The other end of the lock bail 167 is provided with an extending lock tab 195 having its end normal to the plane of the bail 167 and the edge of the end at right angles to the plane of the tab 195. The lock tab 195 is moved by the rocking motion of the bail 167 into and out of engagement with a tab 202 centrally positioned on the armature 197 and extending from the end thereof. The forward end of the tab 202 is formed as a knife edge, and the plane of the lock tab 195 forms such an obtuse angle to the mean positional plane of the armature 197 that the lower edge of the end surface of the lock tab 195 effectively constitutes a knife edge moving into position either below the knife edge of the armature tab 202 when the armature is in deenergized position or above the knife edge of the armature tab 202 when the armature is in energized position. The depressions 189 of the cam 188 are so positioned with relation to individual ones of the operating portions 172 of the cam members 171 that the lock bail 167 is rocked to effect locking engagement of its tab 195 with the armature tab 202 just prior to engagement of the cam operating portion 172 with the bent-in tip portion 180 of an associated selector lever 178. The timing of this repetitive armature locking operation during each cycle of the distributor is shown graphically in Fig. 21. By thus firmly locking the armature 197 either in its deenergized or energized position at the outset of the sampling interval as described, the code-bit selective action provided by the armature operation is made more positive and the otherwise critical timing of the relatively short sampling intervals is avoided.

Figures 17, 18, 18A, 19:
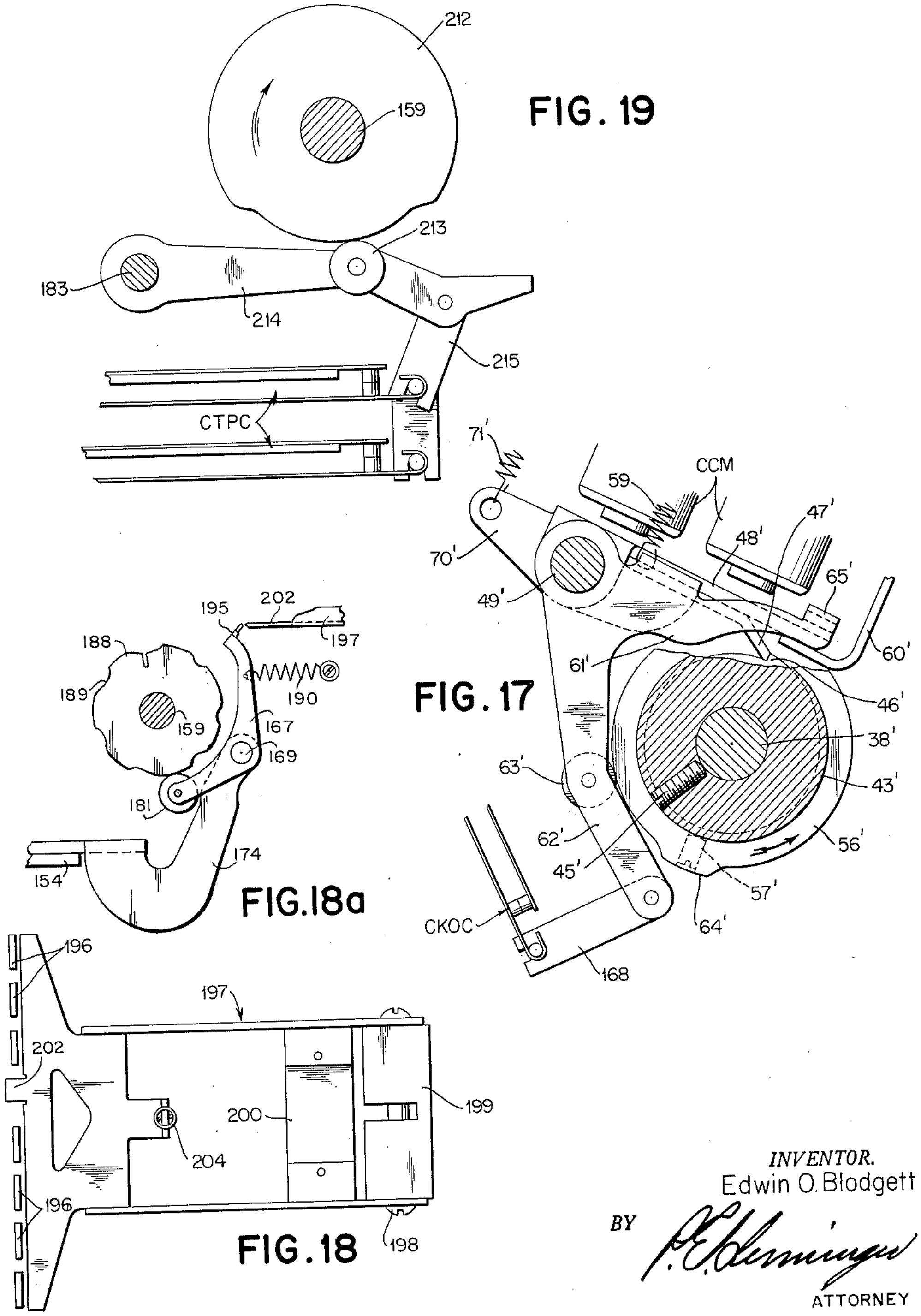

The collector also is provided with a transfer period cam 212 which is fixedly mounted on the cam shaft 159 and, as shown in Figs. 10 and 19, is engaged by a cam follower roller 213 pivotally supported intermediate the ends of a cam follower arm 214 in turn pivoted on the shaft 183. The end of the follower arm 214 is connected through an insulating link member 215 to actuate a collector transfer period contact CTPC. The operation of the cam 212 is such that the contacts CTPC are allowed to close just after the last bit contact assembly CC has been selectively positioned, and as will presently be explained more fully it is the purpose of the contacts CTPC to establish an energizing circuit through all of the bit contact assemblies CC to their individual output control circuits such as to the code magnets of a tape punch. The transfer period cam 212 opens the contacts CTPC just before the first bit contact assembly CC is reset at the initiation of a new collector cycle of operation. The output circuits of the bit contact assemblies CC not only have a common energizing circuit extending through the collector transfer period contact CTPC, but one which also extends through the collector detent contact CDC. The reason for this becomes evident when it is noted that adjustment of the range quadrant 161 in changing the home or 0° position of the cam shaft 159 actually varies the timing of the transfer period contact CTPC with relation to that of the detent contact CDC so that the distributor under some conditions of range quadrant adjustment may complete its cycle at a point where the transfer period contact CTPC remains closed. By including both the contacts CDC and CKOC in series in the energizing circuits of the contact assemblies CC, such circuits must under all conditions of adjustment of the range quadrant become deenergized not later than the home or 0° position of the clutch shaft when the collector detent contacts CDC open.

IV. ELECTRICAL CONTROL SYSTEM

Before considering in detail the complete electrical control system of the tape reader unit, the transmitter-receiver unit, and the tape punch unit in accordance with the present invention, it will be helpful to consider two forms of simplified electrical control system which illustrate the essential manner in which coded information is transmitted from one point and received at a distant point. These simplified systems also explain the manner in which a feed-back signal is provided and utilized to indicate accuracy of the received information and permit continued transmissions or automatically to terminate further transmission in the event that an error is detected in the information as received. Fig. 22 represents such a simplified electrical system for the half-duplex mode of operation utilizing a two-wire transmission channel, while Fig. 24 represents a simplified electrical system for the full-duplex mode of operation utilizing a four-wire transmission channel.

Considering first the half-duplex arrangement of Fig. 22, it will be recalled from the foregoing description of the distributor structure that the distributor code selector contacts DCSC are closed at the home or 0° position of the distributor. Further, that during each operating cycle of the distributor its code selector contacts DCSC close or remain open in accordance with respective mark and space code bits in each code group received. As shown in Fig. 22, the distributor code selector contacts DCSC are included in a series circuit extending between the transmitter line terminal T1 and the receiver line terminal R8 of the local transmitter-receiver unit. This circuit additionally includes an adjustable resistor MR used to adjust the magnitude of current flowing through the transmission channel, the operating winding of a receiving line relay RLR, the contacts 17 and 18 of a punch error relay PER, and a tape feed switch TFS. The receiving line relay RLR has transfer contacts 1, 2 and 3 which are moved to the "mark" position (closing the contacts 1 and 3) when the relay RLR is energized, thereby to energize the collector selector magnet CSM through the normally closed contacts 1 and 2 of a transmit relay TR and a current limiting resistor R1. In the deenergized position of the receiving line relay RLR, its transfer contacts move to the "space" position (closing contacts 1 and 2) to energize either (1) a reader stop relay RSR through the distributor sampling period contacts DSPC if a transmit relay TR is energized (by manual closure of a read switch S1) to close its contacts 12 and 13 or (2) alternatively to energize the collector clutch magnet CCM through the collector knock-off contact CKOC and the contacts 9 and 10 of the punch error relay PER if the transmit relay TR is deenergized to close its contacts 11 and 12. The punch error relay PER is normally energized, in a manner to be explained hereinafter, in intially conditioning the equipment for operation and remains so energized through its hold circuit contacts 3 and 4 and a system of parity check contacts included in the punch unit.

The local transmitter components included in the series circuit between terminals T1 and R8 are connected through a two-wire transmission line L, energized by a potential source E to the line terminals T1 and R8 of the remote transmitter-receiver having the same components included in the same circuit arrangement as described for the local transmitter-receiver (components of the remote unit corresponding to like components of the local unit being identified by the same reference indicia primed).

Assume that transmission is to occur from the local transmitter-receiver unit to the remote such unit, and assume further that the punch error relay PER of the local unit and the punch error relay PER' of the remote unit are energized as shown to condition both units for operation. The local tape read switch S1 is manually actuated to close its contacts 1 and 2 and thereby energize the transmit relay TR. Transmission starts with the distributor code selector contacts DCSC of the local unit and DCSC' of the remote unit closed, since both collectors stand at their home or 0° position at this time, so that a continuous transmission circuit is established and both the receiving line relay RLR of the local unit and the relay RLR' of the remote unit are energized to move their transfer contacts to the mark position (contacts 1 and 3 closed). The relay RLR contacts 1 and 3 are ineffective to energize the collector selector magnet CSM since this energizing circuit is interrupted by the now-open contacts 1 and 2 of the transmit relay TR. For the assumed direction of transmission, the tape read switch S1' of the remote unit should be in its Off position so that the associated transmit relay TR' is deenergized to permit the energized relay RLR' contacts 1 and 3 to energize the remote unit collector selector magnet CSM'.

Now if the transmission circuit should be open for any reason at this time, the receiving line relay RLR of the local unit would be deenergized to close its contacts 1 and 2 and this would effect energization of the reader stop relay RSR through the contacts 12 and 13 of the transmit relay TR since the distributor sampling period contacts DSPC are closed at the initiation of each distributor cycle. The function of the reader stop relay RSR when energized is to prevent operation of the tape reader, so that no transmissions can therefore be effected; its energization also effects drop-out of the punch error relay PER in a manner later to be explained. In the remote unit, the receiving line relay RLR' is also deenergized and its contacts 1 and 2 energize the collector clutch magnet CCM' through the contacts 9 and 10 of the punch error relay PER' and the collector knock-off contacts CKOC'. The collector operates through one cycle but does not receive any code transmissions, and this causes the punch parity check contacts to drop out the punch error relay PER'. An indicator light on the tape reader unit thereupon becomes illuminated and remains so until (1) the read switch is turned Off, (2) the remote punch error relay PER' has been manually reset to its energized position, and (3) the fault in the transmission line circuit is corrected and the circuit continuity is again established thereby energizing the receiving line relay RLR and deenergizing the reader stop relay RSR. Thereafter the read switch S1 may be turned On and transmissions started.

Fig. 23*a* represents the several operating periods of the distributor code selector contact DCSC and in particular shows that these contacts are closed from 0° to 27° and again from approximately 332° to 360° of the distributor cycle as indicated by the cross checked areas, are open from 27° to approximately 65° during a "start" interval as shown by the unshaded area, and may be either open or closed during any of seven information bit intervals of equal length depending upon the occurrence of respective space and mark code bits successively sampled in each code-bit group which is applied to the distributor at any given time. Fig. 23*b* graphically represents the interval from 0° to 13½° and again from 346½° to 360° of the distributor operating cycle when the distributor sampling period contacts DSPC are closed. Thus if the local and remote receiver line relays RLR and RLR' are energized and therefore in their mark position during the initial and terminal interval of each cycle when the distributor code selector contacts DCSC and sampling period contacts DSPC are closed, the local reader stop relay RSR is not energized. The remote code selector magnet CSM' is energized at this time through the normally closed contacts 1 and 2 of the remote transmit relay TR' but this has no effect on the collector operation.

Now as the distributor continues on through its cycle and the distributor code selector contacts DCSC open during the "start" interval from 27° to approximately 65° of the distributor cycle, the local and remote receiver line relays RLR and RLR' become deenergized and their contacts move to the space position. The local reader stop relay RSR is not now energized since this energized circuit is now opened by the distributor sampling period contacts DSPC, but the remote collector clutch magnet CCM' is energized through the collector knock-off contacts CKOC' which are closed from 0° to 12° of each collector cycle (Fig. 23*h*), the contacts 9 and 10 of the punch error relay PER', and the normally closed contacts 11 and 12 of the transmit relay TR' thus to initiate a cycle of operation of the remote collector. As the local distributor and remote collector continue through their cycles of operation, the distributor code selector contacts DCSC are open or closed in each of the No. 1–No. 7 bit intervals thereby actuating the remote receiver line relay RLR' respectively to its space or mark positions in the latter of which it energizes the code selector magnet CSM' through the normally closed contacts 1 and 2 of the remote transmit relay TR'. This selective actuation of the remote code selector magnet CSM' at each of the collector sampling intervals (Fig. 23*e*) effectively collects the transmitted code bits during the collector operating cycle as previously explained in connection with the collector construction, and near the end of the collector cycle the collector transfer period contacts CTPC close (Fig. 23*f*) to effect through collector contacts CC1–CC7 energization of the associated tape punch unit in accordance with the collected code.

It will be apparent from Fig. 22 that the components of the local and remote transmitter-receiver units are included in similar electrical control systems so that code transmission from the remote unit to the local unit corresponds to that above described whenever the tape read switch S1 of the local unit is turned Off and the tape read switch S1' of the remote unit is turned On.

Fig. 24 represents the simplified electrical circuit for the full-duplex mode of operation utilizing a two-wire line L and a second two-wire line L' by which to effect concurrent code transmissions from the local transmitter to the remote receiver and from the remote transmitter to the local receiver. The operation during full-duplex transmissions is quite similar to that described in connection with Fig. 22 except that transmitting line relays TLR and TLR' are now included in series with individual ones of the lines at each transmitter. The transmitting line relay TLR performs no function in actually transmitting or receiving, but rather enables all transmissions to be terminated in case a "feed-back" signal indicates error in the received code at either receiver. Thus if the remote punch error relay PER' becomes deenergized due to an open circuit through its associated parity check contacts by virtue of an erroneously received code, the contacts 19 and 20 of the punch error relay PER' open the line L to deenergize the transmitting line relay TLR which accordingly moves its contacts 1 and 2 to their space position to energize the local reader stop relay RSR when the distributor sampling period contacts DSPC close near the end of the distributor cycle of operation. This, of course, terminates further transmissions until the remote punch error relay PER' has been manually reset to its energized position and the erroneously transmitted code corrected in a manner to be explained hereinafter. Similarly should the local punch error relay PER become deenergized due to a faulty received code, the remote transmitting line relay TLR' becomes deenergized to energize the remote reader stop relay RSR' near the end of the operating cycle of the remote distributor. The operations of the local and remote collectors under control of the receiver line relays RLR and RLR′ are the same as described above in connection with Fig. 22.

The complete electrical circuit diagrams of the tape reader unit, the transmitter-receiver unit, and the tape punch unit are shown in Figs. 25*a*–25*e* which should be considered together as a unitary structure as indicated in Fig. 26.

The tape reader unit electrical circuit diagram is shown in Fig. 25*a*. This unit is physically constructed in the manner shown and described in detail in the aforementioned copending Blodgett application, and includes a motor M which actuates four reader cam contacts RCC1-RCC4. The tape reader structure itself includes a reader tape contact RTC the contacts of which are closed when tape is properly positioned in the reader in readiness to be read, a reader tight tape contact RTTC the contacts of which are normally closed but open whenever the read tape becomes excessively tight for any reason as it is fed through the reader, a reader clutch magnet RCM, and a plurality of read-pin actuated contacts RC1–RC8. The tape reader unit is provided with a reader power switch S2, the read switch S1 earlier mentioned in connection with Fig. 22, and an indicator light IL of the neon type.

The transmitter-receiver unit is shown in Figs. 25*b* and 25*c* and includes an input isolating line transformer TR which is connected through a line cord LC to a source of suitable energizing power. The secondary winding of the isolating transformer TR is connected through a noise filter network F to a full-wave rectifier RE and also furnishes alternating current power through plug-receptacle JR20 and JR22 to the tape reader unit and through plug-receptacle JP20 and JP22 to the tape punch unit. The transmitter receiver unit also includes, in addition to the code distributor and collector structures earlier described, a motor M which mechanically drives the distributor and collector as previously explained in connection with Fig. 2. This unit further includes the reader stop relay RSR, the transmit relay TR, the transmitting line relay TLR (which is a pluggable unit and is plugged into circuit only when full-duplex operation with four wire lines is desired), and the receiving line relay RLR mentioned above in connection with Figs. 22 and 24.

The electrical circuit diagram of the punch unit is shown in Figs. 25*d* and 25*e*. This unit also has a physical construction of the type shown and described in detail in the aforementioned Blodgett application, and includes a drive motor M, a power switch S3, an indicator light IL′, a tape feed switch S4, a buzzer BU, two tape feed relays TFR1 and TFR2, and the punch error relay PER mentioned in connection with Figs. 22 and 24. The tape punch structure itself is provided, as explained in the copending Blodgett application, with a plurality of punch magnets PM1–PM8, a punch clutch magnet PCM, a punch latch contact PLC the contacts of which are normally closed but move to open position during each cycle of punch operation, a punch tape contact PTC the contacts of which are closed when tape is properly positioned in the punch in readiness for punching but which open if the tape-feed hold-down plate is not in proper position or the tape becomes exhausted or excessively tight as it feeds through the punch, and a system of parity contacts operated by each of the code punch pins PP1 through PP8 and feed hole punch pin FP and electrically interconnected as shown in the drawing.

The connecting cable 13 of Fig. 2 interconnects the several JR plug and receptacle terminals of the reader unit and the transmitter-receiver unit, and the cable 14 of Fig. 2 interconnects the several JP plug and receptacle terminals of the transmitter-receiver unit and punch unit.

The components above enumerated in the tape reader unit, the transmitter-receiver unit, and the tape punch unit have intercontrolled operations as will now be described in connection with several available modes of operation of these units.

A. HALF-DUPLEX MODE OF OPERATION WITH TWO-WIRE LINE AND INTERNAL POWER FROM THE TRANSMITTER-RECEIVER UNIT APPLIED TO THE TRANSMISSION LINE

Alternating current power is supplied from the isolating transformer TR of the transmitter-receiver unit through plug-receptacles JR20 and JR22 to the tape reader unit, and through contacts 3 and 4 of the reader power switch S2 in its On position to energize the reader motor M. It may be noted that alternating power is also supplied from the transmitter-receiver unit through plug-receptacles JP20 and JP22 to the tape punch unit and through contacts 1 and 2 of the punch power switch S3 in its On position to energize the punch motor M. The contacts 1 and 2 of the punch power switch S3 also apply alternating current through the plug-receptacle JP26 to energize the motor M of the transmitter-receiver unit. The isolating transformer TR of the transmitter-receiver unit is also applied to the full-wave bridge rectifier RE to derive a unidirectional operating potential the positive potential of which is applied through plug-receptacle JR23 to the tape reader unit and through JP23 to the tape punch unit and the negative potential of which is applied through plug-receptacle JP13 to the punch unit alone.

The transmitter-receiver unit has transmitter line and functional control terminals T1–T8 and the receiver has line and functional control terminals R1–R8 as shown in Fig. 25. For half-duplex operation of the type here under consideration, the terminals T1–T8 and R1–R8 are interconnected by jumper connectors as indicated in broken lines and the remote transmitter-receiver unit is connected through line conductors L, L to the line terminals T1 and R6 of the local unit as shown.

The several units of equipment are placed in operation by turning on the power switch S3 of the punch unit and power switch S2 of the reader unit. When the punch power switch S3 is first turned On, the buzzer BU is energized through a circuit which includes the contacts 11 and 12 of the tape feed relay TFR2, the contacts 11 and 12 of the punch error relay PER, and the contacts 3 and 4 of the power switch S3 to the negatively energized plug-receptacle JP13. The indicating lamp IL′ of the punch unit is also energized by the circuit last described, so that the buzzer continues to sound and the indicating lamp to light until the energizing circuit last mentioned is interrupted at the contacts 11 and 12 of the tape feed relay TFR2 when this relay becomes energized upon manual actuation of the tape feed switch S4 as is also necessary to place the several units in operation.

Manual actuation of the tape feed switch S4 to close its contacts 1 and 2 applies negative energizing potential derived from the plug-receptacle JP13 through the contacts 3 and 4 of the power switch S3 and the contacts 1 and 2 of the switch S4, to the relay windings of both relays TFR1 and TFR2. The negative potential at the terminal 1 of the tape feed switch S4 is also applied through the punch latch contact PLC to the contact 7 of the tape feed relay TFR1 so that upon energization of the latter to close its contacts 6 and 7 negative potential is applied to terminal 18 of the tape feed relay TFR2. The latter upon becoming energized as last mentioned closes its contacts 17 and 18 to apply energization to the punch clutch magnet PCM and, through the now-closed contacts of relays TFR1 and TFR2, to the punch magnets PM1–PM7. The energization of the punch clutch magnet PCM initiates a cycle of operation of the punch which thereupon punches the tape with a delete code comprised by code positions 1 through 7 due to the energization of all of the punch magnets PM1–PM7. The relay TFR1 contacts 1 and 2 establish a hold circuit for this relay through the punch latch contact PLC to insure energization of the punch clutch magnet PCM and punch magnets PM1–PM7 until the punch latch contact PLC opens as the punch enters upon its cycle of operation.

During this interval, the tape feed relay TFR2 has similarly established a hold circuit through its now-closed contacts 12 and 13 and the contacts 11 and 12 of the punch error relay PER and now-closed contacts 3 and 4 of the power switch S3 to the negatively energized plug-receptacle JP13. Thus while the tape feed relay TFR2 remains in energized position until the punch error relay PER is itself energized, it may be noted that the energizing circuit for the punch clutch magnet and punch magnets PM1–PM7 extend through the contacts 6 and 7 of the tape feed relay TFR1 so that successive cycles of the tape feed operation occur only so long as the tape feed switch S4 is manually depressed to maintain its contacts 1 and 2 closed. However, the fact that the tape feed relay TFR2 continues to be energized through its hold contacts 12 and 13 has the result of interrupting at its contacts 11 and 12 the energizing circuit for the buzzer BU and the indicating lamp IL′ so that the initial actuation of the tape feed switch S4 not only accomplishes at least one cycle of operation of the tape punch but also silences the buzzer BU and extinguishes the indicator light IL′.

Upon manual release of the tape feed switch S4 to close its contacts 1 and 3, the punch error relay PER is energized through a circuit which includes the contacts 9 and 10 of the now-energized tape feed relay TFR2, the contacts 1 and 3 of the tape feed switch S4, and the contacts 3 and 4 of the power switch S3 to the negatively energized plug-receptacle JP13. The punch error relay PER thereupon picks up, its contacts 11 and 12 open the hold circuit for the tape feed relay TFR2 which accordingly drops out, and a hold circuit for the punch error relay PER is established through its contacts 7 and 8, the punch tape contact PTC, a continuous circuit through the punch parity contacts entering the latter at the common terminal TE3 with exit at the odd terminal TE2, plug-receptacle JP14, plug-receptacle JR13, and contacts 6 and 4 of the read switch S1 in its Off position to the plug-receptacle JR17 which is negatively energized from the punch unit through plug-receptacle JP17 and the contacts 3 and 4 of the punch power switch S3 in its On position. An alternative manner of completing this hold circuit for the punch error relay PER is from the plug-receptacle JP14 and either through the normally closed contacts 4 and 5 of the transmit relay TR to the negatively energized plug-receptacle JP17 or through the normally closed contacts 4 and 5 of the reader stop relay RSR and the normally open contacts 5 and 6 of the transmit relay TR to the negatively energized plug-receptacle JP14. While the punch error relay PER deenergizes the tape feed relay TFR2 as mentioned, the contacts 11 and 12 of the latter do not reestablish the energizing circuit for the buzzer BU or the indicating lamp IL′ since the energizing circuit is now open at the contacts 11 and 12 of the punch error relay PER.

In connection with the hold circuit of the punch error relay PER, it will be noted that this relay is maintained energized through its hold circuit if there is tape in the punch with the tape feed arm in proper position and the tape tension not excessively tight whereby the contacts PTC are closed, and if either (1) the read switch S1 of the reader unit is in the Off position or (2) if in its On position (thereby energizing the transmit relay TR as will presently be explained) the transmit relay TR contacts 5 and 6 are closed while at the same time the reader stop relay RSR remains deenergized (as indicating that the transmission line and the remote transmitter-receiver unit provide a continuous electrical transmission circuit as explained in connection with Fig. 22). It was further noted that the hold circuit for the punch error relay PER extends through the parity check contacts associated with punch pins PP1–PP8, and these contacts maintain a closed electrical circuit throughout each punch cycle if an odd number of code bit punches are operated to punch position but will interrupt the hold circuit of the punch error relay PER whenever an even number of code bit punches are operated to punch position or in the event that only the feed punch pin FP moves to punch position. The opening of the hold circuit for the punch error relay PER by the feed hole punch pin FP is used as the method of stopping operation of the collector in the event the continuity of the communications channel becomes interrupted for any reason.

In connection with the tape feed operation above described, it will be noted that as long as the tape feed relay TFR2 is energized its contacts 19 and 20 are closed to energize the transmit relay TR through plug-receptacles JP18 and JP19 (plug-receptacle JP18 being negatively energized by the jumper connection between receiver terminals R1 and R4). The transmit relay TR thereby opens its contacts 1 and 2 and maintains the collector selector magnet CSM deenergized during any tape feed operation. This energized condition of the transmit relay TR also causes the reader stop relay RSR to be energized (through the distributor sampling period contact DSPC and contacts 12 and 13 of the transmit relay TR) as long as the receiver line relay RLR is in spacing position (its contacts 1 and 2 closed) due to an interrupted transmission line such as would occur if the remote transmitter-receiver unit were not properly conditioned to receive. The reader stop relay RSR will continue to hold up the transmit relay TR (through contacts 14 and 15 of the reader stop relay RSR) after the tape feed relay TFR2 has dropped out by release of the tape feed switch S4 and pick-up of the punch error relay PER. The reader stop relay RSR when so energized remains energized if the read switch S1 of the tape reader is in its On position; the hold circuit for the reader stop relay RSR in this regard is traced from a hold winding of the relay through the contacts 2 and 3 of this relay, plug-receptacle JR18, the contacts 1 and 2 of the reader power switch S2 in its On position, and the contacts 4 and 5 of the reader read switch S1 in its On position to the negatively energized plug-receptacle JR17. Thus whenever the reader unit read switch S1 is in its On position at the time a tape feed operation in the punch unit occurs and the receiving line relay RLR contacts are in spacing position (transmission line open), the read switch S1 must be returned to its Off position before further operation of the reader unit can be resumed.

The indicator light IL of the tape reader unit is illuminated whenever the reader read switch S1 is turned On but the reader power switch S2 is left Off thus indicating that the reader is not conditioned for operation. The energizing circuit for the indicating lamp IL under this condition may be traced from the positively energized plug-receptacle JR23 through the indicating light IL, the contacts 1 and 5 of the reader power switch S2 in its Off position, and the contacts 4 and 5 of the read switch S1 in its On position to the plug-receptacle JR17 which is energized to a negative potential whenever the power switch S3 of the punch unit is in its On position.

The indicator light IL of the reader unit is also energized whenever both the read switch S1 and the reader power switch S2 are On but the transmission line circuit becomes open. Such energization of the indicating light IL is effected in the following manner. The read switch S1 in its On position closes its contacts 1 and 2 to energize through plug-receptacles JR15 and JR19 the transmit relay TR by applying to the latter negative potential from the receiver terminal R4 obtained by jumper connection to the receiver terminal R1. The reader stop relay RSR is then energized through the distributor sampling period contacts DSPC during the sampling period (beginning at 346½° of one cycle of the distributor and extending to 13½° of the following cycle thereof), the now-closed contacts 12 and 13 of the transmit relay TR, and the contacts 1 and 2 of the receiver line relay RLR in the space position (line continuity interrupted) to the negatively energized plug-receptacle JP17. With the reader stop relay RSR thus energized, the reader indicating lamp IL is energized from the positively energized plug-receptacle JR24, the indicating lamp IL, the plug-receptacle JR14, and the contacts 7 and 8 of the reader stop relay RSR to the same circuit which energizes the latter. As previously explained, the reader stop relay RSR holds through a hold circuit which includes its contacts 2 and 3 and the contacts 4 and 5 of the read switch S1 in its On position so that the indicating lamp IL remains energized with the reader stop relay RSR until the latter is deenergized by manually moving the read switch S1 to Off position. Note in this connection that even though the read switch S1 is manually moved to its Off position, the indicating light IL will nevertheless remain energized as long as the continuity of the transmission line remains interrupted. This is because the contacts 1 and 2 of the receiving line relay RLR will maintain the reader stop relay RSR energized, and the latter will maintain the transmit relay TR energized. Thus when the read switch S1 has been moved to its Off position and the indicating light IL is extinguished, the latter condition indicates that the transmission line continuity has been restored and the read switch S1 can then be manually actuated to its On position to energize the transmit relay TR and start or resume transmissions.

As pointed out in the aforementioned copending Blodgett application, the tape reader structure itself is provided with a half revolution clutch which permits the reader shaft to be stopped at either the 0° position with the code-hole sensing pins of the reader withdrawn from the tape or at the 180° position where the sensing pins are in sensing position and the reader contacts RC1–RC8 in selectively operated positions in conformity with the code-bit group read from the tape at that time. The reader clutch magnet RCM cannot be energized unless the reader power switch S2 and the punch power switch S3 are both in their On position as will presently be seen. Now when the reader read switch S1 is initially actuated to its On position, an initial energizing circuit for the reader clutch magnet RCM is established; this circuit includes the reader tight tape contact RTTC, the reader tape contact RTC, the cam actuated contacts RCC2 which are closed at this time since the reader starts from its 0° or home position in its operating cycle, the plug-receptacle JR10, the normally closed contacts 1 and 2 of the reader stop relay RSR, the plug-receptacle JR18, the contacts 1 and 2 of the reader power switch S2 in its On position, and the contacts 4 and 5 of the read switch S1 in its On position to the plug-receptacle JR17 which is negatively energized when the punch power switch S3 is On.

It may be noted that as long as the read switch S1 is in its On position, the energizing circuit last traced energizes the reader clutch magnet RCM each time that the reader passes through its 0° position so that the reader never stops at its home position until: (1) the read switch S1 is turned Off, or (2) the reader tight tape contact RTTC opens due to excessive tape tension, or (3) the reader tape contact RTC opens by exhaustion of the tape being read or the tape hold-down feed plate being manually lifted, or (4) the reader stop relay RSR becomes energized in the manner earlier explained (such as due to interruption for some reason of the transmission line continuity) to open its contacts 1 and 2, or (5) the punch power switch S3 is turned Off.

The tape reader is capable of operation at a higher speed than the distributor which it controls in the associated transmitter-receiver unit, but is maintained synchronized with the distributor by the method of stopping the tape reader at its mid-cycle or 180° position until such time as the reader clutch magnet RCM is energized by the distributor as the latter initiates a new cycle of operation. This distributor energizing circuit may be traced from the reader clutch magnet RCM through the reader cam actuated contacts RCC3 which are closed while the reader stands at its mid-cycle or 180° position, the plug-receptacle JR11, the contacts 3 and 4 of the distributor intermediate contact DIC which are closed during the initial 65° of the distributor cycle, the contacts 2 and 3 of the distributor start-stop cam contacts DSSC which close when the distributor reaches 27° of its operating cycle and remain closed to approximately 332° of the cycle (Fig. 23*c*) the plug-receptacle JR9, and the reader cam actuated contacts RCC1 (which are closed from 155° to 205° of the reader cycle) to the negatively energized plug-receptacle JR17. The timing of the distributor start-stop contacts DSSC and the distributor intermediate contacts DIC are graphically shown by Figs. 23*c* and 23*d*, respectively, from which it will be apparent that the reader clutch magnet RCM is energized from 27° to 65° of the distributor operating cycle.

It will presently be explained in detail that the previous code group read by the reader has been supplied to and stored in the distributor at the time the reader clutch magnet RCM is so energized and operates from 180° of one cycle to 180° of the next cycle to read the next code group and retain it until the reader clutch magnet RCM is again pulsed by the distributor in the manner just described. In this regard, it will be noted that the energizing circuit for the reader clutch magnet RCM last traced, which releases the reader from its mid-cycle or 180° position, does not include any contacts of the read switch S1 and thus is not affected by turning Off the read switch. The latter operation would only cause the reader to stop at its 0° or home position on the next release of the reader from its 180° position since the On position read switch contacts 4 and 5 are required to cause the reader to go beyond its home position as explained above.

With the reader standing at its mid-cycle or 180° position of either the initial or subsequent reader cycles of operation, the code hole sensing pins of the reader either engage the under side of the tape or pass through the code holes present in the tape. Those sensing pins which extend through holes in the tape actuate individual ones of the reader contacts RC1–RC8 as more fully explained in the aforementioned copending Blodget application. Those of the contacts RC1–RC8 which stand in actuated position at this time effect energization of corresponding ones of the distributor magnets DM1–DM7 through the respective plug-receptacles JR1–JR7 and a common energizing circuit. The latter may be traced from a common connection to one contact of all of the RC1–RC8 contacts through the plug-receptacle JR12, contacts 1 and 2 of the distributor intermediate contacts DIC which are closed during the initial 65° of the operating cycle of the distributor, plug-receptacle JR9, and the reader cam operated contacts RCC1 (which are now closed since the reader stands at its mid-cycle position) to the negatively energized plug-receptacle JR17. It will be recalled from the previously described operation of the distributor mechanical structure that if the distributor is just completing a cycle of operation the distributor intermediate contacts DIC 1 and 2 close precisely at the 360° or home position of the distributor. The energizing circuit last traced, and including the distributor intermediate contacts DIC 1 and 2, thus causes the distributor magnets DM1–DM7 to receive their initial energization at the moment when the distributor has precisely completed one cycle and is ready to initiate a new cycle. It will also be recalled from the previous description of the distributor construction that the armatures of the distributor code magnets DM1–DM7 are free of any latching action through the first 20° of the distributor cycle due to the cam configuration shown in Fig. 9 and explained more fully in connection with the distributor cam chart of Fig. 20, so that the armatures are quite free and may be readily moved to energized position.

It may be noted that the reader RC8 dual-pair contacts are connected in parallel with the reader RC1–RC2 contacts so that both of the distributor magnets DM1 and DM2 are energized whenever a hole is sensed in the eighth level channel of the tape, thus to enable such eighth level information to be converted and transmitted as a 1—2 code in the seven levels of information which may be translated by the distributor.

The distributor clutch magnet DCM is concurrently energized with the distributor magnets DM1—DM7 through a circuit which includes the contacts 1 and 2 of the distributor start-stop contacts DSSC and the plug-receptacle JR9 which is negatively energized through the reader cam actuated contacts RCC1. This energizing circuit is not controlled by the read switch S1, and is interrupted by the distributor start-stop contacts DSSC after the distributor has rotated 27° of its operating cycle. When the distributor clutch magnet DCM is thus energized and the distributor initiates a cycle of operation, the distributor magnets DM1–DM7 effectively cause the previously read code group to be mechanically retained or stored by the latched and unlatched status of the several cam follower arms 92 of the distributor as explained above in connection with the distributor construction of Figs. 3–9. This permits the distributor to complete its cycle of operation and thereby transmit in serial or sequential manner the code bits of the parallel-presented code-bit group which it stores, and at the same time enables the reader clutch magnet RCM to be energized through the contacts 2 and 3 of the distributor start-stop contacts DSSC and the contacts 3 and 4 of the distributor intermediate contacts DIC between 27° and 65° of the distributor cycle so that the reader can read and temporarily retain or store the next code group while the distributor completes its operating cycle.

Assume that the distributor has initiated a cycle of operation as last described. To do so, the read switch S1 will have previously been closed and its contacts 1 and 2 will have energized the transmit relay TR through plug-receptacles JR15 and JR19 as earlier explained. It may be noted at this point that the reader cam actuated contacts RCC4 are connected in parallel with the contacts 1 and 2 of the read switch S1 so that the transmit relay TR remains energized as long as the reader stands at its mid-cycle or 180° position even though the read switch S1 may be moved to its Off position at this time; the reader cam actuated contacts RCC4 thus insure the transmission of every code group which the reader has actually read. It may further be noted that the contacts 4 and 5 of the distributor start-stop contacts DSSC also parallel the contacts 1 and 2 of the read switch S1 (through plug-receptacles JR15 and JR19) and thus also maintain the transmit relay TR energized at least from 27° through 332° of the distributor cycle, which is the code transmitting interval of the distributor as will be apparent from Fig. 23*a*. Thus any code group temporarily stored in the distributor is transmitted even though the read switch S1 may be moved to Off position at a moment when the reader would happen to stop at its 0° or home position to open its contacts RCC4 or even should the read switch S1 remain On but the reader be stopped at its 0° or home position due to the end of the read tape opening the reader tape contact RTC or excessively tight tape causing the reader tight tape contacts RTTC to open.

The transmit relay TR when energized and retained energized as last described functions during the transmitting intervals of half-duplex operation to prevent any response by the receiver of the transmitter-receiver unit to incoming code information, and the relay does this by opening its contacts 1 and 2 which are included in the energizing circuit of the code selector magnet CSM as will later be explained more fully. The transmit relay TR is thus available for like use during any tape feed operation is previously mentioned.

Now, as the distributor moves through its cycle of operation, it causes the distributor code selector contacts DCSC to open and close according to the respective space and mark code bits consecutively sampled in a code-bit group temporarily mechanically stored by concurrent energization of the distributor magnets DM1–DM7 as previously explained. These contacts directly control the electrical continuity of the transmission channel to effect code communication in a manner now to be considered.

To permit half-duplex or full-duplex modes of operation of the transmitter-receiver unit as desired, and to enable operation with either external unidirectional voltage line energization or internal energization of the line by the unidirectional voltage derived by the rectifier RE, the transmitter is furnished with terminals T1–T8 and the receiver with terminals R1–R8. For the half-duplex mode of operation which will first be described, the transmitter terminals T1, T4, T7 and T8 are interconnected with the receiver terminals R1, R2, R4 and R8 by jumper connectors as shown by broken lines and the transmitting-receiving channel or line is connected from the transmitter terminal T1 of the local transmitter-receiver unit to the receiver terminal R6 of the remote transmitter-receiver unit and from the transmitter terminal T1 of the latter to the receiver terminal R6 of the local unit as also shown by broken lines. It will be understood that the remote transmitter-receiver unit has the same construction and electrical control circuit as that presently described.

These several transmitter and receiver terminal interconnections as last described are such that the distributor code selector contacts DCSC are connected in a series transmission channel circuit which may be traced from the negative terminal of the rectifier RE to the receiver terminal R1, by jumper connector to the transmitter terminal T4, through the manually adjustable resistor MR which is used to set the line current at a desired value related to the sensitivity of the receiving line relay RLR (a representative line current having the value of 60 milliamperes), the distributor code selector contact DCSC, the transmitter terminal T8 and a connector jumper to the receiver terminal R8, plug-receptacle JP15, contacts 17, 18 and 19, 20 of the punch error relay PER, plug-receptacle JP16, transmitter terminal T7 and a jumper connector to receiver terminal R7, the operating winding of the receiver line relay RLR, receiver terminal R6 and the external line conductor L to the transmitter terminal T1 of the remote transmitter-receiver unit, the receiver terminal R6 of the latter through the second line conductor L to the transmitter terminal T1 of the local unit, and a rectified-voltage filter network (comprised by a series inductor FL, a shunt condenser FC, and a shunt resistor FR) to the positive terminal of the rectifier RE. The circuit last traced through the local transmitter-receiver and punch unit is duplicated in the remote transmitter-receiver and punch unit, and both the receiver line relay RLR of the local unit and that of the remote unit have a bias winding which is connected through an adjustable resistor RSBR (used to set the desired value of relay bias current) to the receiver terminals R1 and R2 which are connected across the filtered output of the rectifier RE.

Thus as the distributor code selector contacts DCSC open and close during transmission of a code-bit group temporarily stored by action of the distributor magnets DM1–DM7, the transmission line electrical continuity is completed during each code interval when the distributor code selector contacts DCSC are closed and is interrupted during each interval when these contacts are open. As explained in connection with Fig. 23*a*, each transmission cycle of the distributor starts with a mark or line energized period (from 0° to 27° of the distributor) when the distributor code selector contacts DCSC are closed and this is followed by a "start" interval (from 27° to approximately 65° of the distributor cycle) when the distributor code selector contacts DCSC are open and the transmission line is therefore not energized. The start interval is then followed by the No. 1 through No. 7 bit periods of equal length, during which the distributor code selector contacts may be open or closed depending upon the respective space and mark code bits successfully sampled in the code-bit group transmitted. The transmission cycle of the distributor ends with a "stop" or mark interval (from approximately 332° to 360°) when the distributor code selector contacts are again closed.

Since the receiver line relay RLR of the local receiver also is actuated during this transmission cycle to its mark or space positions (respectively closing its contacts 1 and 3 or 1 and 2), its operation is locally used in connection with a "feed-back signal" which is transmitted from the remote transmitter-receiver unit to indicate either that the preceding code group was accurately received and recorded or was received and recorded in error. The manner in which this "feed-back signal" is developed by the remote transmitter-receiver unit will be explained hereinafter, but for the moment it may be pointed out that an error in the reception of a code group at the remote transmitter-receiver unit results in interruption of the transmission line. This condition is detected during the "stop" interval extending from approximately 332° through 360° of one distrbutor operating cycle and continuing to 27° of the next distributor cycle so that if the transmission line instead of being energized during the last mentioned interval is open circuited, the local receiver line relay RLR moves to its space position with its contacts 1 and 2 closed. The receiver line relay RLR thereupon energizes the reader stop relay RSR through a circuit which may be traced from the negatively energized plug-recptacle JP17, the contacts 1 and 2 of the receiver line relay RLR, the contacts 12 and 13 of the transmit relay TR which is energized at this time, and the distributor sampling period contacts DSPC (which close at 346½° near the end of a distributor cycle and remain closed until 13½° of the following distributor cycle as shown in Fig. 23*b*) to the reader stop relay RSR.

The latter relay thereupon picks up and energizes the indicator lamp IL of the tape reader unit through the reader stop relay contacts 7 and 8, establishes a hold circuit for itself through its contacts 2 and 3 as earlier explained, maintains the transmit relay energized through its contacts 14 and 15, drops out the punch error relay PER by opening the reader stop relay contacts 4 and 5, establishes at its contacts 16 and 17 an energizing circuit from the reader read switch S1 in Off position to the punch error relay PER, and interrupts at its contacts 1 and 2 the energizing circuit for the reader clutch magnet RCM so that the reader cannot cycle beyond its 0° or home position. It will accordingly be apparent that the receiving line relay RLR upon closing its contacts to the space position in response to the remotely developed error "feed back signal" automatically shuts down the local tape reader unit and thereby terminates all further transmissions.

The error in transmission is manually corrected by manually turning back the punch tape at the remote punch tape unit to a prearranged recording, such as the first recorded code group following the last word space code, and by thereafter operating the remote tape feed switch to delete-code all subsequent code recordings of the tape punch and thereby automatically restore the remote transmitter-receiver unit and punch unit for operation. A manual operation is also performed by the local operator in that the tape being read is manually turned back to the same prearranged point, such as the first code group following the last word spacing code, and the read switch S1 is then turned Off until the indicator light IL of the tape reader unit is extinguished in the manner previously explained to indicate that the remote units have again been conditioned for operation, whereupon the read switch S1 is again turned On and transmissions are thereupon resumed.

Consider now the manner in which code transmissions from a remote transmitter-receiver unit are received and recorded by the local receiver and punch unit. Reception requires that the read switch S1 of the tape reader unit be moved to its Off position to deenergize the transmit relay TR and thereby enable the completion of an energizing circuit for the code selector magnet CSM through a current limiting resistor R1 and the contacts 1 and 2 of the transmit relay TR to the contact 3 of the receiving line relay RLR. The local distributor is now at rest in its home position with the distributor code selector contacts closed, and this is initially true of the corresponding contacts of the transmitter at the remote transmitter-receiver unit so that, assuming the local punch error relay PER of the local punch unit is energized to place the local receiver in readiness for operation, the transmission line is in the "mark" or energized condition at this time as will be clear from the transmission line continuity circuit earlier traced in connection with the described operation of the local transmitter. The local receiving line relay RLR accordingly stands at this time with its contacts 1 and 3 closed in the mark position and the code selector magnet CSM stands energized but performs no function as thus energized at this time.

The remote transmitter starts its transmission by the initial mark or energized line condition followed by a "start" interval wherein the transmission line is deenergized. The local receiving line relay RLR thereupon moves to the space position at which its contacts 1 and 2 are closed, and the collector clutch magnet CCM is now energized through an energizing circuit which includes the collector knock-off contacts CKOC which are closed at this time since the collector stands in its 0° or home position, plug-receptacle JP12, contacts 9 and 10 of the punch error relay PER, contacts 3 and 4 of the tape feed relay TFR1, plug-receptacle JP11, contacts 11 and 12 of the transmit relay TR, and contacts 1 and 2 of the receiving line relay RLR to the negatively energized plug-receptacle JP17. It will be apparent that this energizing circuit prevents operation of the collector unless the punch error relay PER is energized and both the transmit relay TR and the tape feed relay TFR1 are deenergized. The collector knock-off contacts CKOC prevents energization of the collector clutch magnet CCM between 12° and 350° of the collector operating cycle.

Upon energization of the collector clutch magnet CCM as last described, the collector initiates a cycle of operation and the code selector magnet CSM is energized over a circuit which includes the mark position contacts 1 and 3 of the receiving line relay RLR and the normally closed contacts 1 and 2 of the transmit relay TR. The code selector magnet CSM is accordingly energized during the receiving cycle of the collector only at times when the receiving line relay RLR is in marking condition. The collector contacts CC1–CC7 are selectively set during the collector cycle of operation under control of the code selector magnet CSM as previously explained in connection with the selector mechanical structure. In particular, Fig. 23*e* represents graphically by cross-shaded areas the precise intervals during which the collector contacts CC1–CC7 are successively set by the cam and cam follower action of the collector. It will be appreciated that the collector contact setting intervals represented by Fig. 23*e* may be shifted in point of time with respect to the corresponding bit transmission periods shown in Fig. 23*a* by suitable adjustment of the distributor clutch quadrant (161 in Fig. 10) in order that the successive setting of the collector contacts CC1–CC7 may take place with relation to the operation of the code selector magnet CSM such that optimum operation (maximum amplitude of received mark code bit) occurs for various characteristics of transmission channels employed.

The punch clutch magnet PCM is energized during a "transfer" period of the collector over an energizing circuit which includes the plug-receptacle JP9, the contacts 1 and 2 of the collector detent contacts CDC, the contacts 1 and 2 of the collector transfer period contacts CTPC, a plug-receptacle JP10, the punch latch contacts PLC, and the contacts 3 and 4 of the punch power switch S3 to the negatively energized plug connector JP13. This same energizing circuit also energizes the collector contacts CC1–CC7 in common through the contacts 3 and 4 of the collector detent contacts CDC and the contacts 3 and 4 of the clutch transfer period contacts CTPC. The collector contacts CC1–CC7 in turn energize individual ones of the punch magnets PM1–PM8 (the punch magnet PM8 being energized by concurrent actuation of the collector contacts CC1 and CC2 alone as may be readily verified by inspection). The timing of the collector transfer period contact CTPC is graphically represented by Figs. 21 and 23*f* and that of the collector detent contact CDC by Figs. 21 and 23*g* from which it will be apparent that the collector transfer period contacts CTPC close just after the last collector bit contacts CC7 have been positioned. The collector detent contacts CDC open precisely at 360° of rotation of the collector cam shaft always to insure that the energizing circuits for the punch clutch magnet PCM and punch magnets PM1–PM8 are deenergized at the 0° or home position of the collector. The collector transfer period contacts CTPC close for only 45° and may or may not open the last-mentioned punch control energizing circuits depending on the previously mentioned setting of the collector clutch range quadrant. In this, it will be noted that the angular position of operation of the collector transfer period contacts CTPC changes with different settings of the collector range quadrant, but that the collector detent contacts CDC always close at 55° and open precisely at 360° (i.e., the 0° or home position) of the collector cycle regardless of the collector range quadrant setting. The collector transfer period contact CTPC is closed only for 45° to insure that the punch control energizing circuits for the punch clutch magnet PCM and punch magnets PM1–PM8 are open when the collector bit contacts CC1 are set at the outset of the collector cycle.

The energization of the punch clutch magnet PCM and punch magnets PM1–PM8 during the transfer period of the collector as last described initiates a cycle of the tape punch operation concurrently to punch all of the mark code bits of the code bit group collected during the preceding cycle of operation of the collector. The detailed operation of the punch unit in this regard is described more fully in the aforementioned copending Blodgett application, the punch clutch magnet PCM and punch magnets PM1–PM8 being deenergized by the opening of the punch latch contacts PLC near the outset of the punch operating cycle. Thus the punch continues through its operating cycle while the collector itself operates through a new cycle of successively setting and resetting each of the collector contacts CC1–CC7 in turn in accordance with the successively received code bits of a code-bit group as explained above in connection with the collector structure. In this, it will be noted that the collector knock-off contact CKOC interrupts the energizing circuit of the collector clutch magnet CCM at 12° of each collector cycle and does not close this energizing circuit again until the collector operation has progressed to 350° of its cycle thus insuring that the collector clutch magnet CCM is always deenergized near the end of the operating cycle. As earlier mentioned, the collector operates at a higher speed than the distributor so that the collector cam shaft stops at the end of every collector cycle and waits to be restarted by the start period of the remote distributor, thus insuring that the local collector is definitely timed by the remote distributor for each operating cycle of these units.

As the punch unit punches each newly received code, the punch pins PP1–PP8 actuate their associated contacts of the parity check system shown in Fig. 25*e* which is here shown as connected for a parity check of all odd number of code bits in each code-bit group. In this contact system, any of the contacts associated with the punch pins PP1–PP8 are actuated and transfer before the feed punch pin contacts F1 and F2 open, and the latter close before retransfer of the former. It will accordingly be evident from inspection of the parity check interconnections that as long as any odd number of code punch pins PP1–PP8 are operated, the electrical circuit between the common input terminal TE3 and the odd output terminal TE2 remains continuous through the parity contacts and thus maintains the hold circuit of the parity error relay PER uninterrupted. An even number of actuated punch pins PP1–PP8 will, however, interrupt this hold circuit and cause the punch error relay PER to drop out and thereby indicate an error in the received code by causing the punch error relay contacts 17, 18 and 19, 20 to open and interrupts the transmission line. The physical construction and arrangement of the parity check contacts and their mechanical connection to the punch pins is fully described in the copending Blodgett application.

The error "feed-back signal," produced as a line "mark" condition signaling accuracy of received information or a line "space" condition indicating error, is developed by the contacts 17, 18 and 19, 20 of the punch error relay which open the line circuit. This open line condition is detected by the distributor sampling period contacts DSPC to perform its sampling function earlier described. In this, it will be recalled from the described mechanical structure of the distributor that the distributor sampling period contacts DSPC are mounted on a quadrant to enable adjustment of the time of operation of these contacts to the point where the normal "mark" condition reaches maximum amplitude at the distributor.

The common terminal TE3 and the even terminal TE1 of the parity check contact system can alternately be used for indicating accuracy of reception and punch recording of a code system having an even number of code bits in each code group.

In connection with the collector operation above described, it was previously explained that the transmit relay TR opens the energizing circuits for the collector clutch magnet CCM as well as the code selector magnet CSM as long as the transmit relay TR remains energized so that the collector may not respond to the position of the contacts of the receiving line relay RLR. It was further pointed out that the read switch S1 might be manually turned Off at any point in the transmitting cycle of the distributor and that parallel circuits around the read switch contacts prevent the transmit relay TR from being deenergized until the complete code bit group had been translated by the distributor. This also prevents operation of the collector at a time when a transmitted code could improperly affect its operation. In particular, this intercontrol includes the distributor start-stop contact DSSC which maintains the transmit relay TR energized from 27° to 332° of the distributor cycle (which is the interval during which all code bits are sequentially transmitted), and the reader cam actuated contact RCC4 which maintains the transmit relay TR energized from 80° to 340° of the reader cycle.

B. HALF-DUPLEX OPERATION WITH TWO-WIRE LINE AND EXTERNAL LINE POWER

In accomplishing excitation of the transmission line from an external source of power, the only circuit changes from those described above comprise the removal of the jumper connector extending between the transmitter terminal T4 and the receiver terminal R1 and the connection of the line with its own power source to the transmitter-terminal T4 (with positive applied line voltage) and to the receiver terminal R6 (with negative voltage applied). The system operation, except for the manner of line energization, is the same as that described above and will not be repeated.

C. HALF-DUPLEX OPERATION WITH FOUR-WIRE LINE AND INTERNAL POWER

Figure 27:
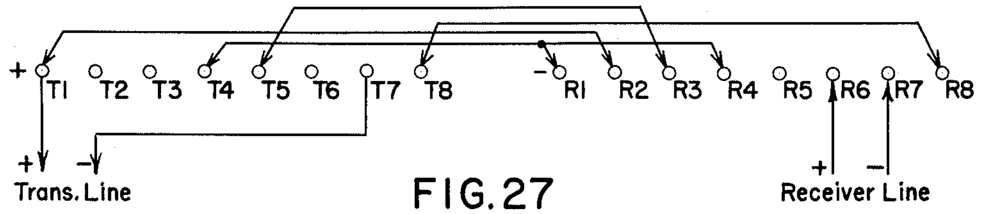

For half-duplex operation with a four-wire line and internal power applied to the line, the connections of the transmitting and receiving lines and the interconnections by jumper connectors of the transmitter and receiver terminals are shown in Fig. 27.

The transmission line circuit now extends from the positively energized transmitter terminal T1 to the remote receiver and back to the transmitter terminal T7. From here the circuit extends through plug-receptacle JP16, the contacts 17, 18 and 19, 20 of the punch error relay PER, plug-receptacle JP15, receiver terminal R8 and a jumper connector to transmitter terminal T8, the distributor code selector contacts DCSC, the adjustable resistor MR, transmitter terminal T4, and jumper connector to the negatively energized receiver terminal R1. The receiving line relay RLR is connected directly to the receiving line through the receiver terminals R6 and R7.

It will accordingly be apparent that the transmission line circuit last traced is interrupted by the contacts 17, 18 and 19, 20 of the punch error relay PER in the event that a code as transmitted from the remote transmitter is erroneously received by the local receiver. This terminates further transmission from the local transmitter, and the next cycle of the distributor in the remote receiver causes the remote punch error relay PER to drop out for reasons explained above and thereby terminate the remote transmissions. The local and remote receiving line relays RLR thereupon close their contacts to the space postion to pick up the read stop relay RSR at both the local and remote transmitter-receiver units, whereby transmissions in both directions cannot be resumed until the error has been corrected and the local and remote transmitters and receivers manually reset for further operation in the manner previously explained.

Aside from the differences in operation last enumerated, the operation of the communication system for this mode of operation is the same as previously described in connection with the half-duplex mode using a two-wire line.

The jumper connector between the transmitter terminal T5 and the receiver terminal R3 ensures a proper resetting operation of the read stop relay RSR in this mode of operation. That is, when the local punch error relay PER now drops out it closes its contacts 1 and 2 to place a negative potential from the punch power switch S3 in its On position through the plug-receptacle JP21 and the contacts 12 and 13 of the transmit relay TR to the local read stop relay RSR to hold the latter energized even though the receiving line electrical continuity is reestablished before the read switch S1 is manually actuated to its Off position to reset the local punch error relay PER. The latter resets through contacts 1 and 2 of the tape feed relay TFR2, plug-receptacle JP27, contacts 16 and 17 of the read stop relay RSR, plug-receptacle JR16, contacts 1 and 3 of the read switch S1 in its Off position, plug-receptacle JR19, receiver terminal R4, and jumper connector to the negatively energized receiver terminal R1. Note, however, that even though the local punch error relay PER is reset as last described, the read stop relay RSR continues to hold so long as the electrical continuity of the receiving line remains interrupted since the local receiving line relay RLR then remains deenergized with its contacts closed to the space position.

D. HALF-DUPLEX OPERATION WITH FOUR-WIRE LINE AND EXTERNAL LINE POWER

Figure 28:
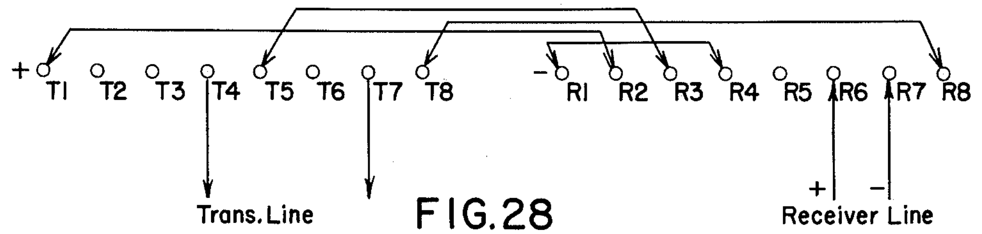

For this mode of operation, the connections of the transmitting and receiving lines and interconnections of the transmitter and receiver terminals are shown in Fig. 28. This arrangement is essentially similar to that last described, except that the transmission line is energized from an external power source, and the system operation will accordingly not be repeated.

E. HALF-DUPLEX OPERATION WITH TWO-WIRE LINE, INTERNAL POWER ON THE LINE, AND LOCAL REPUNCHING

Figure 29:
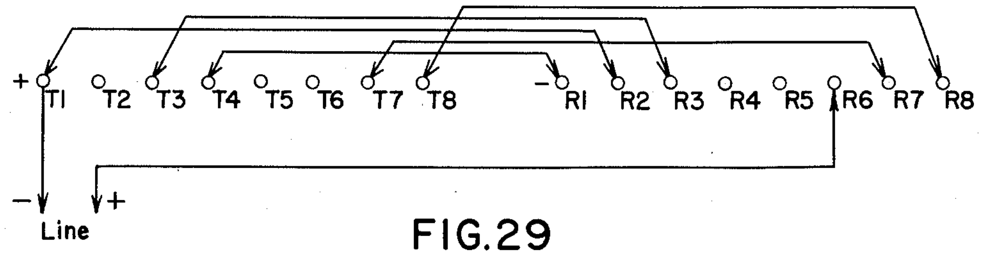

Since the transmitter-receiver unit is used with a local tape reader unit and local tape punch unit as shown in Fig. 1 earlier described, and inasmuch as the local punch unit is normally not operated while the local tape reader is used with the transmitter during transmitting operations, it is possible to use the local tape punch for the purpose of repunching the tape read at the tape reader. The interconnections of the transmitter and receiver terminals for this operation are shown in Fig. 29.

The transmit relay TR is not energized during the local repunching operation by reason of the omission of a jumper between receiver terminals R1 and R4. The jumper between the transmitter terminal T3 and the receiver terminal R3 bridges the transmit relay TR contacts 12 and 13 to permit the reader stop relay RSR to be picked up by the distributor sampling period contacts DSPC during the sampling period if the transmission line should be interrupted or by reason of an error signal transmitted to the local unit from the remote receiver unit. With the connections shown in Fig. 29, the distributor code selector contact DCSC in operating the receiver line relay RLR also causes operation of the code selector magnet CSM and the collector clutch magnet CCM and thereby effects operation of the local punch unit in the same manner as though the collector were receiving a remotely originating transmission. Accordingly, the information which is read from the local punched tape and transmitted by the transmitter is concurrently supplied through the local collector to the local punch unit where the information is repunched into a new tape to duplicate the tape being read at the tape reader.

F. FULL-DUPLEX OPERATION WITH FOUR-WIRE LINE AND INTERNAL POWER ON THE LINE

Figure 30:
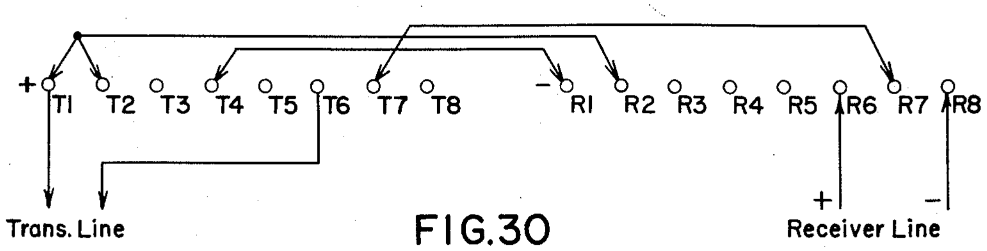

The interconnections of the transmitter and receiver terminals for this mode of operation are shown in Fig. 30. For this mode of operation, and that next to be described, the transmitting line relay TLR (shown in broken lines) is also plugged into circuit.

The operating winding of the receiver line relay RLR is now in series with the contacts 17, 18 and 19, 20 of the punch error relay PER (this circuit being traced through plug-receptacles JP15 and JP16) so that these contacts are included in the receiving channel. The operating winding of the transmit line relay TLR is now in series with the distributor code selector contacts DCSC in the transmitting channel, and its bias winding is energized by a jumper conductor between the transmitter terminals T1 and T2 and includes an adjustable resistor TSBR to set the value of bias current. The transmit relay TR does not now operate, and the distributor sampling period contact DSPC is connected to the spacing contact of the transmitter line relay TLR. Since the remote receiver completes the transmitting line circuit through the contacts 17, 18 and 19, 20 of the remote punch error relay PER, deenergization of the latter due to an error in the received and recorded code group will place the local transmit line relay TLR in its space position (closing its contacts 1 and 2) at the distributor sampling period when its contacts DSPC are closed. This condition causes energization of the read stop relay RSR to terminate operation of the reader. The error which terminated the operation is corrected and transmission resumed in the manner earlier described.

G. FULL-DUPLEX OPERATION WITH FOUR-WIRE LINE AND EXTERNAL POWER ON THE LINE

Figure 31:
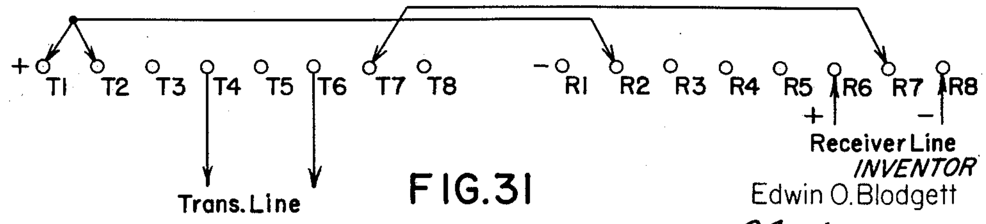

The interconnections of the transmitter and receiver terminals for this mode of operation are shown in Fig. 31, and since the operation aside from the manner of line energization is like that last described it will not be repeated.

V. SYSTEM INTERLOCKS

It will be apparent from the foregoing description that the several units of the system have numerous electrical interlocks to avoid erroneous operation. For example, it will be noted that the tape reader unit cannot be operated unless power is turned On in the transmitter-receiver unit. Transmission stops automatically at the end of a read tape, or if the tape has become excessively tight, or if the feed arm of the tape reader is not in proper position for correct tape feed. Transmission cannot be manually interrupted during a code cycle in a manner which might mutilate the code. Transmision is automatically stopped if the power at the remote receiver unit is turned Off, and is also automatically stopped if the supply of tape at the remote punch unit is exhausted or becomes excessively tight or if the feed arm is not in proper feeding position. Transmission is also automatically stopped if the communication channel becomes interrupted for any reason. The receiver also automatically stops if the communication channel becomes interrupted, since the receiver operates through one cycle during the period when no code group is received and the parity check contacts thereupon drop out the associated punch error relay PER. Transmission is further automatically stopped whenever the actual number of holes punched in the tape of the remote punch does not satisfy parity requirements, thus not only providing a check of transmission accuracy but in addition providing check of the proper operation of all equipment at both ends of the communication system. In half-duplex operation, transmission is stopped in the event the remote receiver has its manual controls left in the transmitting position. Manual resetting operations are required at both the transmitting and receiving equipments after transmission has been automatically stopped because of some abnormal condition, and in indication is provided at the transmitter when the receiver has been reset for continued operation after an automatic stop or at the outset of initial transmissions. The receiving equipment is not reset during a code delete operation, but only at the end of such operation. In half-duplex operation, manual operation of the read switch during transmission cannot transfer the system to receiving condition at a time which would cause local repunching of a transmitted code group.

Instead of controlling the distributor from a tape reader and having the collector control a tape punch as above described, the distributor may be directly controlled by (and the collector may directly control) the printing machine disclosed in the aforementioned Blodgett et al. application. For this purpose, the code selector contacts SC1–SC10 of the latter arrangement directly energize the distributor magnets DM1 to DM7 and the distributor clutch magnet DCM of the code distributor. The collector contacts CC1–CC7 and the clutch energizing circuit of the plug-receptacle JP9 of the code collector may directly energize the translator magnets T1–T8 and the translator clutch magnet TC of the Blodgett et al. printing machine. This enables copy manually printed at a local printing machine to be automatically reproduced at a remote printing machine.

While specific forms of the invention have been described for purposes of illustration, it is contemplated that numerous changes may be made without departing from the spirit of the invention.

What is claimed is:

1. A code-form converter comprising: a plurality of information-storage elements each movable to either of two positions of which one is a latch-retainable position denoting storage of a first form of code bit and the other is an unlatched position denoting storage of a second form of code bit included in a binary-form multiple-bit-group representation of coded information; a plurality of latch elements arranged to latch individual ones of said storage elements in said one position thereof; means having an operating cycle corresponding to the period of presentation of successive code-bit groups for initially positioning each said storage element in said one position thereof and including electromagnetic means energized in response to the forms of the code bits included in each code-bit group of information presented thereto for selectably controlling said latch elements to latch said storage elements in and unlatch said storage elements to said one and said other positions thereof to store each said code-bit group; means controllable by said storage elements for effecting translation of the code-bit group stored by said storage elements as an electrical signal; and means operative during said operating cycle and cooperating with one of said positioning and translating means to cause, by further movement of one type of said elements subsequent to the initial positioning of said storage elements in said one position, said code-bit group translation to be one with the code bits of a group arranged as a selected one of a series-bit and a parallel-bit code-form presentation.

2. A code-form converter comprising: a plurality of information-storage elements each movable to either of two positions of which one is a latch-retainable position denoting storage of a first form of code bit and the other is an unlatched position denoting storage of a second form of code bit included in a binary-form multiple-bit-group representation of coded information; a plurality of latch elements arranged to latch individual ones of said storage elements in said one position thereof; means including electromagnetic means responsive to each code-bit group of information presented thereto during an operating cycle corresponding to the period of presentation of successive code-bit groups and further including a cam and cam follower individual to each said storage element for initially positioning each said storage element in said one position thereof and for selectably controlling said latch elements to latch said storage elements in and unlatch said storage elements to said one and said other positions thereof to store each said code-bit group; means controllable by said storage elements for effecting translation of the code-bit group stored by said storage elements as an electrical signal; and means operative during said operating cycle and cooperating with said cams and cam followers to cause, by further movement of one type of said elements subsequent to the initial positioning of said storage elements in said one position, said code-bit group translation to be one with the code bits of a group arranged as a selected one of a series-bit and a parallel-bit code-form presentation.

3. A code-form converter comprising, a plurality of information-storage elements each movable to either of two positions of which one is a latch-retainable position denoting storage of a first form of code bit and the other is an unlatched position denoting storage of a second form of code bit included in a binary-form multiple-bit-group representation of coded information, means having a cyclic operation corresponding to each information code group to be translated and including a cam and cam follower individual to each said element and electromagnetically controlled latching means responsive to said each code-bit group of information presented thereto for first positioning and positively latching each said element in said one position thereof and for then selectably unlatching said each element to said other position thereof to effect positional storage in individual ones of said elements of individual code bits of said each group according to the individual code-bit form, and means operative upon completion of the selective positioning of all said elements for effecting translation of the code-bit group stored by said elements as an electrical signal having the code bits thereof arranged as a selected one of a series-bit and a parallel-bit code-form presentation.

4. A code-form converter comprising, a plurality of information-storage elements each movable to either of two positions of which one is a latch-retainable position denoting storage of a first form of code bit and the other is an unlatched position denoting storage of a second form of code bit included in a binary-form multiple-bit-group representation of coded information, means responsive to the individual form of the code bits included in each code-bit group of information presented thereto as a parallel-bit code-form presentation for concurrently positioning said elements first in said one position and then selectively in said other position thereof to effect positional storage in individual ones of said elements of individual code bits of said each group thereof according to the individual code-bit form, and means operative upon completion of the selective positioning of all said elements and sequentially responsive to the selective positioning thereof for effecting translation of the code-bit group stored by said elements as an electrical signal having the code bits thereof arranged as a series-bit code-form presentation.

5. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, means including electromagnetically operated means responsive to concurrent electrical energizations corresponding to concurrent code mark bits of each of successive code-bit groups of information presented thereto for concurrently positioning said elements first in said one position and then selectively in said other position thereof to effect positional storage in individual ones of said elements of individual code bits of said each group thereof according to the individual code-bit form, and means operative upon completion of the selective positioning of all said elements and sequentially responsive to the selective positioning thereof for effecting translation of the code-bit group stored by said elements as an electrical signal having the code bits thereof arranged as a series-bit code-form presentation.

6. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, means for initiating each of successive cycles of converter operation for each of successively available code-bit groups of information presented to said converter, means operated during the initial portion of each said converter cycle and responsive to each said successive code-bit group of information presented thereto as a parallel-bit code-form presentation for concurrently positioning said elements first in said one position and then selectively in said other position thereof to effect positional storage in individual ones of said elements of individual code bits of said each group thereof according to the individual code-bit form, and means operative during the remainder of said each converter cycle following completion of the selective positioning of all said elements and sequentially responsive to the selective positioning thereof for effecting translation of the code-bit group stored by said elements as an electrical signal having the code bits thereof arranged as a series-bit code-form presentation.

7. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, means for biasing each of said elements to said other position thereof, means having an operating cycle corresponding to each of successively presented information code groups to be translated for first positioning each said element in said one position thereof and including latching means responsive to each said code-bit group presented thereto as a parallel-bit code-form presentation for selectively unlatching said elements to said other position thereof to effect storage in individual ones of said elements of individual code bits of said each group thereof, and means operative upon completion of the selective positioning of all said elements and sequentially responsive to the selective positioning thereof for effecting translation of the code-bit group stored by said elements as an electrical signal having the code bits thereof arranged as a series-bit code-form presentation.

8. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, means for biasing each of said elements to said other position thereof, means having a cyclic operation corresponding to each of successively presented information code groups to be translated for first positioning each said element in said one position thereof and including a plurality of electro-magnetically operated latches responsive to electrical energizations corresponding to individual ones of the code mark bits of each said code-bit group presented thereto as a parallel-bit code-form presentation for selectively unlatching said elements to said other position thereof to effect storage in individual ones of said elements of individual code bits of said each group thereof, and means operative upon completion of the selective positioning of all said elements and sequentially responsive to the selective positioning thereof for effecting translation of the code-bit group stored by said elements as an electrical signal having the code bits thereof arranged as a series-bit code-form presentation.

9. A code-form converter comprising, a plurality of information-storage elements each movable to either of two positions of which one denotes storage of a code space bit and the other denotes storage of a code mark bit included in a binary-form multiple-bit-group representation of coded information, means responsive to each code-bit group of information presented thereto as a parallel-bit code-form presentation and including a cam and cam follower individual to each said element for concurrently positioning said elements first in said one position and then selectively in said other position thereof to effect storage in individual ones of said elements of individual code bits of said each group thereof, and means operative upon completion of the selective positioning of all said elements and sequentially responsive to the selective positioning thereof for effecting translation by the code-bit group stored by said elements as an electrical signal having the code bits thereof arranged as a series-bit code-form presentation.

10. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of electromagnetically operated latches responsive to electrical energizations corresponding to individual ones of the code mark bits of each code-bit group presented thereto as a parallel-bit code-form presentation for selectively unlatching said elements to said other position thereof, cam and cam followers individual to each said element and having a cyclic operation corresponding to each of successively presented code groups for first positioning each said element in said one position thereof and then releasing the unlatched ones of said elements to said second positions thereof to effect storage in individual ones of said elements of individual code bits of each said group thereof, and means operative upon completion of the selective positioning of all said elements and sequentially responsive to the selective positioning thereof for effecting translation of the code-bit group stored by said elements as an electrical signal having the code bits thereof arranged as a series-bit code-form presentation.

11. A code-form converter comprising, a plurality of information-storage elements each movable to either of two positions of which one is a latch-retainable position denoting storage of a first form of code bit and the other is an unlatched position denoting storage of a second form of code bit included in a binary-form multiple-bit-group representation of coded information, means including latch control means responsive to the individual form of the code bits included in each code-bit group of information presented thereto as a parallel-bit code-form presentation for concurrently positioning said elements first in said one position and then selectively unlatching said elements to said other position thereof to effect positional storage in individual ones of said elements of individual code bits of said each group thereof according to the individual code bit form, means operative upon completion of the selective positioning of all said elements and sequentially responsive to said selective positioning thereof for effecting translation of the code-bit group positionally stored by said elements as a series-bit code-form presentation, and means controlled by said first-named means for establishing the limits of an initial interval during which each said code-bit group is presented to said latch control means.

12. A code-form converter comprising, a plurality of information-storage elements each movable to either of two positions of which one denotes storage of a code space bit and the other denotes storage of a code mark bit included in a binary-form multiple-bit-group representation of coded information, means responsive to each code-bit group of information presented thereto for controllably positioning each said element to store said code-bit group, means for additionally controllably positioning those of said elements which are in said second positions thereof successively to a third position thereof during individual ones of successive code-bit translating intervals, and means actuated by those of said elements which move to said third positions thereof for effecting sequential translation of the code bits included in the code-bit group stored by said elements.

13. A code-form converter comprising, a plurality of information-storage elements each movable to either of two positions of which one denotes storage of a code space bit and the other denotes storage of a code mark bit included in a binary-form multiple-bit-group representation of coded information, cam means for actuating said elements concurrently to said first positions thereof and then permit concurrent movements of said elements individually to said second positions thereof and thereafter permit elements in said second position to move one at a time successively to a third code translating position, means responsive to concurrently presented bits of each code-bit group applied thereto while said elements are all in said first position thereof for releasing selectable ones of said elements to move to said second position to store said code-bit group, and means responsive to the successive movements of said selectable elements to said third position thereof for effecting sequential translation of the code bits included in a code-bit group stored by said elements.

14. A code-form converter comprising a plurality of information-storage elements each movable to either of two positions of which one denotes storage of a code space bit and the other denotes storage of a code mark bit included in a binary-form multiple-bit-group representation of coded information, cyclically operating means for positionally actuating said elements and having each operating cycle thereof initiated and terminated with all of said elements actuated thereby concurrently to said first position thereof, the intervening cyclic period of said means being divided into successive intervals beginning with an initial interval wherein said elements are permitted to have concurrent movements individually to said second position thereof and succeeding intervals wherein each of said elements in said second position is permitted to move individually and successively in turn through a third code translating position and back to said first position, means responsive to concurrently presented code bits of each code-bit group applied thereto while said elements are all in said first position during said initial portion of said operating cycle for releasing selectable ones of said elements to said second position thereof in accordance with the code form of corresponding individual ones of said applied code bits to store said applied code-bit group, and means responsive to the successive movements of said selectable elements to said third position thereof for effecting sequential translation of the code bits included in a code-bit group positionally stored by said elements.

15. A code-form converter comprising, a plurality of information-storage elements each movable to either of two positions of which one is a latch retainable position denoting storage of a first form of code bit and the other is an unlatched position denoting storage of a second form of code bit included in a binary-form multiple-bit-group representation of coded information, element-positioning means responsive to the individual form of the code bits included in each code-bit group of information presented thereto as a parallel-bit code-form presentation for concurrently positioning said elements first to said one position and then selectively to said other position thereof to effect positional storage in individual ones of said elements of individual code bits of said each group thereof, means operative after selective positioning of all said elements and sequentially responsive to said selective positioning thereof for effecting translation of the code-bit group stored by said elements in a series-bit code-form presentation, and means actuated after translation of said stored code-bit group for conditioning an error signal translation control device for actuation in response to an indicated error in the code-bit group translation.

16. A code-form converter comprising, a plurality of information-storage elements each movable to either of two positions of which one is a latch-retainable position denoting storage of a first form of code bit and the other is an unlatched position denoting storage of a second form of code bit included in a binary-form multiple-bit-group representation of coded information, means including cyclically operating cam means and means responsive to the individual form of the code bits included in each code-bit group of information presented thereto as a parallel-bit code-form presentation for concurrently positioning said elements first in said one position and then selectively in said other position thereof to effect positional storage in individual ones of said elements of individual code bits of said each group thereof, means operative upon completion of the selective positioning of all said elements and sequentially responsive to said selective positioning thereof for effecting translation of the code-bit group stored by said elements in a series-bit code-form presentation, means actuated by said cam means during a terminal portion of the cycle thereof for conditioning an error signal translation control device for actuation in response to an indicated error in the code group translation, and means for selectively positionally adjusting one of said last-mentioned means and said cam means to adjust the point in said cycle at which said terminal portion thereof is initiated.

17. A code-form converter comprising, a plurality of information-storage elements each movable to either of two positions of which one denotes storage of a code space bit and the other denotes storage of a code mark bit included in a binary-form multiple-bit-group representation of coded information, means responsive to each code-bit group of information presented thereto and including cam means operable cyclically to control the position of each said element to one of said two positions thereof in accordance with the form of a corresponding individual code bit included in said group and thereby positionally store said code-bit group by said element position, said cam means being thereafter operative during each cycle thereof additionally controllably to position those of said elements which are in said second positions thereof successively and in turn to a third position thereof during individual ones of successive code-bit translating intervals, means actuated by those of said elements which move to said third position thereof for effecting sequential translation of the code bits included in the code-bit group stored by said elements, means actuated by said cam means during a terminal portion of the cycle thereof following said code-group translation for conditioning an error signal translation control device for actuation in response to an error signal indicative of error in the code-group translation, and means for selectably positionally adjusting one of said last-named means and said cam means to adjust the point in the cycle of said cam means at which said terminal portion thereof is initiated.

18. A code-form converter comprising, a plurality of information-storage elements each movable to either of two positions of which one denotes storage of a code space bit and the other denotes storage of a code mark bit included in a binary-form multiple-bit-group representation of coded information, cyclically operating cam means effective during each cycle thereof to actuate said elements concurrently to said first positions thereof and then permit concurrent movements of said elements individually to said second positions thereof and thereafter permit elements in said second position to move one at a time successively to a third code translating position, means responsive to concurrently presented bits of each code-bit group applied thereto while said elements are all in said first position thereof for releasing selectable ones of said elements to move to said second position to store said code-bit group, means responsive to said successive movements of said selectable elements to said third position thereof for effecting sequential translation of the code bits included in a code-bit group stored by said elements, and means actuated by said cam means during a terminal portion of the cycle thereof for actuating an error-signal translation control device.

19. A code-form converter comprising, a plurality of information-storage elements each movable to either of two positions of which one denotes storage of a code space bit and the other denotes storage of a code mark bit included in a binary-form multiple-bit-group representation of coded information, cyclically operating means effective during each cycle thereof to actuate said elements concurrently to said first positions thereof and then permit concurrent movements of said elements individually to said second position thereof and thereafter permit elements in said second position to move one at a time successively to a third code translating position, means responsive to concurrently presented bits of each code-bit group applied thereto while said elements are all in said first position thereof for releasing selectable ones of said elements to move to said second position to effect storage by element positioning of said code-bit group, circuit control means adapted to control the energized state of a transmission line in response to said successive movements of said selectable elements to said third position thereof for effecting sequential translation of the code bits included in a code-bit group stored by said elements, an error signal indicating device, and means actuated at the termination of said code-bit-group translation for sampling the energized state of said transmission line to actuate said error signal indicating device in response to a predetermined state of line energization indicative of the presence of an error signal.

20. A code-form converter comprising, a plurality of information-storage elements each movable to either of two positions of which one denotes storage of a code space bit and the other denotes storage of a code mark bit included in a binary-form multiple-bit-group representation of coded information, cyclically operating cam means effective during each cycle thereof to actuate said elements concurrently to said first positions thereof and then permit concurrent movements of said elements individually to said second positions thereof and thereafter permit elements in said second position to move one at a time successively to a third code translating position, means responsive to concurrently presented bits of each code-bit group applied thereto while said elements are all in said first position thereof for releasing selectable ones of said elements to move to said second position to store said code-bit group, means responsive to said successive movements of said selectable elements to said third position thereof for effecting sequential translation of the code bits included in a code-bit group stored by said elements, means actuated by said cam means during a terminal portion of the cycle thereof for actuating an error-signal translation control device, and means for preselectably positionally adjusting one of said last-mentioned and said cam means to adjust the point in said cycle at which said terminal portion thereof is initiated.

21. A code-form converter comprising, a plurality of information-storage elements each movable to either of two positions of which one denotes storage of a code space bit and the other denotes storage of a code mark bit included in a binary-form multiple-bit-group representation of coded information, cyclically operating cam means effective during each cycle thereof to actuate said elements concurrently to said first positions thereof and then permit concurrent movements of said elements individually to said second positions thereof and thereafter permit elements in said second position to move one at a time successively to a third code translating position, code-storage control means responsive to concurrently presented bits of each code-bit group applied thereto while said elements are all in said first position thereof for releasing selectable ones of said elements to move to said second position to store said code-bit group, means responsive to said successive movements of said selectable elements to said third position thereof for effecting sequential translation of the code bit included in a code-bit group stored by said elements, and means actuated by said cam means for establishing the limits of an initial period within said operating cycle during which each code-bit group is applied to said code-storage control means.

22. A code-form converter comprising, a plurality of information-storage elements each movable to either of two positions of which one denotes storage of a code space bit and the other denotes storage of a code mark bit included in a binary-form multiple-bit-group representation of coded information, cyclically operating cam means effective during each cycle thereof to actuate said elements concurrently to said first positions thereof and then permit concurrent movements of said elements individually to said second positions thereof and thereafter permit elements in said second position to move one at a time successively to a third code translating position, a source of drive power, means including a single revolution clutch for controllably coupling said cam means to said source to control successive cycles of operation thereof, means responsive to concurrently presented bits of each code-bit group applied thereto while said elements are all in said first position thereof for releasing selectable ones of said elements to move to said second position to store said code-bit group, means responsive to said successive movements of said selectable elements to said third position thereof for effecting sequential translation of the code bits included in a code-bit group stored by said elements, and means actuated by said cam means for limiting the control of said clutch over the cyclic operation of said cam means to an interval beginning near the end of one said operating cycle and continuing into the initial portion of a succeeding operating cycle.

23. A code-form converter comprising, a plurality of information-storage levers pivotally movable angularly to either of two positions of which one is a latch-retainable position denoting storage of a code space bit and the other is an unlatched position denoting storage of a code mark bit included in a binary-form multiple-bit-group representation of coded information, cam means for actuating said levers concurrently to said first positions thereof and then permit concurrent movements of said levers individually to said second positions thereof and thereafter permit levers in said second position to move one at a time successively to a third code translating position, electromagnetic means individual to each said lever and including an armature having a deenergized position for latching said each lever in said first position but responsive to individual ones of concurrently presented code mark bits of a code-bit group applied thereto while said levers are all in said first position thereof for releasing selectable ones of said levers to move to said second position to store said applied code-bit group, means responsive to said successive movements of said selectable levers to said third position thereof for effecting sequential translation of the code bits included in a code-bit group stored by said levers, and means actuated by said cam means at the initiation of the actuation of said levers to said first positions thereof for forcibly moving all of said armatures to said deenergized positions thereof.

24. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, means having an operating cycle corresponding to the periodicity at which successive information code groups are presented for actuating said storage elements and associated latch elements in order successively at successive code-bit intervals to position said storage elements for positive latching in said one position thereof by an associated one of said latch elements and including electromagnetic latch control means responsive to the code mark bits of each code-bit group of information presented thereto in sequential-bit code form for controlling said latch elements during actuation of each thereof selectively to unlatch said storage elements to said other position thereof and effect storage thereby of said code-bit group, and means concurrently responsive to the selective positioning of all said storage elements for effecting translation of the code-bit group stored thereby with the code bits thereof in a parallel-bit code-form presentation.

25. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, means having an operating cycle corresponding to the periodicity at which successive information code groups are presented and including plural cams and cam followers for moving said storage elements and associated latch elements in order successively at successive code-bit intervals to position said storage elements for positive latching in said one position thereof by an associated one of said latch elements, electromagnetic latch control means responsive to the code mark bits of each code-bit group of information presented thereto in sequential-bit code form for controlling said latch elements during movement of each thereof selectively to unlatch said storage elements to said other position thereof and effect storage thereby of said code-bit group, and means concurrently responsive to the selective positioning of all said storage elements for effecting translation of the code-bit group stored thereby with the code-bits thereof in a parallel-bit code-form presentation.

26. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, means having an operating cycle corresponding to the periodicity at which successive information code groups are presented and including a cam and cam follower individual to each said storage element and associated latch element for movement thereof in order and successively at successive code-bit intervals to position said storage elements in positive latching engagement in said one position thereof by an associated one of said latch elements and further including electromagnetic latch control means responsive to the code mark bits of each code-bit group of information presented thereto in sequential-bit code form for controlling said latch elements during said movement of each thereof selectively to unlatch said storage elements to said other position thereof and effect storage thereby of said code-bit group, and means concurrently responsive to the selective positioning of all said storage elements for effecting translation of the code-bit group stored thereby with the code bits thereof in a parallel-bit code-form presentation.

27. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, means having an operating cycle corresponding to the periodicity at which successive information code groups are presented and including plural cams and cam followers for actuating said storage elements and associated latch elements in order successively at successive code-bit intervals to position said storage elements for positive latching in said one position thereof by an associated one of said latch elements, electromagnetic latch control means energized by the code mark bits of each code-bit group of information presented thereto in sequential-bit code form for controlling said latch elements during actuation of each thereof selectively to unlatch to said second position the storage element associated with any latch element which is actuated substantially coincident with the said energization of said latch control means by a code mark bit, thereby to effect storage by said storage elements of said code-bit group, and means concurrently responsive to the selective positioning of all said storage elements for effecting translation of the code-bit group stored thereby with the code bits thereof in a parallel-bit code-form presentation.

28. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, a plurality of cams operating in unison through a cam cycle corresponding to the periodicity at which successive information code groups are presented for actuating individual ones of said storage elements and associated latch elements in order successively at successive code-bit intervals sequentially to position said storage elements for positive latching in said one position thereof by an associated one of said latch elements, and electromagnetic latch control means energized by the code mark bits of each code-bit group of information presented thereto in sequential-bit code form for providing during each such energization a fixed pivot for said latch elements during actuations thereof to effect selective unlatching of said storage elements to said other position thereof and storage by said storage elements of said code-bit group.

29. A code-form converter comprising, a plurality of information-storage elements each movable to either of two positions of which one is a latch-retainable position denoting storage of a code space bit and the other is an unlatched position denoting storage of a code mark bit included in a binary-form multiple-bit-group representation of coded information, a plurality of latch elements arranged and biased to latch individual ones of said storage elements in said one position thereof, a plurality of cams operating in unison through a cam cycle corresponding to the periodicity at which successive information code groups are presented for actuating individual ones of said storage elements and associated latch elements in order successively at successive code-bit intervals sequentially to position said storage elements for positive latching in said one position thereof by an associated one of said latch elements, electromagnetic latch control means energized by the code mark bits of each code-bit group of information presented thereto in sequential-bit code form for providing during each such energization a fixed pivot for said latch elements during actuations thereof to effect selective unlatching of said storage elements to said other position thereof and storage by said storage elements of said code-bit group, and means for adjustably presetting the initiation of the operating cycle of said cams with relation to the time of presentation of the first of said code bits to said last-named means.

30. A code-form converter comprising, a plurality of information storage elements each movable to a first position but normally tending to move to a second position respectively denoting storage of a first form of code bit and storage of a second form of code bit included in a binary-form multiple-bit-group representation of coded information, first cam-actuated means for setting said elements successively in turn to said first position thereof, a plurality of code-selector latching members each biased positively to latch an individual one of said elements in said first position thereof, second cam-actuated means for providing positive cam-actuated movement of each said latching member against said bias thereof and immediately following the cam setting of the associated one of said storage elements, and control means responsive to an applied code-bit group of sequential code bits occurring substantially coincidentally with the actuations of said latching members for controlling the character of movement of said latching members effected by said second cam-actuated means to utilize said actuations thereof and effect unlatching release thereby to said second position of any storage element the said setting of which is substantially coincident with the occurrence of an applied code bit of a predetermined one of said forms thereof, whereby the positions of said elements following said sequentially applied code bits effectively store said applied code-bit group of coded information.

31. A code-form converter comprising, a plurality of code-storage levers each movable to a first position but normally tending to move to a second position respectively denoting storage of a code space bit and storage of a code mark bit included in a binary-form multiple-bit-group representation of coded information, a movable code selector lever individual to each said storage levers and including a latch bar normally biased to latch its associated storage lever in said first position thereof and angularly movable with its selector lever about the latch point as a pivot, a code selector magnet adapted to be energized by code mark bits sequentially applied thereto during successive bit intervals and including an armature movable from a normally deenergized position out of engagement with any of said latch bars to an energized position engaging all of said latch bars and providing a second pivot point therefor to cause any subsequent angular movement of any latch bar to occur about the armature as a pivot and thereby move the latch bar out of latching engagement with its associated storage lever, and a plurality of actuating cams for successively and alternately actuating at said bit intervals said storage levers and selector levers to move each said storage lever in turn to said first position thereof and immediately thereafter to move the associated selector lever to effect said angular movement of its latch bar about one of said pivot points, thereby to position said storage levers to store individual code bits included in an information code-bit group and sequentially applied to energize said selector magnet.

32. A code-form converter comprising, a plurality of pivoted code selector levers each angularly movable to a first position but normally tending to move to a second position respectively denoting storage of a code space bit and storage of a code mark bit included in a binary-form multiple-bit-group representation of coded information, a pivoted code selector lever individual to each said storage lever and including at its free end a pivoted latch bar normally biased to latch its associated storage lever in said first position thereof and angularly movable with its selector lever about the latch point as a pivot, a code selector magnet adapted to be energized by code mark bits sequentially applied thereto during successive bit intervals and including an armature movable from a normally deenergized position out of engagement with any of said latch bars to an energized position engaging all of said latch bars and providing a second pivot point therefor to cause any subsequent angular movement of any latch bar to occur about the armature as a pivot and thereby move the latch bar out of latching engagement with its associated storage lever, and a plurality of actuating cams for successively and alternately actuating at said bit intervals said storage levers and selector levers to move each said storage lever in turn to said first position thereof and immediately thereafter to move the associated selector lever to effect said angular movement of its latch bar about one of said pivot points, thereby to position said storage levers to store individual code bits included in an information code-bit group and sequentially applied to energize said selector magnet.

33. A code-form converter comprising, a plurality of electrical control devices each operated by an actuating lever movable to a first position but normally biased to move to a second position respectively denoting storage of a code space bit and storage of a code mark bit included in a binary-form multiple-bit-group representation of coded information, a movable code selector lever individual to each said actuating lever and including a latch bar normally biased to latch its associated actuating lever in said first position thereof and angularly movable with its selector lever about the latch point as a pivot, a code selector magnet adapted to be energized by code mark bits sequentially applied thereto during successive bit intervals and including an armature movable from a normally deenergized position out of engagement with any of said latch bars to an energized position engaging all of said latch bars and providing a second pivot point therefor to cause any subsequent angular movement of any latch bar to occur about the armature as a pivot and thereby move the latch bar out of latching engagement with its associated actuating lever, a plurality of actuating cams for successively and alternately actuating at said bit intervals said acuating levers and selector levers to move each said actuating lever in turn to said first position thereof and immediately thereafter to move the associated selector lever to effect said angular movement of its latch bar about one of said pivot points, thereby to position said control devices to store individual code bits included in an information code-bit group applied to energize said selector magnet, and electrical control means operated in unison with said actuating cams for completing an electrical circuit to each of said control devices following completion of cam actuation of the last actuating lever and associated selector lever.

34. A code-form converter comprising, a plurality of code-storage levers each movable to a first position but normally tending to move to a second position respectively denoting storage of a code space bit and storage of a code mark bit included in a binary-form multiple-bit-group representation of coded information, a movable code selector lever individual to each said storage levers and including a latch bar normally biased to latch its associated storage lever in said first position thereof and angularly movable with its selector lever about the latch point as a pivot, a code selecter magnet adapted to be energized by code mark bits sequentially applied thereto during successive bit intervals and including an armature movable from a normally deenergized position out of engagement with any of said latch bars to an energized position engaging all of said latch bars and providing a second pivot point therefor to cause any subsequent angular movement of any latch bar to occur about the armature as a pivot and thereby move the latch bar out of latching engagement with its associated storage lever, a plurality of actuating cams for successively and alternately actuating at said bit intervals said storage levers and selector levers to move each said storage lever in turn to said first position thereof and immediately thereafter to move the associated selector lever to effect said angular movement of its latch bar about one of said pivot points, thereby to position said storage levers to store individual code bits included in an information code-bit group applied to energize said selector magnet, a mechanical drive source, and means including a single revolution clutch for drivingly connecting said source to said actuating cams.

35. A code-form converter comprising, a plurality of code-storage levers each movable to a first position but normally tending to move to a second position respectively denoting storage of a code space bit and storage of a code mark bit included in a binary-form multiple-bit-group representation of coded information, a movable code selector lever individual to each said storage levers and including a latch bar normally biased to latch its associated storage lever in said first position thereof and angularly movable with its selector lever about the latch point as a pivot, a code selector magnet adapted to be energized by code mark bits sequentially applied thereto during successive bit intervals and including an armature movable from a normally deenergized position out of engagement with any of said latch bars to an energized position engaging all of said latch bars and providing a second pivot point therefor to cause any subsequent angular movement of any latch bar to occur about the armature as a pivot and thereby move the latch bar out of latching engagement with its associated storage lever, a plurality of actuating cams for successively and alternately actuating at said bit intervals said storage levers and selector levers to move each said storage lever in turn to said first position thereof and immediately thereafter to move the associated selector lever to effect said angular movement of its latch bar about one of said pivot points, thereby to position said storage levers to store individual code bits included in an information code-bit group applied to energize said selector magnet, a mechanical drive source, means including a single revolution clutch for drivingly connecting said source to said actuating cams for cycle-controlled operation thereof, and means for angularly presetting said clutch to adjust the point in the cam cycle at which declutching occurs with respect to the initial lever actuation effected by said actuating cams.

36. A code-form converter comprising a plurality of information-storage elements each including an electrical control device movable to a first position but normally tending to move to a second position respectively denoting storage of a code space bit and storage of a code mark bit included in a binary-form multiple-bit-group representation of coded information, cam means for setting said elements successively in turn to said first position thereof, an input drive source and a single revolution clutch for drivingly connecting said source to said cam means for actuation thereof, latching means for normally latching said elements in said first position but responsive to sequential code mark bits of a code-bit group applied to said latching means in timed relation with said successive setting of said elements by said cam means for unlatching to said second position any element the said setting of which is substantially coincident with the occurrence of an applied code mark bit, thereby to position said control devices effectively to store said applied code-bit group, electrical control means actuated by said cam means for completing an electrical circuit to each of said control devices following completion of operation of said cam means and latching means in setting the last of said elements, and electrical circuit control means actuated by said clutch for interrupting said electrical circuit under precise control of the stop position of said clutch.

37. A code-form converter comprising, a plurality of information-storage elements each movable to either of two positions of which one is a latch-retainable position denoting storage of a first form of code bit and the other is an unlatched position denoting storage of a second form of code bit included in a binary-form multiple-bit-group representation of coded information, a plurality of cams operating in unison through a cam cycle for actuating individual ones of said elements sequentially to position said elements by movement of each thereof to said latch-retainable position, means responsive to individual successive code bits of a preselected one of said code forms and constituting an applied code-bit group presented in sequential-bit code form for selectively positioning individual ones of said elements to said other position thereof to effect positional storage by said elements of said code-bit group, means for adjustably presetting the initiation of the operating cycle of said cams with relation to the time of presentation of the first of said code bits to said last-named means, means operating in unison with said cams to effect upon completion of said selective positioning of said elements translation of the code-bit group stored by said elements with the code bits thereof arranged in a parallel-bit code-form presentation, and means responsive to the termination of each cam cycle for terminating said code-bit group translation at the end of the cam cycle and without regard to the time of initiation of said code-bit group translation as affected by said adjustable presetting means.

38. A code-form converter for translating information recorded by successive plural-bit code groups in a record medium comprising, means for reading and temporarily retaining each of successive code groups recorded in said medium, cyclically operating code distributing means having each cycle of operation thereof initiated by the code-retaining state of said retaining means and responsive to each code group read and retained thereby for receiving and temporarily storing said each code group, means responsive to the initiation of an operating cycle of said code distributor means for releasing said reading means to read and temporarily retain the next recorded code group of said record medium, and means effective during said operating cycle of said code-distributing means and responsive to the code group stored thereby for translating said stored code group in series-bit code form.

39. A code-form converter for translating information recorded by successive plural-bit code groups in a record medium comprising, means for reading and temporarily retaining each of successive code groups recorded in said medium, cyclically operating code distributing means having each cycle of operating thereof initiated by the code-retaining state of said retaining means and responsive to each code group read and retained thereby for receiving and temporarily storing said each code group, means responsive to the initiation of an operating cycle of said code distributor means for releasing said reading means to read and temporarily retain the next recorded code group of said record medium, means effective during said operating cycle of said code-distributing means and responsive to the code group stored thereby for translating said stored code group in series-bit code form, and means responsive to an abnormal feed condition of the record medium moving through said reading means for automatically terminating operation of said reading means thereby to terminate operation of said code-distributing means.

40. A code-form converter for translating information recorded by successive plural-bit code groups in a record medium comprising, means for reading and temporarily retaining each of successive code groups recorded in said medium, cyclically operating code-distributing means having each cycle of operation thereof initiated by the code-retaining state of said reading means and responsive to each code group read and retained thereby for receiving and temporarily storing said each code group, means responsive to the initiation of an operating cycle of said code-distributing means for releasing said reading means to read and temporarily retain the next recorded code group of said record medium, means effective during said operating cycle of said code-distributing means and responsive to the code group stored thereby for translating said stored code group in series-bit code form, manual means for initiating and terminating operation of said reading means, and means responsive to the code retaining state of said reading means for overriding any termination of operation of said reading means by said manual means until said code-distributing means has received and stored the last code group retained by said reading means.

41. A code-form converter for translating information recorded by successive plural-bit code groups in a record medium comprising, means for reading and temporarily retaining each of successive code groups recorded in said medium, cyclically operating code-distributing means having each cycle of operating thereof initiated by the code-retaining state of said reading means and responsive to each code group read and retained thereby for receiving and temporarily storing said each code group, means responsive to the initiation of an operating cycle of said code-distributing means for releasing said reading means to read and temporarily retain the next recorded code group of said record medium, means effective during said operating cycle of said code-distributing means and responsive to the code group stored thereby for translating said stored code group in series-bit code form, error-signal responsive means, means operative during a terminal portion of said operating cycle following completion of translation of each code group by said code-distributing means for actuating said error-signal responsive means in response to a received error signal, and means responsive to actuation of said error-signal responsive means for terminating operation of said reading means and thereby terminate operation of said code-distributing means.

42. A code-form converter for translating information recorded by successive plural-bit code groups in a record medium comprising, means for reading and temporarily retaining each of successive code groups recorded in said medium, cyclically operating code-distributing means having each cycle of operation thereof initiated by the code-retaining state of said reading means and responsive to each code group read and retained thereby for receiving and temporarily storing said each code group, means responsive to the initiation of an operating cycle of said code-distributing means for releasing said reading means to read and temporarily retain the next recorded code group of said record medium, means effective during said operating cycle of said code-distributing means and responsive to the code group stored thereby for translating said stored code group in series-bit code form, control means actuated by said code-distributing means to a first operative state during translation of each code bit and for a predetermined interval following translation of each code group but actuated to a second operative state in response to an abnormal code translating condition prevailing during said predetermined interval, and means responsive to actuation of said control means to said second operative state during said predetermined interval for terminating operation of said reading means and thereby terminate operation of said code-distributing means.

43. A code-form converter for translating information recorded by successive plural-bit code groups in a record medium comprising, means for reading and temporarily retaining each of successive code groups recorded in said medium, cyclically operating code-distributing means having each cycle of operation thereof initiated by the code-retaining state of said reading means and responsive to each code group read and retained thereby for receiving and temporarily storing said each code group, means responsive to the initiation of an operating cycle of said code-distributing means for releasing said reading means to read and temporarily retain the next recorded code group of said record medium, a pair of transmission line terminals, means effective during said operating cycle of said code distributing means and responsive to the code group stored thereby for completing an electrical circuit between said terminals corresponding to each of the code bits appearing in said each stored code group and for a predetermined interval following completion of each such group translation, and a line relay having an operating winding included in said electrical circuit between said line terminals to be actuated by transmission line energization to a first position during translation of each code bit and for said predetermined interval but actuated to a second position in response to absence of line energization, and means responsive to actuation of said relay to said second position during said predetermined interval for terminating operation of said reading means and thereby of said code distributing means.

44. A code-form converter-recorder comprising: means for receiving and storing each of successive groups of sequential code bits included in a binary-form multiple-bit-group representation of coded information, coded-information recording means, means operative upon completion of storage of each received code-bit group for controlling said recording means to effect concurrent recording thereby of the code bits of said each code-bit group, and means responsive to any erroneous departure of each recorded code-bit group from a preestablished code-parity system for providing an error indication.

45. A code-form converter-recorder comprising: means for receiving and storing each of successive groups of sequential code bits included in a binary-form multiple-bit-group representation of coded information, coded-information recording means, control means having plural operative states in one of which said receiving means and recording means are conditioned for operation and in another of which said receiving and recording means are deactivated, means for initiating each period of receiving and recording operation by actuating said control means to said one state thereof, and means responsive to any erroneous departure of each recorded code-bit group from a preestablished code-parity system for actuating said control means to said other operative state thereof to terminate operation of said receiving and recording means.

46. A code-form converter-recorder comprising: means for receiving and storing each of successive groups of sequential code bits included in a binary-form multiple-bit-group representation of coded information, coded-information recording means, an electrical relay having an energized state in which said receiving means and recording means are conditioned for operation and have a deenergized state in which said receiving and recording means are deactivated, means for initiating the energized state of said relay to initiate each period of operation of said receiving and recording means, and means responsive to any erroneous departure of each recorded code-bit group from a preestablished code-parity system for deenergizing said relay to terminate operation of said receiving and recording means.

47. A code-form converter-recorder comprising, communication-channel terminals adapted to have applied thereto successive groups of sequential code bits included in a binary-form multiple-bit-group representation of coded information, means connected to said terminals to receive and store the code bits of each code-bit group, control means for completing and interrupting the connection of said receiving means to said terminals, coded-information recording means, means operative upon completion of storage of each received code-bit group by said receiving means for controlling and recording means to effect concurrent recording thereby of the code bits of said each code-bit group, and means responsive to any erroneous departure of each recorded code-bit group from a preestablished code-parity system for controlling said control means to interrupt the connection of said receiving means to said terminals.

48. A code-form converter-recorder comprising: means for receiving and storing each of successive groups of sequential code bits included in a binary-form multiple-bit-group representation of coded information, coded-information recording means, control means having plural operative states in one of which said receiving means and recording means are conditioned for operation and in another of which said receiving and recording means are deactivated, means for manually initiating each period of receiving and recording operation by a delete-code recording operation of said recording means followed by actuation of said control means to said one state thereof, and means responsive to any erroneous departure of each recorded code-bit group from a preestablished code-parity system for actuating said control means to said other operative state thereof to terminate operation of said receiving and recording means.

49. A code-form converter-recorder comprising, means for receiving and storing each of successive groups of sequential code-bits included in a binary-form multiple-bit-group representation of coded information, coded-information recording means, error indicating means having plural operative states in one of which said receiving means and recording means are conditioned for operation and in another of which said receiving and recording means are deactivated, means for manually initiating each period of receiving and recording operation by a delete-code recording operation of said recording means followed by actuation of said error indicating means to said one state thereof, means responsive to any erroneous departure of each recorded code-bit group from a preestablished code-parity system for actuating said error indicating means to said other operative state thereof to terminate operation of said receiving and recording means, and means for providing a sensible warning after actuation of said error indicating means to said other operative state thereof and until reinitiation of operation by said manual means.

50. A code-form converter-recorder comprising, cyclic operating means including control means responsive to a predetermined transmission characteristic preceding each code-bit group transmission for initiating each operating cycle thereof and including code storage elements operative during sequential bit intervals to receive and store each of successive groups of sequential code bits included in a binary-form multiple-bit-group representation of coded information, said control means being adjustably presettable to adjust said operating cycle initiation with relation to said bit intervals, coded-information recording means, and means including means controlled by said control means and operative during the interval extending from completion of storage of each received code-bit group to the end of that cycle of said receiving means for translating said stored code group to said recording means for recording thereby.

51. A code-form converter-recorder comprising, cyclically operating means for receiving and storing during each cycle thereof one of successive groups of sequential code bits included in a binary-form multiple-bit-group representation of coded information, cyclically operating coded information recording means, and means operative during the terminal operation of each cycle of operation of said receiving means following completion of storage of a received code group for translating said stored code group from said receiving means to temporary storage in said recording means and for initiating an operating cycle of said recording means to effect recording of the code group temporarily stored thereby concurrently with the storage of the next received code group by said receiving means.

52. A code-form converter-recorder comprising, means for receiving and storing each of successive groups of sequential code bits included in a binary-form multiple-bit-group representation of coded information, a punched tape recorder including plural punch pins and means responsive to each said stored groups of received sequential code bits for recording said coded information in punched tape, a plurality of electrical transfer contacts individually actuated by individual ones of said punch pins for maintaining electrical continuity of a control circuit in response to fidelity of recording of said coded information in conformity with a preestablished code-parity system, and means for indicating interruption of electrical continuity of said control circuit by said contacts by departure of any recorded code-bit group from said preestablished code-parity system.

53. A coded-information communication system comprising, a normally electrically continuous transmission channel, means responsive to concurrently presented code bits of a code-bit-group representation of coded information for transmitting the code bits of the group sequentially to a remote point through said channel, and means for testing at said transmitting means for continuing electrical continuity of said channel during a terminal sampling interval following each code group transmission and for providing at said transmitting means an indication of any electrical discontinuity thereof appearing during said terminal sampling interval.

54. A coded-information communication system comprising, a normally electrically continuous transmission channel, means responsive to concurrently presented code bits of a code-bit-group representation of coded information for transmitting the code bits of the group sequentially to a remote point through said channel, receiving means at said remote point for receiving and collecting and thereafter concurrently utilizing said code bits as a group thereof, means included in said receiving means for interrupting the electrical continuity of said channel in response to any erroneously received code group, and means for testing at said transmitting locality to ascertain the continuing electrical continuity of said channel during a terminal sampling interval following each code group transmission and for providing an indication of any electrical discontinuity appearing during said sampling interval.

55. A coded-information communication system comprising, a normally electrically continuous transmission channel, means responsive to each of concurrently presented code bits of a code-bit-group representation of coded information for generating and transmitting an initial start-of-transmission bit for each said group followed by sequential transmission of the code bits of said each group to a remote point through said channel, receiving means at said remote point and responsive to reception of said start-of-transmission bit for initiating each cycle of operation thereof to collect and thereafter concurrently utilize the transmitted code bits of each said group thereof, means at said remote point and responsive to failure to receive any code bits during an operating cycle of said receiving means for interrupting the electrical continuity of said channel, and means at said transmitting locality for testing to ascertain the continuing electrical continuity of said channel during a terminal sampling interval following each code group-transmission and for providing an indication of any electrical discontinuity appearing during said sampling interval.

56. A coded-information communication system comprising, a normally electrically continuous transmission channel, means responsive to each of concurrently presented space and mark code bits of a code-bit-group representation of coded information for initiating each code group transmission by interruption of said channel followed by sequential transmission of the code bits of said each group to a remote point through said channel by means of electrical interruption of said channel corresponding to each space code bit, receiving means at said remote point and responsive to said initial channel interruption for inititing each cycle of operation thereof to collect and thereafter concurrently utilize the transmitted code bits of each said group thereof, means at said remote point for interrupting the electrical continuity of said channel in response to any erroneously received code group including failure to receive any code mark bit during a cycle of said receiving means, and means at said transmitting locality for testing to ascertain the continuing electrical continuity of said channel during a terminal sampling interval following each code group transmission and for providing an indication of any electrical discontinuity appearing during said sampling interval.

57. A coded-information communication system comprising, means responsive to concurrently presented code bits of a code-bit-group representation of coded information for transmitting the code bits of the group sequentially to a remote point, means at said remote point for receiving said sequentially transmitted code bits and for collecting and utilizing them concurrently as a group thereof, and means responsive to departure of the utilized code-bit group from a preestablished code-parity system for controlling said transmitting means to terminate operation thereof.

58. A coded-information communication system comprising, means responsive to concurrently presented code bits of a code-bit-group representation of coded information for transmitting the code bits of the group sequentially to a remote point, means at said remote point for receiving said sequentially transmitted code bits and for collecting and utilizing them concurrently as a group thereof, and means controlled by said last-mentioned means at said remote point in response to departure of the utilized code-bit group from a preestablished code-parity system for controlling said transmitting means to terminate operation thereof.

59. A coded-information communication system comprising, a normally electrically continuous transmission channel, means responsive to concurrently presented code bits of a code-bit-group representation of coded information for transmitting the code bits of the group sequentially to a remote point through said channel, and control means responsive to any electrical discontinuity of said channel as detected during a terminal sampling interval following each code-group transmission for terminating operation of said transmitting means.

60. A coded-information communication system comprising, a normally electrically continuous transmission channel, means responsive to concurrently presented code bits of a code-bit-group representation of coded information for transmitting the code bits of the group sequentially to a remote point through said channel, means at said remote point for receiving said sequentially transmitted code bits and for collecting and utilizing them concurrently as a group thereof, control means responsive to any electrical discontinuity of said channel as detected during a terminal sampling interval following each code-group transmission for terminating operation of said transmitting means during the interval of channel discontinuity, and means responsive to departure of the utilized code-bit group from a preestablished code-parity system for interrupting the electrical continuity of said channel and thereby cause said control means to terminate operation of said transmitting means.

61. A coded-information communication system comprising, a normally electrically continuous transmission channel, local means responsive to concurrently presented code bits of a code-bit-group representation of coded information for transmitting the code bits of the group sequentially to a remote point through said channel, a local line relay responsive to the electrical continuity of said channel and having one operative state indicating an electrically discontinuous channel, and control means responsive to said one state of said relay during a terminal sampling interval following each code group transmission for terminating operation of said transmitting means during the interval of channel discontinuity.

62. A coded-information communication system comprising, a normally electrically continuous transmission channel, local means responsive to concurrently presented code bits of a code-bit-group representation of coded information for transmitting the code bits of the group sequentially to a remote point through said channel, a local line relay responsive to the electrical continuity of said channel and having one operative state indicating an electrically discontinuous channel, control means responsive to said one state of said relay during a terminal sampling interval following each code group transmission for terminating operation of said transmitting means during the interval of channel discontinuity, means at said remote point for receiving said sequentially transmitted code bits and for collecting and utilizing them concurrently as a group thereof, and means responsive to departure of the utilized code-bit group from a pre-established code-parity system for interrupting the electrical continuity of said channel and thereby cause said relay to terminate operation of said transmitting means.

63. A coded-information communication system comprising, a normally electrically continuous transmission channel, local means responsive to concurrently presented code bits of a code-bit-group representation of coded information for transmitting the code bits of the group sequentially to a remote point through said channel, a local line relay responsive to the electrical continuity of said channel and having one operative state indicating an electrically discontinuous channel, transmission control means for controlling said transmitting means and including two operative states in one of which the operation of said transmitting means is terminated and in the other of which the operation of said transmitting means is initiated, and control means responsive to said one state of said relay during a terminal sampling interval following each code group transmission for terminating operation of said transmitting means during the interval of channel discontinuity and thereafter until said transmission control means is operated to said other state thereof.

64. A coded-information communication system comprising, a normally electrically continuous transmission channel, local means responsive to concurrently presented code bits of a code-bit-group representation of coded information for transmitting the code bits of the group sequentially to a remote point through said channel, a local line relay responsive to the electrical continuity of said channel and having one operative state indicating an electrically discontinuous channel, transmission control means for controlling said transmitting means and including two operative states in one of which the operation of said transmitting means is terminated and in the other of which the operation of said transmitting means is initiated, control means responsive to said one state of said relay during a terminal sampling interval following each code group transmission for terminating operation of said transmitting means during the interval of channel discontinuity and thereafter until said transmission control means is operated to said other state thereof, and indicator means for providing a sensible indication whenever transmissions are terminated under control of said last-mentioned means.

65. A coded-information communication system comprising, a transmission channel, code transmitting means at each end of said channel for receiving in concurrently presented code-bit form coded information to be transmitted and for transmitting the code bits thereof sequentially, receiving means at each end of said channel normally conditioned to receive and utilize the coded information transmitted from the remotely situated transmitting means, means at each end of said channel for activating in the alternative the associated transmitting means to transmit and the associated receiving means to receive, and means responsive to initiation of deactivation of an associated transmitting means by said last-named means for deferring said deactivation thereof until completion of transmission of a partially transmitted code-bit-group of coded information thereby.

66. A coded-information communication system comprising, means responsive to concurrently presented code bits of a code-bit-group representation of coded information for transmitting the code bits of the group sequentially to a remote point, means at said remote point for receiving said sequentially transmitted code bits and for collecting and concurrently recording them as a group thereof, means responsive to manual actuation for deleting information recorded by said last-mentioned means, and means responsive to manual actuation of said deletion means for terminating transmission by said transmitting means until completion of the deletion operation.

67. A coded-information communication system comprising, means for reading information code recorded by plural-code-bit groups in a recording medium, means responsive to groups of concurrently presented code bits read from said record medium by said reading means for transmitting the code bits of the group sequentially to a remote point, means at said remote point for receiving said sequentially transmitted code bits and for collecting and utilizing them as a group thereof, means responsive to departure of the utilized code-bit group from a pre-established code-parity system for controlling said reading and transmitting means to terminate operation thereof, and means responsive to termination of operation of said transmitting means by said control means for maintaining said transmitting means inoperative until subsequent manual reactivation of said reading means.

68. A coded-information communication system comprising, means responsive to concurrently presented code bits of a code-bit group representation of coded information for transmitting the code bits of the group sequentially to a remote point, means at said remote point for receiving said sequentially transmitted code bits and for collecting and temporarily storing them as a group thereof, means responsive to each temporarily stored code-bit group for recording said each group concurrently in a record medium, and means responsive to an abnormal feed condition of the record medium moving through said recording means for controlling said transmitting means to terminate operation thereof.

69. A coded-information communication system comprising, means responsive to concurrently presented code bits of a code-bit-group representation of coded information for transmitting the code bits of the group sequentially to a remote point, means at said remote point for receiving said sequentially transmitted code bits and for collecting and utilizing them as a group thereof, means responsive to abnormal reception and utilization of any code group by said receiving means for automatically deactivating said transmitting means and said receiving means, means responsive to said detactivation of said transmitting means for maintaining said transmitting means deactivated until said receiving means has been reactivated, and means responsive to reactivation of said receiving means for permitting reactivation of said transmitting means.

70. A coded-information communication system comprising, means responsive to concurrently presented code bits of a code-bit-group representation of coded information for transmitting the code bits of the group sequentially to a remote point, means at said remote point for receiving said sequentially transmitted code bits and for collecting and utilizing them as a group thereof, means responsive to abnormal reception and utilization of any code group by said receiving means for automatically deactivating said transmitting means and said receiving means, means responsive to said deactivation of said transmitting means for maintaining said transmitting means deactivated until said receiving means has been reactivated, means at the locality of said transmitting means for providing a sensible indication of the reactivation of said receiving means, and means responsive to reactivation of said receiving means for permitting manual reactivation of said transmitting means.

71. A system for communicating with a predetermined number of code levels coded information comprising, means responsive to concurrently presented code bits of a code-bit-group representation of coded information for transmitting the code bits of the group sequentially to a remote point, said code-bit-group representation being of a higher code level than said predetermined level, means for automatically recodifying each said higher level code-bit group to one utilizing only said predetermined code levels prior to said transmission by said transmitting means, means at said remote point for receiving said sequentially transmitted code bits and for collecting and utilizing them concurrently as a group thereof, and means responsive to the reception by said receiving means of each said recodified code-bit-group for automatically reconverting said each group to the orignial code form of said higher code level prior to utilization by said last-mentioned means.

References Cited in the file of this patent

UNITED STATES PATENTS

| | | |
|---|---|---|
| 2,522,874 | Kahn | Sept. 19, 1950 |
| 2,674,727 | Spielberg | Apr. 6, 1954 |
| 2,706,215 | Van Duuren | Apr. 12, 1955 |
| 2,719,959 | Hobbs | Oct. 4, 1955 |